(12) United States Patent
Duan et al.

(10) Patent No.: US 11,758,511 B2
(45) Date of Patent: Sep. 12, 2023

(54) METHODS AND APPARATUS FOR POSITIONING REFERENCE SIGNAL MUTING FOR USER EQUIPMENT POSITIONING IN FULL DUPLEX SYSTEMS

(71) Applicant: QUALCOMM Incorporated, San Diego, CA (US)

(72) Inventors: Weimin Duan, San Diego, CA (US); Alexandros Manolakos, Escondido, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/458,164

(22) Filed: Aug. 26, 2021

(65) Prior Publication Data

US 2022/0078747 A1   Mar. 10, 2022

Related U.S. Application Data

(60) Provisional application No. 63/076,845, filed on Sep. 10, 2020.

(51) Int. Cl.
*H04W 72/04* (2023.01)
*H04W 64/00* (2009.01)
(Continued)

(52) U.S. Cl.
CPC ......... *H04W 64/006* (2013.01); *H04L 5/0051* (2013.01); *H04L 5/1461* (2013.01);
(Continued)

(58) Field of Classification Search
CPC ........... H04W 64/006; H04W 72/0446; H04W 72/0453; H04W 72/1263; H04W 72/23;
(Continued)

(56) References Cited

U.S. PATENT DOCUMENTS

| | | | |
|---|---|---|---|
| 10,439,775 B2 * | 10/2019 | Mirbagheri | H04L 5/0007 |
| 10,530,542 B2 | 1/2020 | Blankenship et al. | |
| 2012/0046030 A1 * | 2/2012 | Siomina | H04W 24/02 |
| | | | 455/423 |
| 2018/0205482 A1 | 7/2018 | Ryden et al. | |

OTHER PUBLICATIONS

International Search Report and Written Opinion—PCT/US2021/047970—ISA/EPO—dated Dec. 21, 2021.
(Continued)

*Primary Examiner* — Siu M Lee

(74) *Attorney, Agent, or Firm* — QUALCOMM Incorporated

(57) ABSTRACT

A muting configuration for downlink positioning reference signals (PRS) is based on the slot type in which the PRS is transmitted. A slot type muting configuration mutes PRS if the PRS are transmitted in a full duplex slot, such as an in-band full duplex slot. If the PRS are transmitted in a sub-band full duplex slot, the PRS may be muted depending on whether the base station is capable of self-interference cancellation. The slot type muting configuration does not mute the PRS transmission in a half-duplex slot. The slot type muting configuration may be dynamic and may be provided to a user equipment (UE) in lower layer signaling to improve latency. The slot type muting configuration may be combined with other types of muting configurations, such as inter-instance muting, intra-instance muting, and intra-slot muting, e.g., using a logic function to combine the configurations.

43 Claims, 25 Drawing Sheets

(51) Int. Cl.
    *H04L 5/00*         (2006.01)
    *H04L 5/14*         (2006.01)
    *H04W 72/0446*    (2023.01)
    *H04W 72/0453*    (2023.01)
    *H04W 72/1263*    (2023.01)
    *H04W 72/23*       (2023.01)

(52) U.S. Cl.
    CPC .......... *H04W 72/0446* (2013.01); *H04W 72/0453* (2013.01); *H04W 72/1263* (2013.01); *H04W 72/23* (2023.01)

(58) Field of Classification Search
    CPC .......... H04W 52/0216; H04W 56/0015; H04L 5/0051; H04L 5/1461; Y02D 30/70
    See application file for complete search history.

(56) References Cited

OTHER PUBLICATIONS

Samsung: "Potential Positioning Enhancements", 3GPP Draft, 3GPP TSG RAN WG1 #102-e, R1-2006150, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915207, 7 Pages, Retrieved from the Internet: URL: https://ftp.3gpp.org/tsg_ran/WG1_RL1/TSGR1_102-e/Docs/R1-2006150.zip.R1-2006150. Potential Positioning Enhancements. docx. [Retrieved on Aug. 7, 2020] pp. 1-7.

\* cited by examiner

METHODS AND APPARATUS FOR POSITIONING REFERENCE SIGNAL MUTING FOR USER EQUIPMENT POSITIONING IN FULL DUPLEX SYSTEMS

CLAIM OF PRIORITY UNDER 35 U.S.C. § 119

This application claims under 35 USC § 119 the benefit of and priority to U.S. Provisional Application No. 63/076,845, filed Sep. 10, 2020, entitled "METHODS AND APPARATUS FOR POSITIONING REFERENCE SIGNAL MUTING FOR USER EQUIPMENT POSITIONING IN FULL DUPLEX SYSTEMS," which is assigned to the assignee hereof and is incorporated herein by reference in its entirety.

BACKGROUND

Field

Subject matter disclosed herein relates to positioning of user equipment using received positioning reference signals and more particularly to antenna adaptation for the user equipment based on the configuration of the positioning references signals.

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit downlink reference signals that are used for positioning, such as a positioning reference signal (PRS). Assistance data is sent to a UE to assist in acquiring and measuring signals, and in some implementations, to compute a location estimate from the measurements. A UE may acquire PRSs transmitted from different base stations and perform positioning measurements such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AOD), and multi-cell Round Trip Time (RTT). The UE may compute an estimate of its own location using various positioning methods or may send the positioning measurements to a network entity, e.g., location server, which may compute the UE location based on the positioning measurements. Improvements in efficiency, e.g., power consumption and complexity, are desirable.

SUMMARY

A muting configuration for downlink positioning reference signals (PRS) is based on the slot type in which the PRS is transmitted. A slot type muting configuration mutes PRS if the PRS are transmitted in a full duplex slot, such as an in-band full duplex slot. If the PRS are transmitted in a sub-band full duplex slot, the PRS may be muted depending on whether the base station is capable of self-interference cancellation. The slot type muting configuration does not mute the PRS transmission in a half-duplex slot. The slot type muting configuration may be dynamic and may be provided to a user equipment (UE) in lower layer signaling to improve latency. The slot type muting configuration may be combined with other types of muting configurations, such as inter-instance muting, intra-instance muting, and intra-slot muting, e.g., using a logic function to combine the configurations.

In one implementation, a method performed by a base station serving a user equipment (UE) in a wireless network for supporting positioning of the UE, includes receiving a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtaining a muting configuration for the PRS in the plurality of slots, wherein the muting configuration is at least partially based on the slot type; and sending the muting configuration to the UE.

In one implementation, a base station configured for supporting positioning of a user equipment (UE) in a wireless network, includes an external interface configured to communicate with entities in a wireless network; at least one memory; at least one processor coupled to the external interface and the at least one memory, wherein the at least one processor is configured to: receive a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtain a muting configuration for the PRS in the plurality of slots, wherein the muting configuration is at least partially based on the slot type; and send the muting configuration to the UE.

In one implementation, a base station serving configured for supporting positioning of a user equipment (UE) in a wireless network, includes means for receiving a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; means for obtaining a muting configuration for the PRS in the plurality of slots, wherein the muting configuration is at least partially based on the slot type; and means for sending the muting configuration to the UE.

In one implementation, a non-transitory storage medium including program code stored thereon, the program code is operable to configure at least one processor in a base station for supporting positioning of a user equipment (UE) in a wireless network, the program code comprising instructions to: receive a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtain a muting configuration for the PRS in the plurality of slots, wherein the muting configuration is at least partially based on the slot type; and send the muting configuration to the UE.

In one implementation, a method performed by a location server for supporting positioning of a user equipment (UE) in a wireless network, includes generating a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generating a muting configuration for the PRS in the plurality of slots for the base station, wherein the muting configuration is at least partially based on the slot type; sending the muting configuration to the base station; and sending the muting configuration to the UE.

In one implementation, a location server configured for supporting positioning of a user equipment (UE) in a wireless network includes an external interface configured to communicate with entities in a wireless network; at least one memory; at least one processor coupled to the external interface and the at least one memory, wherein the at least one processor is configured to: generate a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generate a muting configuration for the PRS in the plurality of slots for the base station, wherein the muting configuration is at least partially based on the slot type; send the muting configuration to the base station; and send the muting configuration to the UE.

In one implementation, a location server configured for supporting positioning of a user equipment (UE) in a wireless network, includes means for generating a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; means for generating a muting configuration for the PRS in the plurality of slots for the base station, wherein the muting configuration is at least partially based on the slot type; means for sending the muting configuration to the base station; and means for sending the muting configuration to the UE.

In one implementation, a non-transitory storage medium including program code stored thereon, the program code is operable to configure at least one processor in a location server for supporting positioning of a user equipment (UE) in a wireless network, the program code comprising instructions to: generate a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generate a muting configuration for the PRS in the plurality of slots for the base station, wherein the muting configuration is at least partially based on the slot type; send the muting configuration to the base station; and send the muting configuration to the UE.

In one implementation, a method performed by a user equipment (UE) in a wireless network for supporting positioning of the UE, includes receiving a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receiving a muting configuration for the PRS in the plurality of slots, wherein the muting configuration is at least partially based on the slot type; receiving the PRS from the base station using the muting configuration.

In one implementation, a user equipment (UE) configured for supporting positioning of the UE in a wireless network, includes a wireless transceiver configured to wirelessly communicate with entities in a wireless network; at least one memory; at least one processor coupled to the wireless transceiver and the at least one memory, wherein the at least one processor is configured to: receive a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receive a muting configuration for the PRS in the plurality of slots, wherein the muting configuration is at least partially based on the slot type; receive the PRS from the base station using the muting configuration.

In one implementation, a user equipment (UE) in a wireless network configured for supporting positioning of the UE, includes means for receiving a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; means for receiving a muting configuration for the PRS in the plurality of slots, wherein the muting configuration is at least partially based on the slot type; and means for receiving the PRS from the base station using the muting configuration.

In one implementation, a non-transitory storage medium including program code stored thereon, the program code is operable to configure at least one processor in a user equipment (UE) for supporting positioning of the UE in a wireless network, the program code comprising instructions to: receive a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receive a muting configuration for the PRS in the plurality of slots, wherein the muting configuration is at least partially based on the slot type; and receive the PRS from the base station using the muting configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
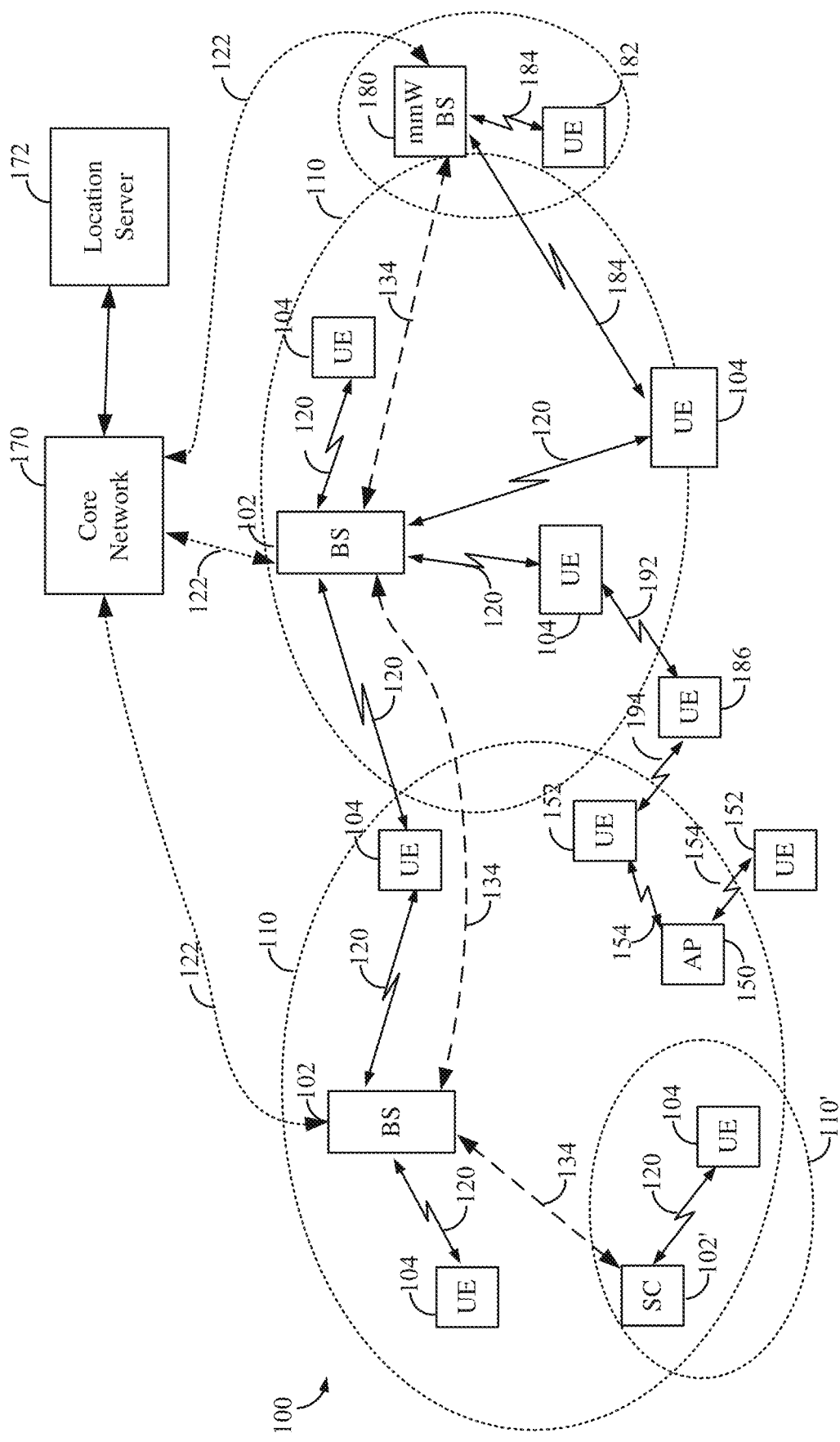
FIG. 1A illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or transmission point or transmission reception point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AOD), Round Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, e.g., PRS, which are used to generate the desired measurements for the supported positioning technique. Positioning Reference Signals (PRS) are defined for 5G NR positioning to enable UEs to detect and measure more neighbour base stations or Transmission and Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AOD, Multi-RTT |
| Rel.16 DL PRS/ Rel.16 SRS for positioning | UE Rx-Tx time difference | Multi-RTT |
| Rel. 15 SSB/ CSI-RS for RRM | SS-RSRP (RSRP for RRM), SS-RSRQ (for RRM), CSI-RSRP (for RRM), CSI-RSRQ (for RRM) | E-CID |

In 5G NR, the base stations, i.e., gNBs, may transmit PRS resources in a beam-sweeping manner. In other words, the gNBs may use beamforming and transmit PRS resources in specific directions. A PRS resource set is a set of PRS resources used for the transmission of PRS signals. PRS resources may be repeated in a single instance for the PRS resource set. Base stations may operate in frequency division duplex (FDD) mode and time division duplex mode when transmitting PRS resources, e.g., transmitting PRS resources over multiple symbols and carrier frequencies to prevent overlap. Generally, PRS resources are transmitted with a constant power, but a PRS resource may also be transmitted with zero power (i.e., muted), to prevent overlap with other cells. Muting, which turns off a regularly scheduled PRS resource transmission, may be useful when PRS signals between different cells overlap by occurring at the same or almost the same time. In this case, the PRS signals from some cells may be muted while PRS signals from other cells are transmitted (e.g., at a constant power). Muting configurations including muting all PRS resources withing a selected PRS resource set instance (sometimes referred to as inter instance muting) or muting selected repetitions of the PRS resources within a PRS resource set instance (sometimes referred to as intra instance muting). Assistance data may be provided to the UE, which includes PRS configuration information, including muting information, to assist the UE in measuring the PRS resources.

Base stations may use duplex communications to transmit downlink signals and receive uplink signals. For example, a base station may use full duplex communications in which the DL resource and UL resource share the same time and frequency resources, e.g., the base station transmits and receives on the same time and frequency resource (referred to as in-band full duplex), or the DL resource is transmitted at the same time as the UL resource but on a different frequency resource (sub-band full duplex). A base station may further transmit DL resources and receive UL resources at different times and on different frequency resources (half-duplex). Thus, DL PRS may be scheduled to be transmitted by a base station in a full duplex slot or a half-duplex shot. However, the DL PRS resources transmitted in a full duplex slot, particularly in-band full duplex, may cause self-interference with reception of UL signals.

Accordingly, as described herein, a muting configuration may be used to mute PRS resources based on the slot type in which the PRS resource is scheduled. For example, the PRS resource may be muted in an in-band full duplex slot in which DL transmissions and UL reception occur simultaneously with the same frequency resources. If the PRS resource is scheduled in a sub-band full duplex slot, the PRS resource may be muted depending on the capability of the base station, e.g., if the base station cannot perform self-interference cancellation for UL signals received simultaneously with transmission of the PRS resources, the PRS resource may be muted.

The muting configuration may be provided to the UE using lower layer signaling. For example, currently muting configurations are provided in higher layer messages, e.g., using LPP assistance data messages. In some implementations, the muting configuration may be provided in lower layers to enable low-latency configurations.

The slot based PRS muting may be used in conjunction with other types of muting configurations, e.g., the inter instance muting or intra instance muting. For example, a logic function (such as an AND logic function) may be used to combine the muting configurations. In some implementations, other types of muting may additionally or alternatively be used, such as intra-slot muting, e.g., where selected symbols of a PRS resource may be muted.

FIG. 1A illustrates an exemplary wireless communications system 100. The wireless communications system 100 (which may also be referred to as a wireless wide area network (WWAN)) may include various network nodes, including base stations and UEs. The base stations 102, sometimes referred to as TRPs 102, may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 186, that connects indirectly to one or more communication networks via one or more device-to-device (D2D) peer-to-peer (P2P) links. In the example of FIG. 1A, UE 186 has a D2D P2P link 192 with one of the UEs 104 connected to one of the base stations 102 (e.g., through which UE 186 may indirectly obtain cellular connectivity) and a D2D P2P link 194 with WLAN STA 152 connected to the WLAN AP 150 (through which UE 186 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 180 over a mmW communication link 184. For example, the macro cell base station 102 may support a PCell and one or more SCells for the UE 104 and the mmW base station 180 may support one or more SCells for the UE 104.

Figure 1B:
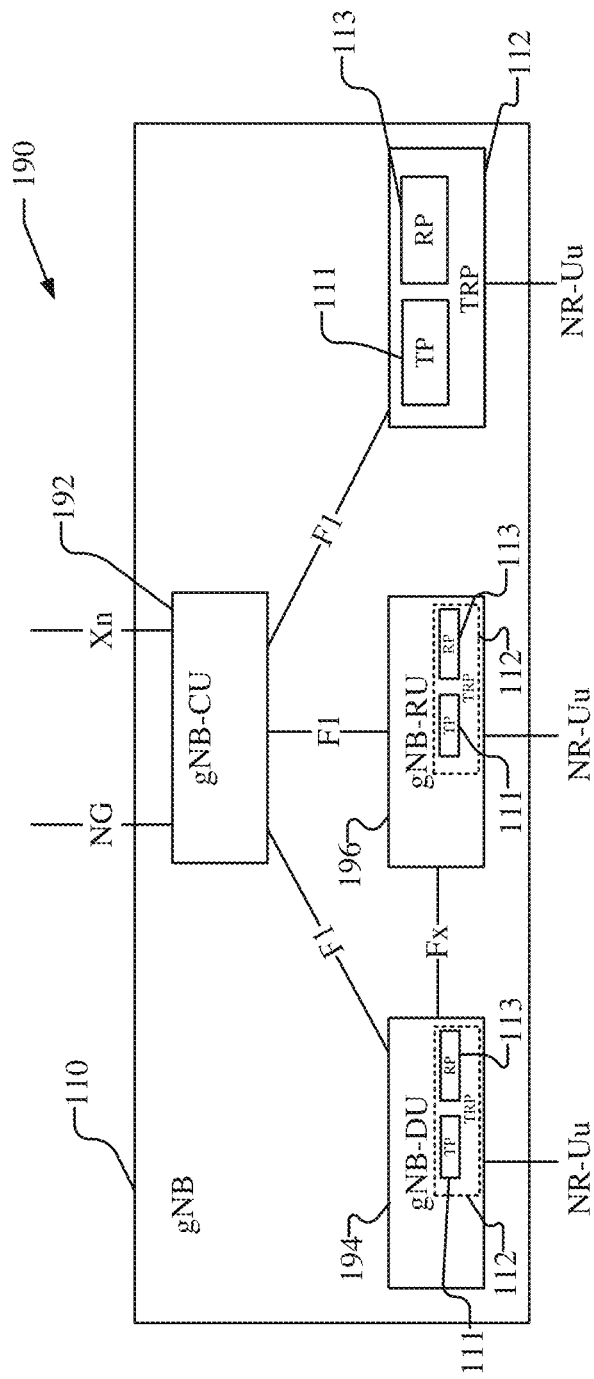
FIG. 1B shows an architecture diagram of an NG-RAN node that includes a gNB Central Unit, a gNB Distributed Unit, and gNB Remote Unit.

FIG. 1B shows an architecture diagram of an NG-RAN node 190 that may be within an NG-RAN in FIG. 1A, e.g., as a separate entity or as part of another gNB. The NG-RAN node 190 may be a gNB 102, according to one implementation. The architecture shown in FIG. 1B, for example, may be applicable to any gNB 102 in FIG. 1A.

As illustrated, gNB 102 may include a gNB Central Unit (gNB-CU) 192, a gNB Distributed Unit (gNB-DU) 194, a gNB Remote Unit (gNB-RU) 196, which may be physically co-located in the gNB 102 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 102 via an Xn interface. The gNB-DU 194 is a logical or physical node hosting support for Radio Link Control (RLC), Medium Access Control (MAC) and Physical (PHY) protocol layers used over the NR Uu air interface of the gNB 102, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 1B, gNB 102 may include a Transmission Point (TP) 111 and a Reception Point (RP) 113 combined into a Transmission Reception Point (TRP) 112, which may be physically or logically located in the gNB 102. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 102) may comprise a subset of the elements shown in FIG. 1B. For example, the NG-RAN node 190 may comprise the gNB-CU 192 but may not include one or more of gNB-DU 194 and gNB-RU 196, RP 113, or TP 111. Alternatively, NG-RAN node 190 may include one or more of gNB-DU 194 and, RP 113 or TP 111 but may not include gNB-RU 196. Further, the elements shown in FIG. 1B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 102, may use XnAP or a protocol above XnAP, such as an extended NR Positioning Protocol A (NRPPa) as defined in 3GPP TS 38.455. The location procedures between NG-RAN node 190 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 2A:
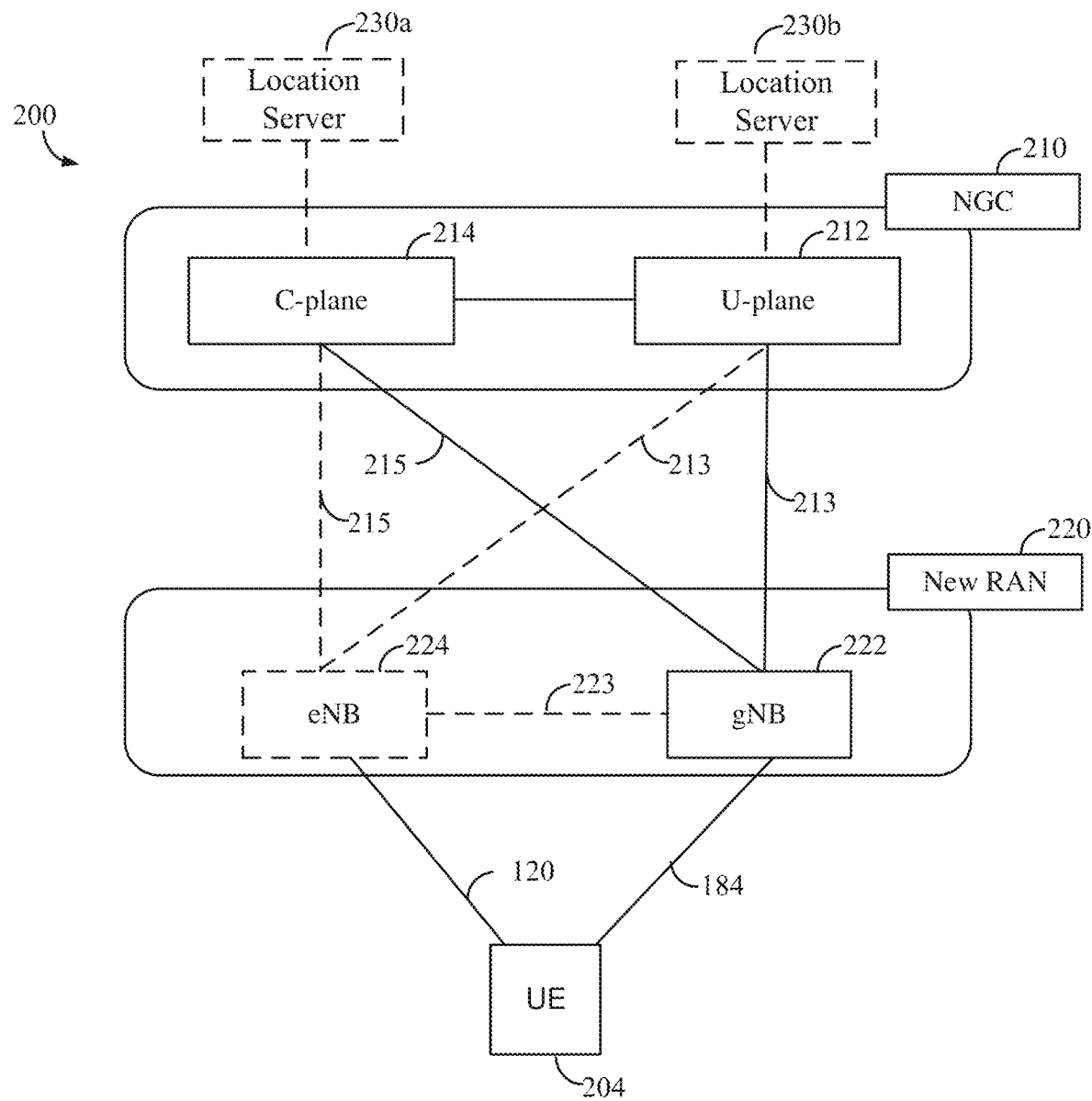
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
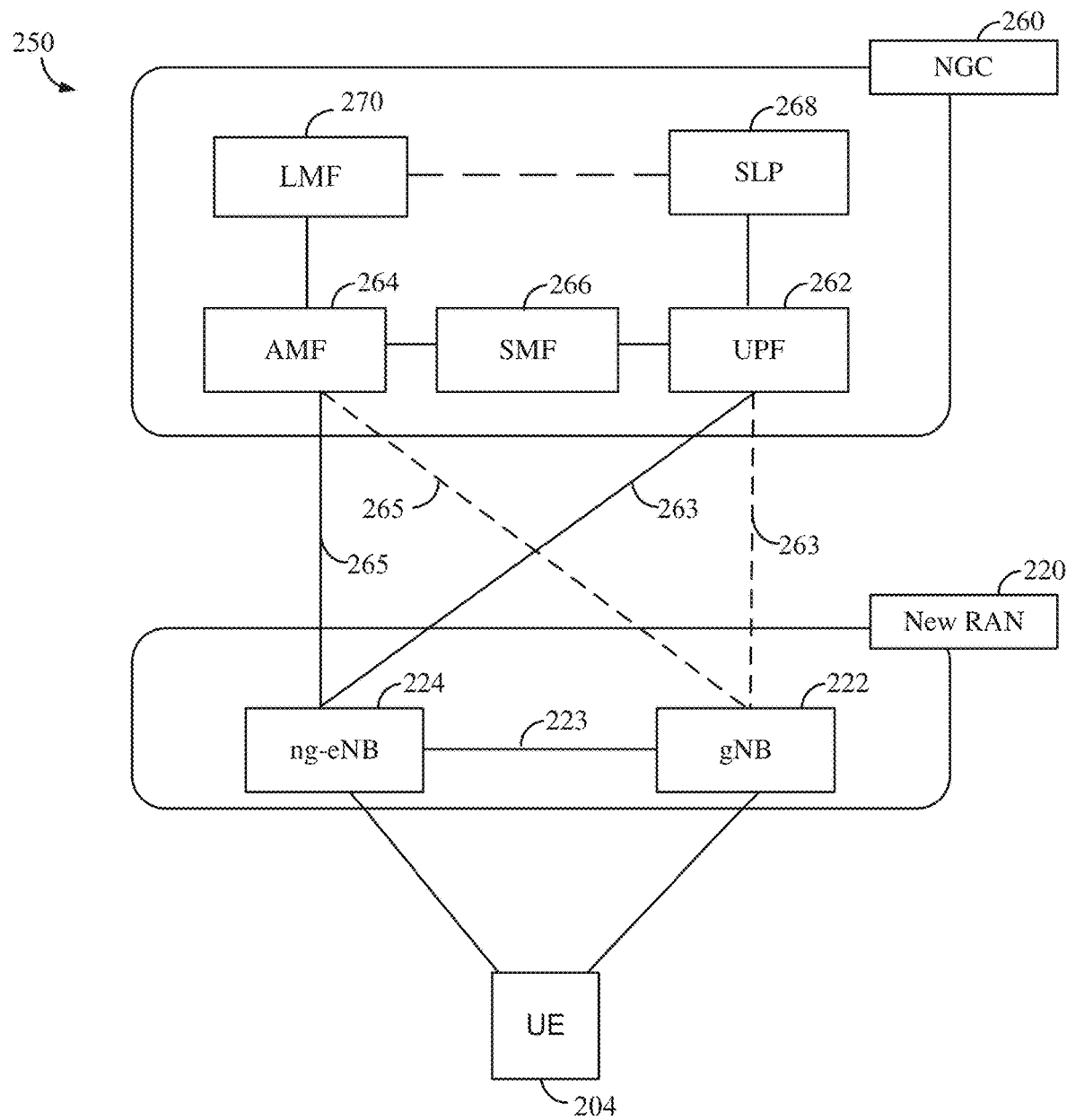

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1A). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
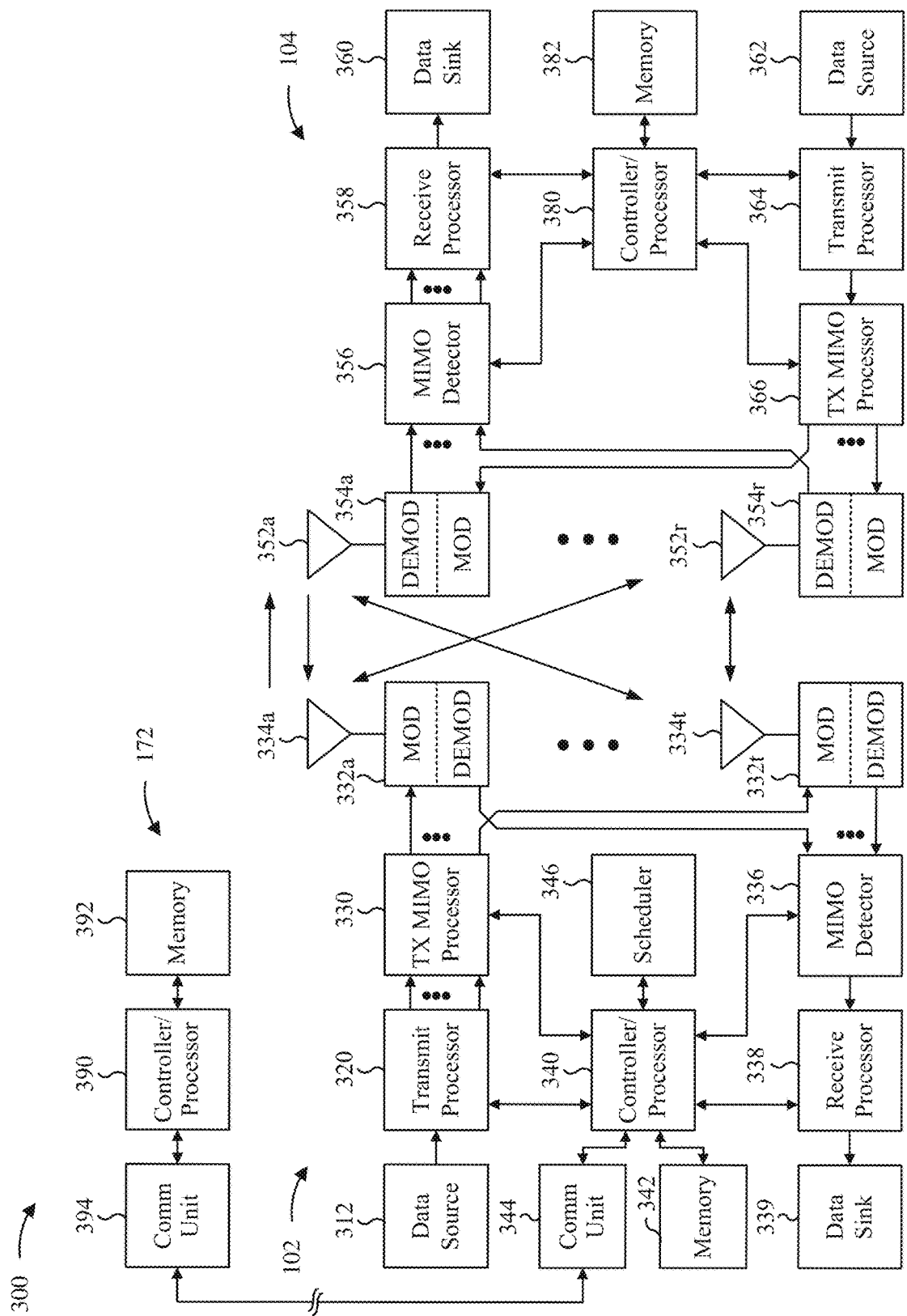
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1A. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 172 via communication unit 344. Location server 172 may include communication unit 394, controller/processor 390, and memory 392.

Controller/processor 340 of base station 102, controller/processor 380 of UE 104, controller/processor 390 of location server 172, and/or any other component(s) of FIG. 3 may perform one or more techniques associated broadcasting positioning assistance data in a differential manner, as described in more detail elsewhere herein. For example, controller/processor 340 of base station 102, controller/processor 390 of location server 172, controller/processor 380 of UE 104, and/or any other component(s) of FIG. 3 may perform or direct operations of, for example, process 2500, 2600, and 2700 of FIGS. 25, 26, and 27, and/or other processes as described herein. Memories 342, 382, and 392 may store data and program codes for base station 102, UE 104, and location server 172, respectively. In some aspects, memory 342 and/or memory 382 and/or memory 392 may comprise a non-transitory computer-readable medium storing one or more instructions for wireless communication. For example, the one or more instructions, when executed by one or more processors of base station 102, location server 172, and/or the UE 104 may perform or direct operations of, for example, process 2500, 2600, and 2700 of FIGS. 25, 26, and 27 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
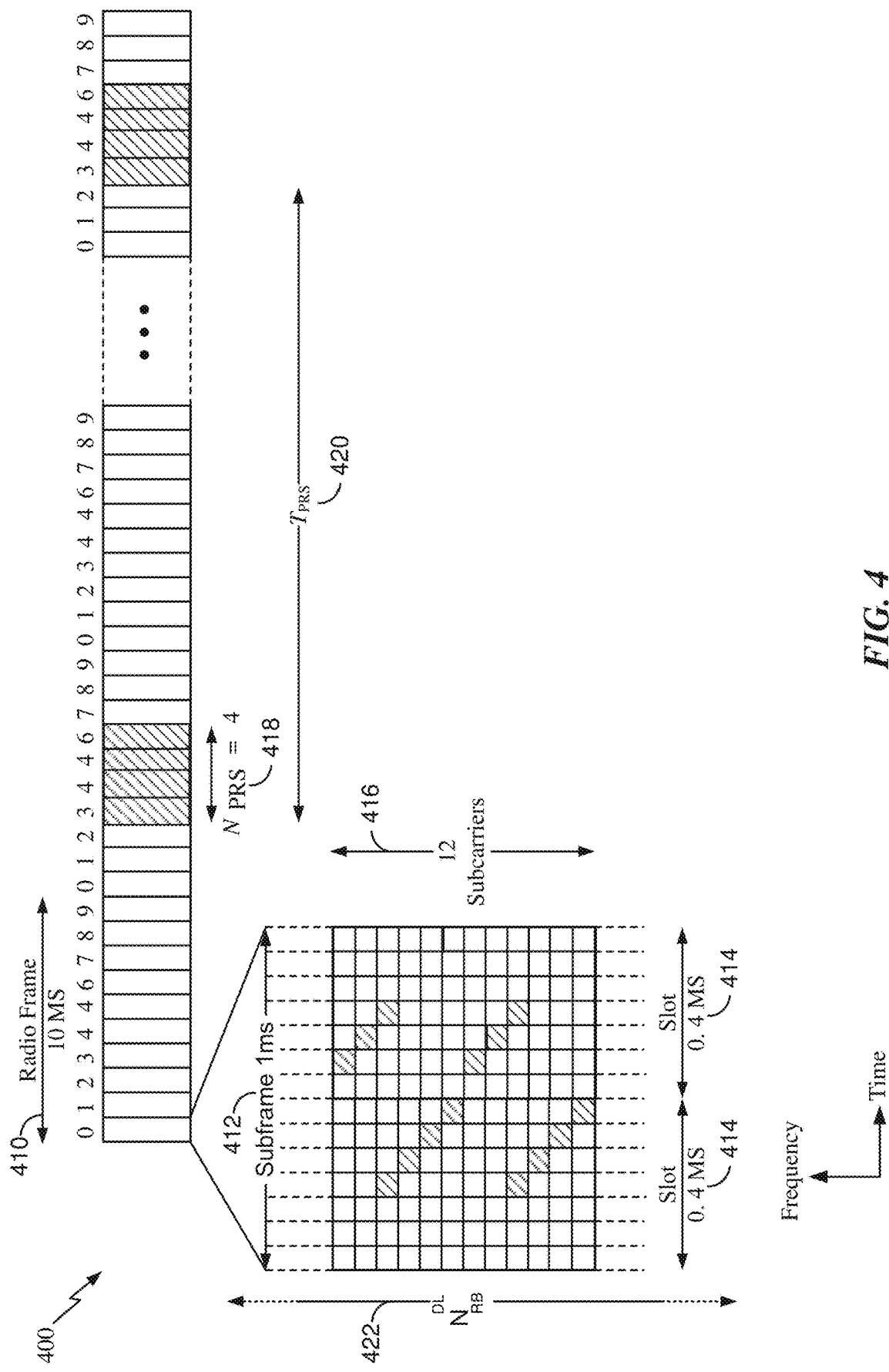
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{BB}=12$. For a given channel bandwidth, the number of available resource blocks on each channel 422, which is also called the transmission bandwidth configuration 422, is indicated as NB. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$) In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Similar to DL PRS transmitted by base stations, discussed above, a UE may transmit UL PRS for positioning. The UL PRS may be, e.g., sounding reference signals (SRS) for positioning.

Using received DL PRS from base stations or SL signaling from other UEs, and/or UL PRS transmitted to base stations or SL to other UEs, the UE may perform various positioning measurements, such as reference signal time difference (RSTD) measurements for time difference of arrival (TDOA) a positioning technique, reference signal received power (RSRP) measurements for TDOA, Angle of Departure, and Round Trip Time (RTT) or multi cell RTT (multi-RTT) positioning techniques, time difference between reception and transmission of signals (Rx-Tx) for a multi-RTT positioning technique, etc. Positioning technologies that use reference signal include downlink based positioning, uplink based positioning, and combined downlink and uplink based positioning. For example, downlink based positioning includes positioning methods such as DL-TDOA and DL-AOD. Uplink based positioning includes positioning method such as UL-TDOA and UL-AOA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

Figure 5:
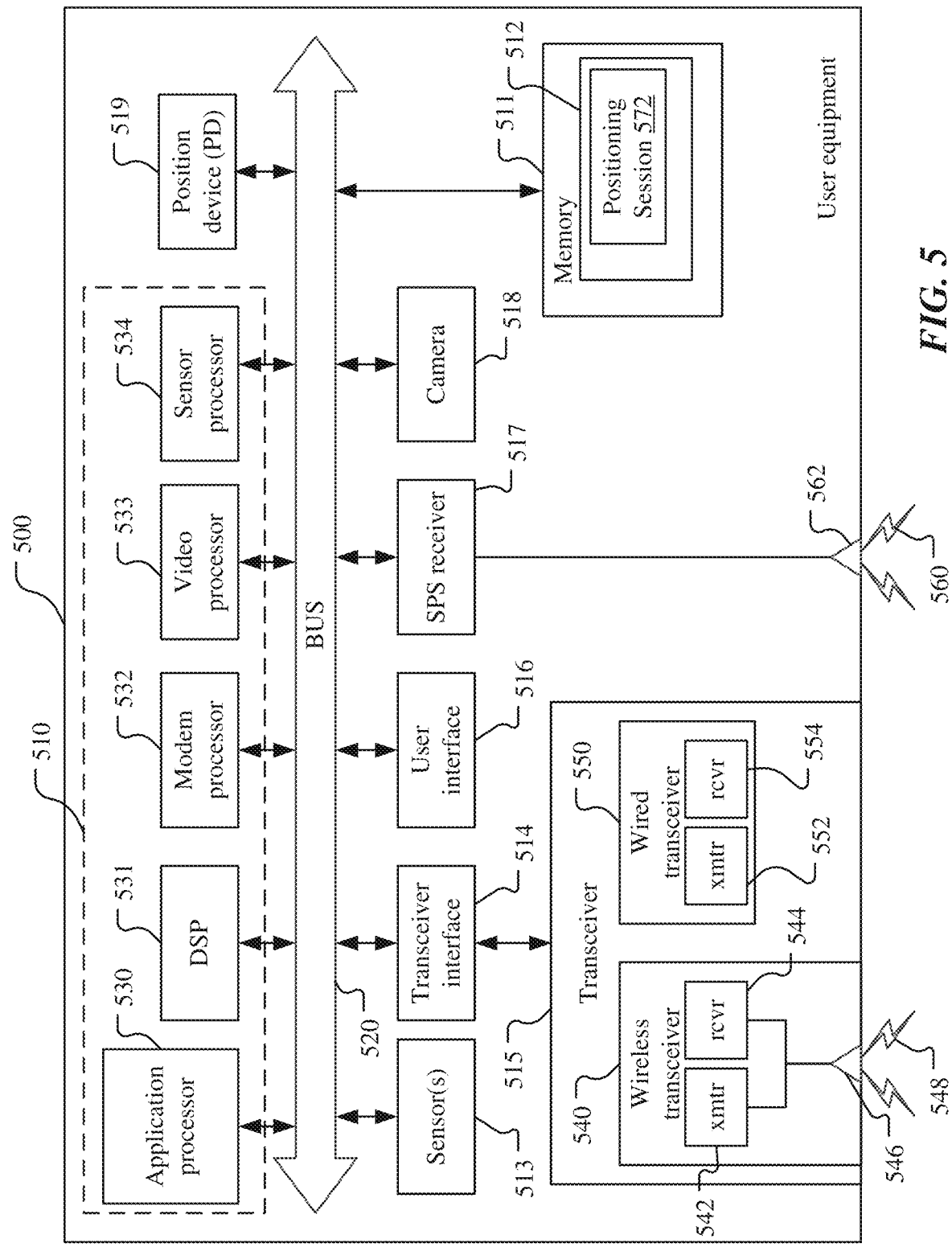
FIG. 5 illustrates a UE capable of receiving assistance data including a slot type based PRS muting configuration.

FIG. 5 illustrates a UE 500, which is an example of the UE 104, capable of receiving assistance data including a slot type based PRS muting configuration and performing positioning measurements using DL PRS. The UE 500 includes a computing platform including at least one processor 510, memory 511 including software (SW) 512, one or more sensors 513, a transceiver interface 514 for a transceiver 515, a user interface 516, a Satellite Positioning System (SPS) receiver 517, a camera 518, and a position engine (PE) 519. The at least one processor 510, the memory 511, the sensor(s) 513, the transceiver interface 514, the user interface 516, the SPS receiver 517, the camera 518, and the position engine 519 may be communicatively coupled to each other by a bus 520 (which may be configured, e.g., for optical and/or electrical communication). One or more of the shown apparatus (e.g., the camera 518, the SPS receiver 517, and/or one or more of the sensor(s) 513, etc.) may be omitted from the UE 500. The at least one processor 510 may include one or more intelligent hardware devices, e.g., a central processing unit (CPU), a microcontroller, an application specific integrated circuit (ASIC), etc. The at least one processor 510 may comprise multiple processors including an application processor 530, a Digital Signal Processor (DSP) 531, a modem processor 532, a video processor 533, and/or a sensor processor 534. The at least one processor 510 may further include the position engine 519, or the position engine 519 may be considered separate from the at least one processor 510. One or more of the processors 530-534 may comprise multiple devices (e.g., multiple processors). For example, the sensor processor 534 may comprise, e.g., processors for radar, ultrasound, and/or lidar, etc. The modem processor 532 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 500 for connectivity. The memory 511 is a non-transitory storage medium that may include random access memory (RAM), flash memory, disc memory, and/or read-only memory (ROM), etc. The memory 511 stores the software 512 which may be processor-readable, processor-executable software code containing instructions that are configured to, when executed, cause the at least one processor 510 to operate as a special purpose computer programmed to perform the various functions described herein. Alternatively, the software 512 may not be directly executable by the at least one processor 510 but may be configured to cause the at least one processor 510, e.g., when compiled and executed, to operate as a special purpose computer to perform the various functions described herein. The description may refer only to the at least one processor 510 performing a function, but this includes other implementations such as where the at least one processor 510 executes software and/or firmware. The description may refer to the at least one processor 510 performing a function as shorthand for one or more of the processors 530-234 performing the function. The description may refer to the UE 500 performing a function as shorthand for one or more appropriate components of the UE 500 performing the function. The at least one processor 510 may include a memory with stored instructions in addition to and/or instead of the memory 511. Functionality of the at least one processor 510 is discussed more fully below.

The configuration of the UE 500 shown in FIG. 5 is an example and not limiting of the invention, including the claims, and other configurations may be used. For example, an example configuration of the UE includes one or more of the processors 530-534 of the at least one processor 510, the memory 511, and the wireless transceiver 540. Other example configurations include one or more of the processors 530-534 of the at least one processor 510, the memory 511, the wireless transceiver 540, and one or more of the sensor(s) 513, the user interface 516, the SPS receiver 517, the camera 518, the PE 519, and/or the wired transceiver 550.

The UE 500 may comprise the modem processor 532 that may be capable of performing baseband processing of signals received and down-converted by the transceiver 515 and/or the SPS receiver 517. The modem processor 532 may perform baseband processing of signals to be upconverted for transmission by the transceiver 515. Also or alternatively, baseband processing may be performed by the processor 530 and/or the DSP 531. Other configurations, however, may be used to perform baseband processing.

The UE 500 may include the sensor(s) 513 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 500 in three dimensions) and/or one or more gyroscopes capable of detecting motion including rotation of the UE 500. The sensor(s) 513 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 513 may generate analog and/or digital signals indications of which may be stored in the memory 511 and processed by the DSP 531 and/or the processor 530 in support of one or more applications such as, for example, applications directed to positioning and/or navigation operations.

The sensor(s) 513 may be used in relative location measurements, relative location determination, motion determination, etc. Information detected by the sensor(s) 513 may be used for motion detection, relative displacement, dead reckoning, sensor-based location determination, and/or sensor-assisted location determination. The sensor(s) 513 may be useful to determine whether the UE 500 is fixed (stationary) or mobile including rotating and/or whether to report certain useful information to the location server 172 regarding the mobility of the UE 500. For example, based on the information obtained/measured by the sensor(s), the UE 500 may notify/report to the location server 172 that the UE 500 has detected movements or that the UE 500 has moved, and report the relative displacement/distance (e.g., via dead reckoning, or sensor-based location determination, or sensor-assisted location determination enabled by the sensor(s) 513). In another example, for relative positioning information, the sensors/IMU can be used to determine the angle and/or orientation of the other device with respect to the UE 500, etc.

The IMU may be configured to provide measurements about a direction of motion and/or a speed of motion of the UE 500, which may be used in relative location determination. For example, one or more accelerometers and/or one or more gyroscopes of the IMU may detect, respectively, a linear acceleration and a speed of rotation of the UE 500. The linear acceleration and speed of rotation measurements of the UE 500 may be integrated over time to determine an instantaneous direction of motion as well as a displacement of the UE 500. The instantaneous direction of motion and the displacement may be integrated to track a location of the UE 500. For example, a reference location of the UE 500 may be determined, e.g., using the SPS receiver 517 (and/or by some other means) for a moment in time and measurements from the accelerometer(s) and gyroscope(s) taken after this moment in time may be used in dead reckoning to determine present location of the UE 500 based on movement (direction and distance) of the UE 500 relative to the reference location.

The magnetometer(s) may determine magnetic field strengths in different directions which may be used to determine orientation of the UE 500. For example, the orientation may be used to provide a digital compass for the UE 500. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the at least one processor 510.

The barometric pressure sensors(s) may determine air pressure, which may be used to determine the elevation or current floor level in a building of the UE 500. For example, a differential pressure reading may be used to detect when the UE 500 has changed floor levels as well as the number of floors that have changed. The barometric pressure sensors(s) may provide means for sensing air pressure and providing indications of the air pressure, e.g., to the at least one processor 510.

The transceiver 515 may include a wireless transceiver 540 and a wired transceiver 550 configured to communicate with other devices through wireless connections and wired connections, respectively. For example, the wireless transceiver 540 may include a transmitter 542 and receiver 544 coupled to one or more antennas 546 for transmitting (e.g., on one or more uplink channels and/or one or more sidelink channels) and/or receiving (e.g., on one or more downlink channels and/or one or more sidelink channels) wireless signals 548 and transducing signals from the wireless signals 548 to wired (e.g., electrical and/or optical) signals and from wired (e.g., electrical and/or optical) signals to the wireless signals 548. Thus, the transmitter 542 may include multiple transmitters that may be discrete components or combined/integrated components, and/or the receiver 544 may include multiple receivers that may be discrete components or combined/integrated components. The wireless transceiver 540 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 550 may include a transmitter 552 and a receiver 554 configured for wired communication, e.g., with the network 135. The transmitter 552 may include multiple transmitters that may be discrete components or combined/integrated components, and/or the receiver 554 may include multiple receivers that may be discrete components or combined/integrated components. The wired transceiver 550 may be configured, e.g., for optical communication and/or electrical communication. The transceiver 515 may be communicatively coupled to the transceiver interface 514, e.g., by optical and/or electrical connection. The transceiver interface 514 may be at least partially integrated with the transceiver 515.

The antennas 546 may include an antenna array, which may be capable of receive beamforming, e.g., by increasing the gain setting and/or adjust the phase setting of an array of antennas in a particular direction to amplify (e.g., to increase the gain level of) the RF signals received from that direction. The antennas 546 may further include a plurality of antenna panels, wherein each antenna panel is capable of beamforming. The antennas 546 is capable of adaptation, e.g., selection of one or more antennas for controlling receiving transmitted beams from a base station. A reduced number of beams or a single beam, for example, may be selected for reception of a wide angle beam, e.g., to reduce power consumption, while an increased number of antennas in an antenna array may be selected when the transmit beam is relatively narrow.

The user interface 516 may comprise one or more of several devices such as, for example, a speaker, microphone, display device, vibration device, keyboard, touch screen, etc. The user interface 516 may include more than one of any of these devices. The user interface 516 may be configured to enable a user to interact with one or more applications hosted by the UE 500. For example, the user interface 516 may store indications of analog and/or digital signals in the memory 511 to be processed by DSP 531 and/or the processor 530 in response to action from a user. Similarly, applications hosted on the UE 500 may store indications of analog and/or digital signals in the memory 511 to present an output signal to a user. The user interface 516 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 516 may comprise one or more touch sensors responsive to touching and/or pressure, e.g., on a keyboard and/or touch screen of the user interface 516.

The SPS receiver 517 (e.g., a Global Positioning System (GPS) receiver) may be capable of receiving and acquiring SPS signals 560 via an SPS antenna 562. The antenna 562 is configured to transduce the wireless signals 560 to wired signals, e.g., electrical or optical signals, and may be integrated with the antenna 546. The SPS receiver 517 may be configured to process, in whole or in part, the acquired SPS signals 560 for estimating a location of the UE 500. For example, the SPS receiver 517 may be configured to determine location of the UE 500 by trilateration using the SPS signals 560. The processor 530, the memory 511, the DSP 531, the PE 519 and/or one or more additional specialized processors (not shown) may be utilized to process acquired SPS signals, in whole or in part, and/or to calculate an estimated location of the UE 500, in conjunction with the SPS receiver 517. The memory 511 may store indications (e.g., measurements) of the SPS signals 560 and/or other signals (e.g., signals acquired from the wireless transceiver 540) for use in performing positioning operations. The general-purpose processor 530, the DSP 531, the PE 519, and/or one or more additional specialized processors, and/or the memory 511 may provide or support a location engine for use in processing measurements to estimate a location of the UE 500.

The UE 500 may include the camera 518 for capturing still or moving imagery. The camera 518 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 530 and/or the DSP 531. Also or alternatively, the video processor 533 may perform conditioning, encoding, compression, and/or manipulation of signals representing captured images. The video processor 533 may decode/decompress stored image data for presentation on a display device (not shown), e.g., of the user interface 516.

The position engine (PE) 519 may be configured to determine a position of the UE 500, motion of the UE 500, and/or relative position of the UE 500, and/or time. For example, the PE 519 may communicate with, and/or include some or all of, the SPS receiver 517 and the wireless transceiver 540. The PE 519 may work in conjunction with the at least one processor 510 and the memory 511 as appropriate to perform at least a portion of one or more positioning methods, although the description herein may refer only to the PE 519 being configured to perform, or performing, in accordance with the positioning method(s). The PE 519 may also or alternatively be configured to determine location of the UE 500 using terrestrial-based signals (e.g., at least some of the signals 548) for trilateration, for assistance with obtaining and using the SPS signals 560, or both. The PE 519 may be configured to use one or more other techniques (e.g., relying on the UE's self-reported location (e.g., part of the UE's position beacon)) for determining the location of the UE 500, and may use a combination of techniques (e.g., SPS and terrestrial positioning signals) to determine the location of the UE 500. The PE 519 may include one or more of the sensors 513 (e.g., gyroscope(s), accelerometer(s), magnetometer(s), etc.) that may sense orientation and/or motion of the UE 500 and provide indications thereof that the at least one processor 510 (e.g., the processor 530 and/or the DSP 531) may be configured to use to determine motion (e.g., a velocity vector and/or an acceleration vector) of the UE 500. The PE 519 may be configured to provide indications of uncertainty and/or error in the determined position and/or motion.

The memory 511 may store software 512 that contains executable program code or software instructions that when executed by the at least one processor 510 may cause the at least one processor 510 to operate as a special purpose computer programmed to perform the functions disclosed herein. As illustrated, the memory 511 may include one or more components or modules that may be implemented by the at least one processor 510 to perform the disclosed functions. While the components or modules are illustrated as software 512 in memory 511 that is executable by the at least one processor 510, it should be understood that the components or modules may be stored in another computer readable medium or may be dedicated hardware either in the at least one processor 510 or off the processor. A number of software modules and data tables may reside in the memory 511 and be utilized by the at least one processor 510 in order to manage both communications and the functionality described herein. It should be appreciated that the organization of the contents of the memory 511 as shown is merely exemplary, and as such the functionality of the modules and/or data structures may be combined, separated, and/or be structured in different ways depending upon the implementation.

The memory 511, for example, may include a positioning session module 572 that when implemented by the one or more processors 510 configures the one or more processors 510 to engage in a positioning session for the UE. For example, the one or more processors 510 may be configured to engage in a positioning session by providing positioning capabilities to a location server, via the transceiver 515. The one or more processors 510 may be configured to receive positioning assistance data including a PRS schedule, and DL PRS muting configurations from a location server and/or serving base station, via the transceiver 515, such as wireless transceiver 540. The one or more processors 510 may be configured to receive PRS beams based on the muting schedule and to perform positioning measurements, e.g., using the transceiver 515. The one or more processors 510 may further be configured to estimate a position estimate using the positioning measurements and base station location information received in assistance data in UE based positioning or to provide a measurement information report, via the transceiver 515, to a network node, such as location server, for UE assisted positioning.

Figure 6:
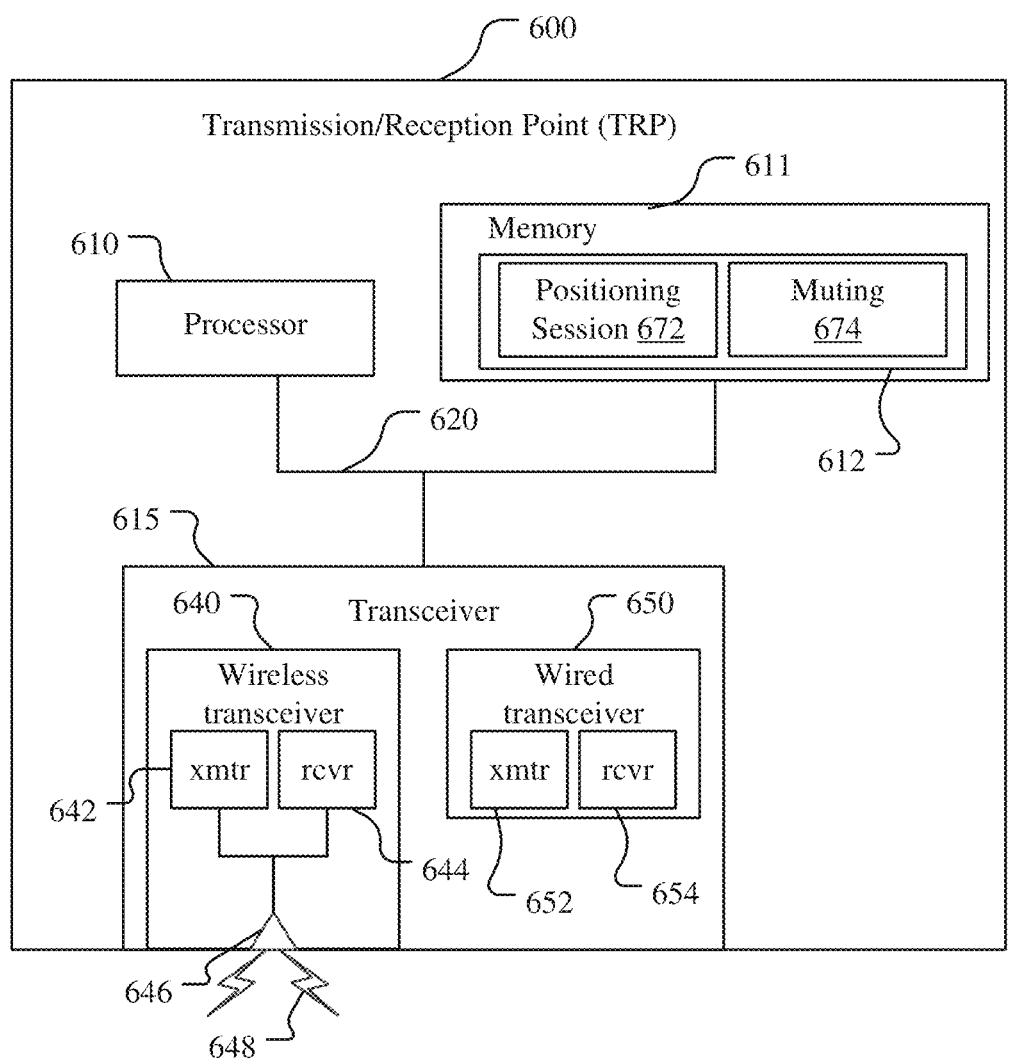
FIG. 6 shows an example of a base station capable of providing assistance data including a slot type based PRS muting configuration.

FIG. 6 shows an example of a TRP 600 of the base stations 102, 180, capable of providing assistance data including a slot type based PRS muting configuration. The TRP 600 includes a computing platform including a at least one processor 610, memory 611 including software (SW) 612, and a transceiver 615. The at least one processor 610, the memory 611, and the transceiver 615 may be communicatively coupled to each other by a bus 620 (which may be configured, e.g., for optical and/or electrical communication). One or more of the shown apparatus (e.g., a wireless interface) may be omitted from the TRP 600. The at least one processor 610 may include one or more intelligent hardware devices, e.g., a central processing unit (CPU), a microcontroller, an application specific integrated circuit (ASIC), etc. The at least one processor 610 may comprise multiple processors (e.g., including one or more of an application processor, a DSP, a modem processor, a video processor, and/or a sensor processor, similar to that shown in FIG. 5). The memory 611 is a non-transitory storage medium that may include random access memory (RAM)), flash memory, disc memory, and/or read-only memory (ROM), etc. The memory 611 stores the software 612 which may be processor-readable, processor-executable software code containing instructions that are configured to, when executed, cause the at least one processor 610 to operate as a special purpose computer programmed to perform the various functions described herein. Alternatively, the software 612 may not be directly executable by the at least one processor 610 but may be configured to cause the at least one processor 610, e.g., when compiled and executed, to operate as a special purpose computer to perform the various functions described herein. The description may refer only to the at least one processor 610 performing a function, but this includes other implementations such as where the at least one processor 610 executes software and/or firmware. The description may refer to the at least one processor 610 performing a function as shorthand for one or more of the processors contained in the at least one processor 610 performing the function. The description may refer to the TRP 600 performing a function as shorthand for one or more appropriate components of the TRP 600 (and thus of one of the base stations 102, 180) performing the function. The at least one processor 610 may include a memory with stored instructions in addition to and/or instead of the memory 611. Functionality of the at least one processor 610 is discussed more fully below.

The transceiver 615 may include a wireless transceiver 640 and a wired transceiver 650 configured to communicate with other devices through wireless connections and wired connections, respectively. For example, the wireless transceiver 640 may include a transmitter 642 and receiver 644 coupled to one or more antennas 646 for transmitting (e.g., on one or more uplink channels and/or one or more downlink channels) and/or receiving (e.g., on one or more downlink channels and/or one or more uplink channels) wireless signals 648 and transducing signals from the wireless signals 648 to wired (e.g., electrical and/or optical) signals and from wired (e.g., electrical and/or optical) signals to the wireless signals 648. The antenna 646 is one or more antenna array capable of beam forming and transmitting beams, including PRS beams in a specific direction with a beam width. The transmitter 642 may include multiple transmitters that may be discrete components or combined/integrated components, and/or the receiver 644 may include multiple receivers that may be discrete components or combined/integrated components. The wireless transceiver 640 may be configured to communicate signals (e.g., with the UE 500, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 650 may include a transmitter 652 and a receiver 654 configured for wired communication, e.g., with the network 135 to send communications to, and receive communications from, the location server 172, for example. The transmitter 652 may include multiple transmitters that may be discrete components or combined/integrated components, and/or the receiver 654 may include multiple receivers that may be discrete components or combined/integrated components. The wired transceiver 650 may be configured, e.g., for optical communication and/or electrical communication.

The configuration of the TRP 600 shown in FIG. 6 is an example and not limiting of the invention, including the claims, and other configurations may be used. For example, the description herein discusses that the TRP 600 is configured to perform or performs several functions, but one or more of these functions may be performed by the location server 172 and/or the UE 500 (i.e., the location server 172 and/or the UE 500 may be configured to perform one or more of these functions).

The memory 611 may store software 612 that contains executable program code or software instructions that when executed by the at least one processor 610 may cause the at least one processor 610 to operate as a special purpose computer programmed to perform the functions disclosed herein. As illustrated, the memory 611 may include one or more components or modules that may be implemented by the at least one processor 610 to perform the disclosed functions. While the components or modules are illustrated as software 612 in memory 611 that is executable by the at least one processor 610, it should be understood that the components or modules may be stored in another computer readable medium or may be dedicated hardware either in the at least one processor 610 or off the processor. A number of software modules and data tables may reside in the memory 611 and be utilized by the at least one processor 610 in order to manage both communications and the functionality described herein. It should be appreciated that the organization of the contents of the memory 611 as shown is merely exemplary, and as such the functionality of the modules and/or data structures may be combined, separated, and/or be structured in different ways depending upon the implementation.

The memory 611, for example, may include positioning session module 672 that when implemented by the at least one processor 610 configures the at least one processor 610 to engage in a positioning session for the UE. For example, the one or more processors 610 may be configured to provide PRS beam configuration information to a location server, and to transmit PRS beams per the PRS beam configuration, via the transceiver 615, and to receive a PRS schedule and muting configuration from the location server. The one or more processors 610 may be further configured to receive and transmit message between the UE and location server one or more messages according to LPP, including Request Capabilities; Provide Capabilities; Request Priority, Provide Priority, Request Assistance Data; Provide Assistance Data; Request Location Information; Provide Location Information; Abort; and Error.

The memory 611, for example, may include muting module 674 that when implemented by the one or more processors 610 configures the one or more processors 610 to obtain PRS muting configuration based on the slot type in which the PRS is transmitted, e.g., either by generating the PRS muting configuration or receiving the PRS muting configuration from the location server. The PRS muting configuration may be at least partially based on the base stations capability to perform self-interference cancellation. In some implementations, the one or more processors 610 may be configured to send an indication of the capability to perform self-interference cancellation to the location server. The one or more processors 610 may further be configured to obtain intra-slot muting configuration, inter-instance muting configuration, and intra-instance muting configuration, or a combination thereof, and to combine two or more muting configurations. The one or more processors 610 may further be configured provide the muting configuration, e.g., the slot type based PRS muting configuration to the UE, e.g., using lower layer communications, and/or to the location server.

Figure 7:
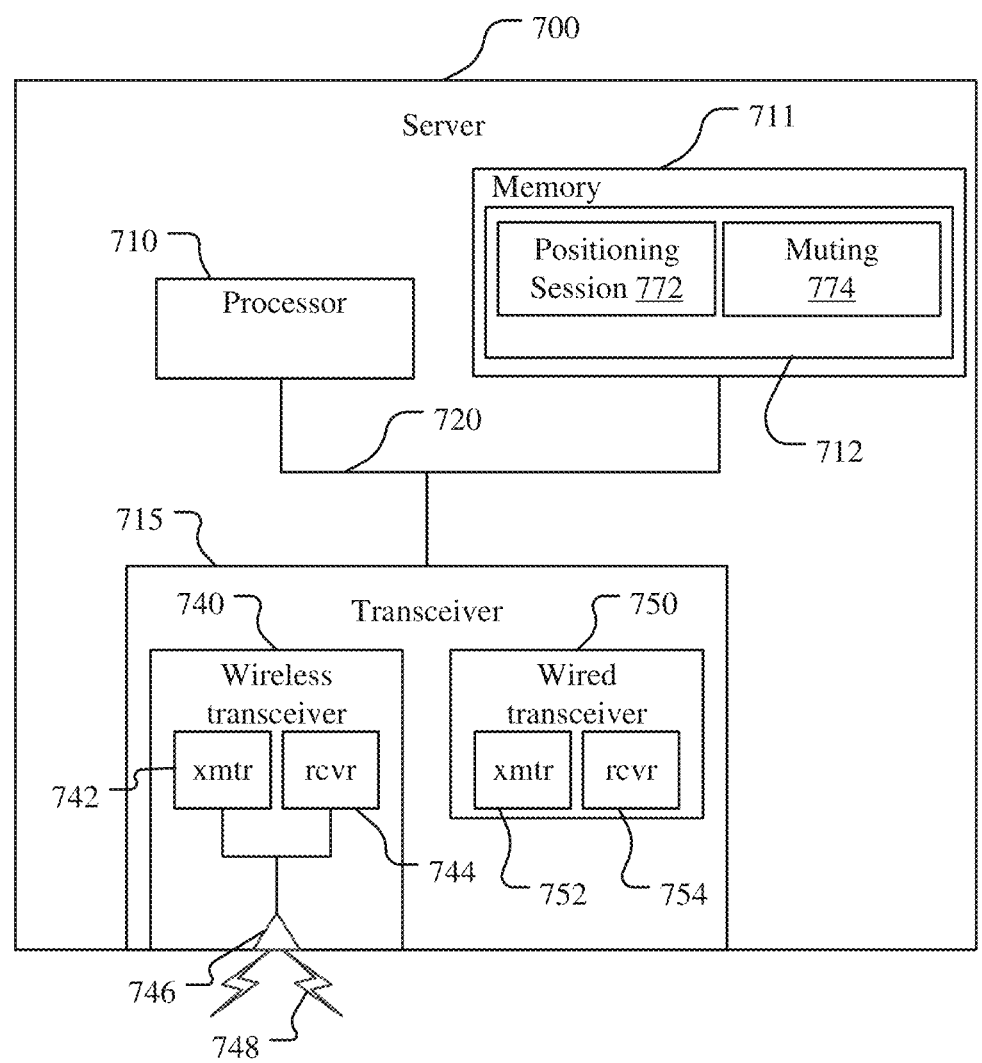
FIG. 7 shows a server capable of providing assistance data including a slot type based PRS muting configuration.

FIG. 7 shows a server 700, which is an example of the location server 172, such as LMF 270, capable of providing assistance data including a slot type based PRS muting configuration. The server 700 includes a computing platform including at least one processor 710, memory 711 including software (SW) 712, and a transceiver 715. The at least one processor 710, the memory 711, and the transceiver 715 may be communicatively coupled to each other by a bus 720 (which may be configured, e.g., for optical and/or electrical communication). One or more of the shown apparatus (e.g., a wireless interface) may be omitted from the server 700. The at least one processor 710 may include one or more intelligent hardware devices, e.g., a central processing unit (CPU), a microcontroller, an application specific integrated circuit (ASIC), etc. The at least one processor 710 may comprise multiple processors (e.g., including at least one of an application processor, a DSP, a modem processor, a video processor, and/or a sensor processor, similar to that shown in FIG. 5). The memory 711 is a non-transitory storage medium that may include random access memory (RAM)), flash memory, disc memory, and/or read-only memory (ROM), etc. The memory 711 stores the software 712 which may be processor-readable, processor-executable software code containing instructions that are configured to, when executed, cause the at least one processor 710 to operate as a special purpose computer programmed to perform the various functions described herein. Alternatively, the software 712 may not be directly executable by the at least one processor 710 but may be configured to cause the at least one processor 710, e.g., when compiled and executed, to operate as a special purpose computer to perform the various functions described herein. The description may refer only to the at least one processor 710 performing a function, but this includes other implementations such as where the at least one processor 710 executes software and/or firmware. The description may refer to the at least one processor 710 performing a function as shorthand for one or more of the processors contained in the at least one processor 710 performing the function. The description may refer to the server 700 performing a function as shorthand for one or more appropriate components of the server 700 performing the function. The at least one processor 710 may include a memory with stored instructions in addition to and/or instead of the memory 711. Functionality of the at least one processor 710 is discussed more fully below.

The transceiver 715 may include a wireless transceiver 740 and a wired transceiver 750 configured to communicate with other devices through wireless connections and wired connections, respectively. For example, the wireless transceiver 740 may include a transmitter 742 and receiver 744 coupled to one or more antennas 746 for transmitting (e.g., on one or more downlink channels) and/or receiving (e.g., on one or more uplink channels) wireless signals 748 and transducing signals from the wireless signals 748 to wired (e.g., electrical and/or optical) signals and from wired (e.g., electrical and/or optical) signals to the wireless signals 748. Thus, the transmitter 742 may include multiple transmitters that may be discrete components or combined/integrated components, and/or the receiver 744 may include multiple receivers that may be discrete components or combined/integrated components. The wireless transceiver 740 may be configured to communicate signals (e.g., with the UE 500, one or more other UEs, and/or one or more other devices) according to a variety of radio access technologies (RATs)

such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 750 may include a transmitter 752 and a receiver 754 configured for wired communication, e.g., with the network 135 to send communications to, and receive communications from, the TRP 600, for example. The transmitter 752 may include multiple transmitters that may be discrete components or combined/integrated components, and/or the receiver 754 may include multiple receivers that may be discrete components or combined/integrated components. The wired transceiver 750 may be configured, e.g., for optical communication and/or electrical communication.

The configuration of the server 700 shown in FIG. 7 is an example and not limiting of the invention, including the claims, and other configurations may be used. For example, the wireless transceiver 740 may be omitted. Also or alternatively, the description herein discusses that the server 700 is configured to perform or performs several functions, but one or more of these functions may be performed by the TRP 600 and/or the UE 500 (i.e., the TRP 600 and/or the UE 500 may be configured to perform one or more of these functions).

The memory 711 may store software 712 that contains executable program code or software instructions that when executed by the at least one processor 710 may cause the at least one processor 710 to operate as a special purpose computer programmed to perform the functions disclosed herein. As illustrated, the memory 711 may include one or more components or modules that may be implemented by the at least one processor 710 to perform the disclosed functions. While the components or modules are illustrated as software 712 in memory 711 that is executable by the at least one processor 710, it should be understood that the components or modules may be stored in another computer readable medium or may be dedicated hardware either in the at least one processor 710 or off the processor. A number of software modules and data tables may reside in the memory 711 and be utilized by the at least one processor 710 in order to manage both communications and the functionality described herein. It should be appreciated that the organization of the contents of the memory 711 as shown is merely exemplary, and as such the functionality of the modules and/or data structures may be combined, separated, and/or be structured in different ways depending upon the implementation.

The memory 711, for example, may include a positioning session module 772 that when implemented by the at least one processor 710 configures the at least one processor 710 to engage in a positioning session for the UE. For example, the one or more processors 710 may be configured to receive PRS beam configuration information from base stations and to generate assistance data for positioning the UE that includes the PRS schedule and muting configurations, and to provide the PRS schedule and muting configurations to the base station and the UE, e.g., in assistance data. The one or more processors 610 may be further configured to from and transmit to a UE one or more messages according to LPP, including Request Capabilities; Provide Capabilities; Request Priority, Provide Priority, Request Assistance Data; Provide Assistance Data; Request Location Information; Provide Location Information; Abort; and Error.

The memory 711, for example, may include muting module 774 that when implemented by the one or more processors 710 configures the one or more processors 710 to generate or receive a PRS muting configuration based on the slot type in which the PRS is transmitted which may be at least partially based on the base stations capability to perform self-interference cancellation, which the one or more processors 710 may be configured to receive from the base station. The one or more processors 710 may further be configured to generate or receive intra-slot muting configuration, as well as inter-instance muting configuration, and intra-instance muting configuration, or a combination thereof, and to combine two or more muting configurations. The one or more processors 710 may further be configured provide the muting configuration, e.g., the slot type based PRS muting configuration to the base station and the UE, e.g., using lower layer communications.

The TRP 102 may be configured, e.g., by instructions received from the server 172 and/or by the software, to send downlink positioning reference signals (DL-PRS) per a schedule. According to the schedule, the TRP 102 may send the DL-PRS signals intermittently, e.g., periodically at a consistent interval from an initial transmission. The TRP 102 may be configured to send one or more PRS resource sets. Each of the resource sets comprises multiple resources, with each resource being a beam transmitted by the TRP 102, and each resource being configured with a slot offset, a symbol offset within a slot, and a number of consecutive symbols that the resource may occupy. Each PRS resource is associated with one antenna port or beam, transmits a DL-PRS signal, and may repeat the transmission across slots, with each transmission being called a repetition such that there may be multiple repetitions in a resource. Each PRS resource set is associated with a periodicity. Every time all repetitions of all PRS resources of the PRS resource set are configured to be transmitted is referred as an "instance". Therefore, an "instance" of a PRS resource set is a specified number of repetitions for each resource and a specified number of resources within the resource set such that once the specified number of repetitions are transmitted for each of the specified number of resources, the instance is complete. An instance may also be referred to as an "occasion."

Figure 8:
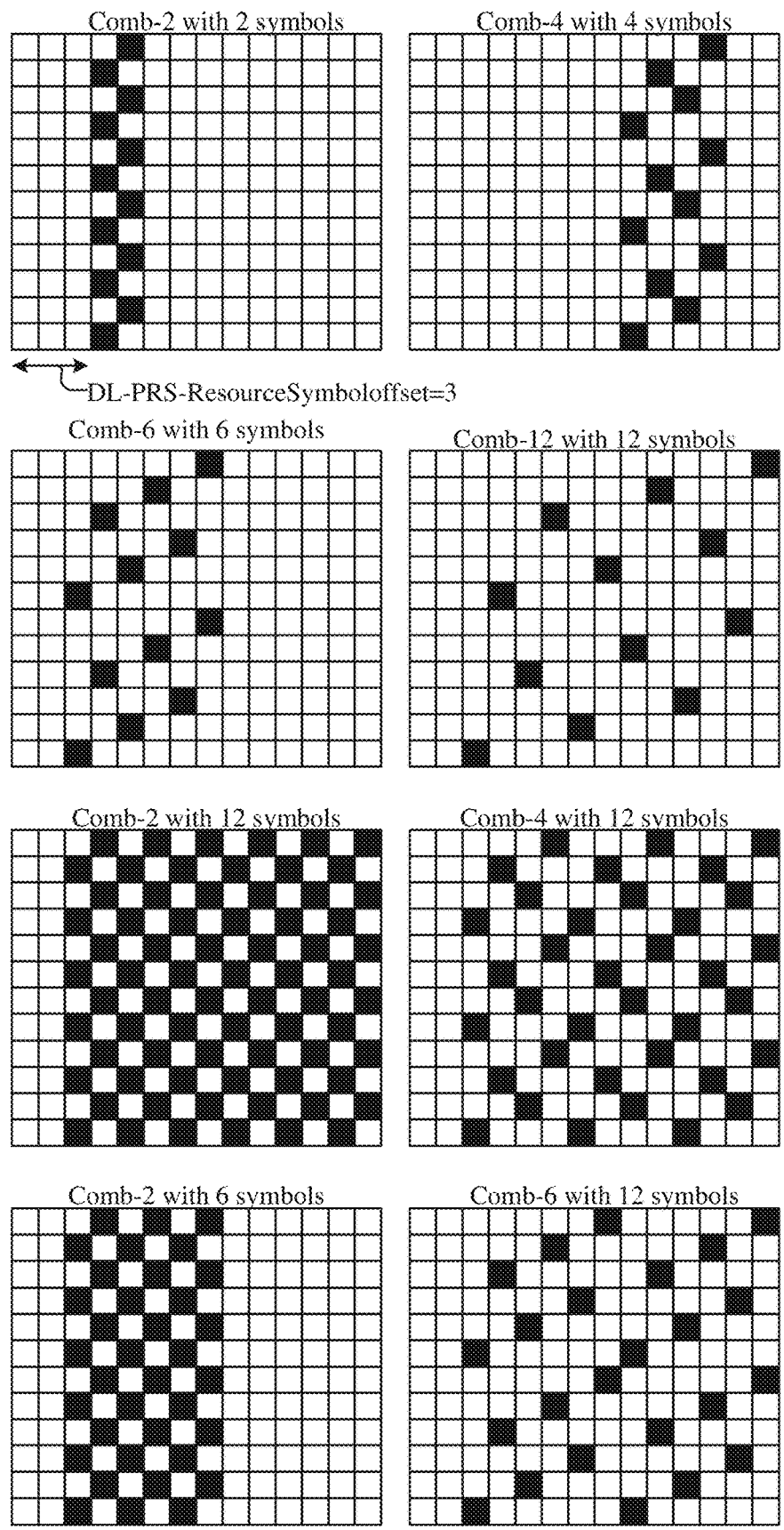
FIG. 8 illustrates various possible patterns for DL PRS resources within a slot.

FIG. 8 illustrates various possible patterns for DL PRS resources within a slot. A PRS resource, for example, is scheduled with a time and subcarrier of when and which resource elements are sounded (modulated with a signal) for conveying the PRS signal. In the transmission schedules shown in FIG. 8, columns represent different symbols, rows represent different subcarriers, and darkened boxes represent sounded resource elements (symbol-subcarrier combinations) for a TRP. Unsounded resource elements (undarkened boxes) may be sounded by one or more other TRPs. For example, as illustrated in FIG. 8, within a slot, a DL PRS resource may span 2, 4, 6, or 12 consecutive symbols, with a fully frequency-domain staggered pattern, referred to as a "comb." The DL PRS resource may be configured in any high layer configured DL or frequency layer (FL) symbol of a slot, with a constant Energy Per Resource Element (EPRE) for all REs of a given DL PRS Resource. Table 2 illustrates various possible patterns of symbols and comb, which is shown visually in FIG. 8.

TABLE 2

|         | 2 symbols | 4 symbols    | 6 symbols         | 12 symbols                            |
|---------|-----------|--------------|-------------------|---------------------------------------|
| Comb-2  | {0, 1}    | {0, 1, 0, 1} | {0, 1, 0, 1, 0, 1}| {0, 1, 0, 1, 0, 1, 0, 1, 0, 1, 0, 1}  |
| Comb-4  | NA        | {0, 2, 1, 3} | NA                | {0, 2, 1, 3, 0, 2, 1, 3, 0, 2, 1, 3} }|
| Comb-6  | NA        | NA           | {0, 3, 1, 4, 2, 5}| {0, 3, 1, 4, 2, 5, 0, 3, 1, 4, 2, 5}  |
| Comb-12 | NA        | NA           | NA                | {0, 6, 3, 9, 1, 7, 4, 10, 2, 8, 5, 11}|

A collection of PRS resources across one TRP is a PRS resource set. Each PRS resource within a PRS resource set have the same periodicity, which may be $2^\mu\{4, 5, 8, 10, 16, 20, 32, 40, 64, 80, 160, 320, 640, 1280, 2560, 5120, 10240\}$ slots, with $\mu=0, 1, 2, 3$. The PRS resources within a PRS resource set conventionally have a common muting pattern configuration and have the same repetition factor across slots, e.g., repetition values of $\{1, 2, 4, 6, 8, 16, 32\}$ slots.

A collection of PRS resource sets across one or more TRPs is a positioning frequency layer. Each PRS resource set within a positioning frequency layer has the same subcarrier spacing and cyclic prefix. All numerologies supported for Physical Data Shared Channel (PDSCH) are supported for PRS. Each PRS resource set within a positioning frequency layer further has the same point-A, e.g., a common reference point, and takes the values Absolute Radio-Frequency Channel Number (ARFCN-ValueNR). The PRS resource sets within a positioning frequency layer have the same value of DL PRS bandwidth, e.g., with a granularity of 4 PRBs with a minimum of 24 PRBs and a maximum of 272 PRBs, as well as the same start PRB and center frequency, and the same value of comb-size.

There may be up to 2 PRS resource sets per TRP and 3 TRPs per frequency layer. Up to 4 positioning frequency layers are defined in release 16.

The DL PRS resource may be repeated a number of times within a single instance of the PRS resource set. For example, the number of repetitions may be defined by PRS-ResourceRepetitionFactor information element (IE), and may have a value of 1, 2, 4, 6, 8, 16, 32. Additionally, the DL PRS resource repetitions may be offset in units of slots between two repeated instances of a DL PRS Resource corresponding to the same PRS Resource ID within a single instance of the DL PRS Resource Set. The offset between repetitions of DL PRS resources may be defined by PRS-ResourceTimeGap, and may have a value of 1, 2, 4, 8, 16, 32. The time duration spanned by one DL PRS resource set containing DL PRS resources should not exceed the PRS periodicity. Repetition of DL PRS resources may be used for Rx beam sweeping across repetitions, and combining gains for coverage extension. Further, repetition of DL resources may be used, e.g. for intra-instance muting as discussed below.

Figure 9:
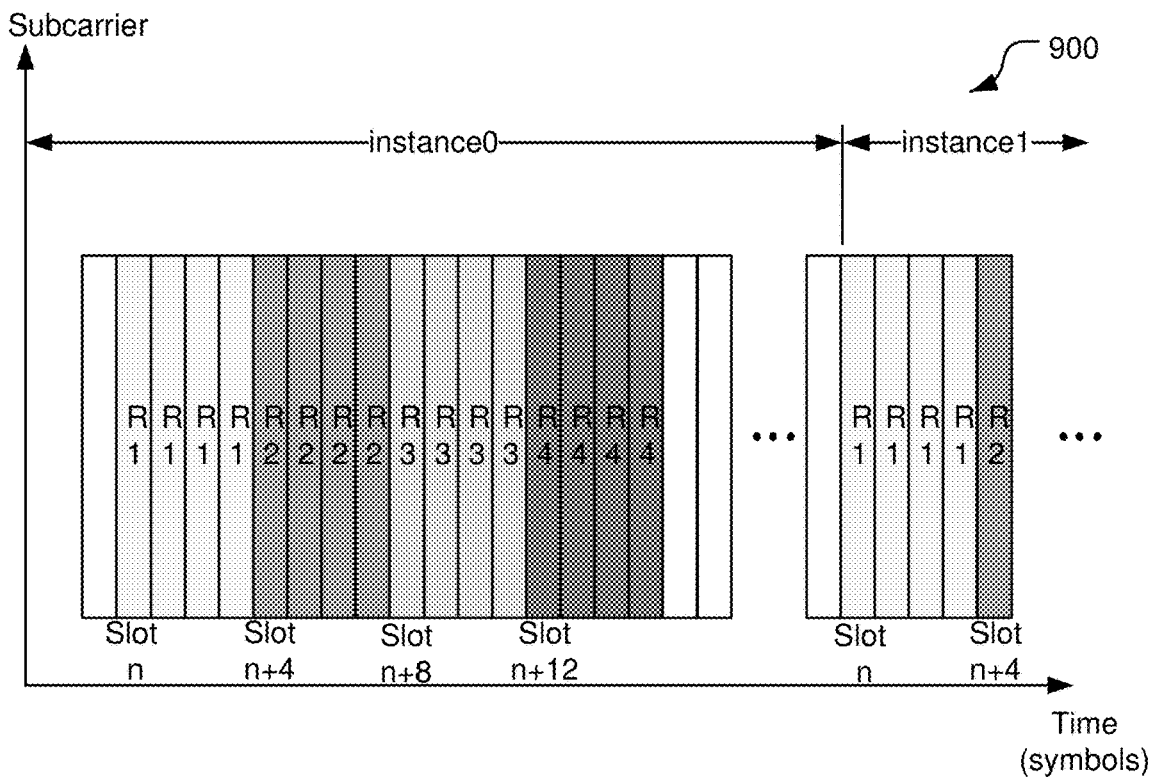
FIG. 9 illustrates an example of an instance of a PRS resource set.

FIG. 9, for example, illustrates an example instance of a PRS resource set 900, and a portion of another instance. The PRS resource set 900 is illustrated with four PRS resources R1, R2, R3, R4, with a repetition of 4 and a time gap of 1 slot. As illustrated, there are four repetitions of each resource in each instance, for example, there are four repetitions for the resource R1 which are separated by 1 slot from slot n to slot n+3.

Figure 10:
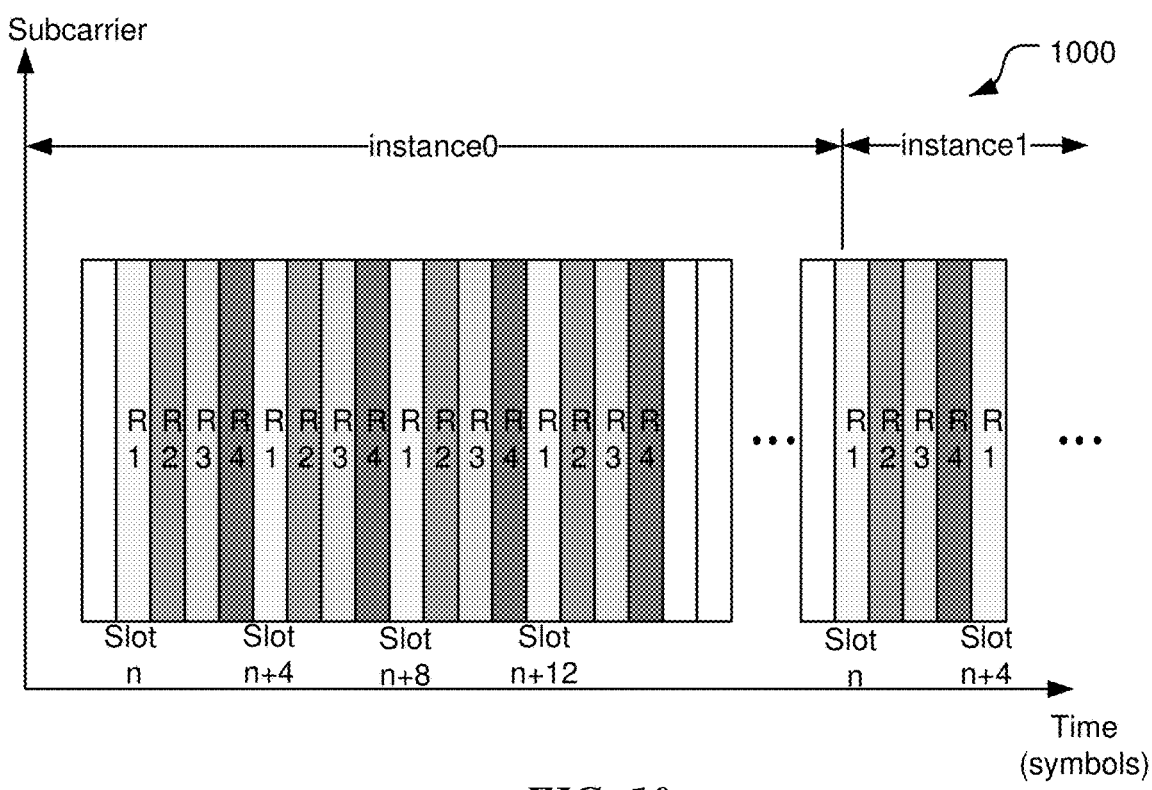
FIG. 10 illustrates another example of an instance of a PRS resource set.

FIG. 10 illustrates another example instance of a PRS resource set 1000, and a portion of another instance. The PRS resource set 1000 is illustrated with four PRS resources R1, R2, R3, R4, with a repetition of 4 and a time gap of 4 slots. Similar to FIG. 9, as illustrated, there are four repetitions of each resource in each instance, but with PRS resource set 1000, each repetition of a recourse is separated by 4 slots, for example, there are four repetitions for the resource R1 that are separated by 4 slots, e.g., at slots n, n+4, n+8, and n+12.

A positioning signal muting configuration such as a PRS muting configuration (also called a PRS muting pattern) is a time schedule of when to mute a transmission schedule and when not to mute the transmission schedule. The PRS resources may be muted, e.g., by turning off (or transmitting with zero power) a regularly scheduled PRS transmission, which may be used to prevent interference, e.g., commonly caused by PRS signals from different TRPs overlapping at the same or almost the same time. A PRS muting configuration may be represented by a bitmap (i.e., a bit string) indicating when a PRS is to be muted and when the PRS is not to be muted, and thus the term bitmap and the term muting configuration are used interchangeably herein. For example, a bit value of "1" may indicate not to mute the corresponding PRS signal(s) transmission and a bit value of "0" may indicate to mute the corresponding PRS signal(s) transmission. The bitmap size, for example, may be between 2, 4, 8, 16, 32 bits. Conventionally, inter-instance muting and intra-instance muting are supported.

The muting configuration may be inter-instance, in which case each bit in the bitmap indicates whether to mute all the PRS repetitions of all PRS resources in the corresponding configurable number of instances. Thus, when a bit in the bitmap is set to indicate muting, all DL-PRS resources within a DL-PRS resource set instance are muted.

The muting configuration may be intra-instance in which case each bit in the bitmap indicates whether to mute a corresponding PRS repetition of all PRS resources in an instance. Thus, each bit in the bitmap corresponds to a single repetition index for each of the DL-PRS Resources within an instance of a DL-PRS resource set, and when a bit in the bitmap is set to indicate muting, the indicated repetition of the DL-PRS resource within a DL-PRS resource set instance is muted. For example, the length of the bitmap for intra-instance muting is equal to DL-PRS-ResourceRepetitionFactor.

Thus, for an example of inter-instance muting with bitmap of 1010, transmission of the 0th and 2nd instances is not muted, and transmission of the 1st and 3rd instances is muted. For the same bitmap of 1010 but with intra-instance muting, transmission of the 0th and 2nd repetitions within each instance is not muted, and transmission of the 1st and 3rd repetitions in each instance is muted.

Figure 11:
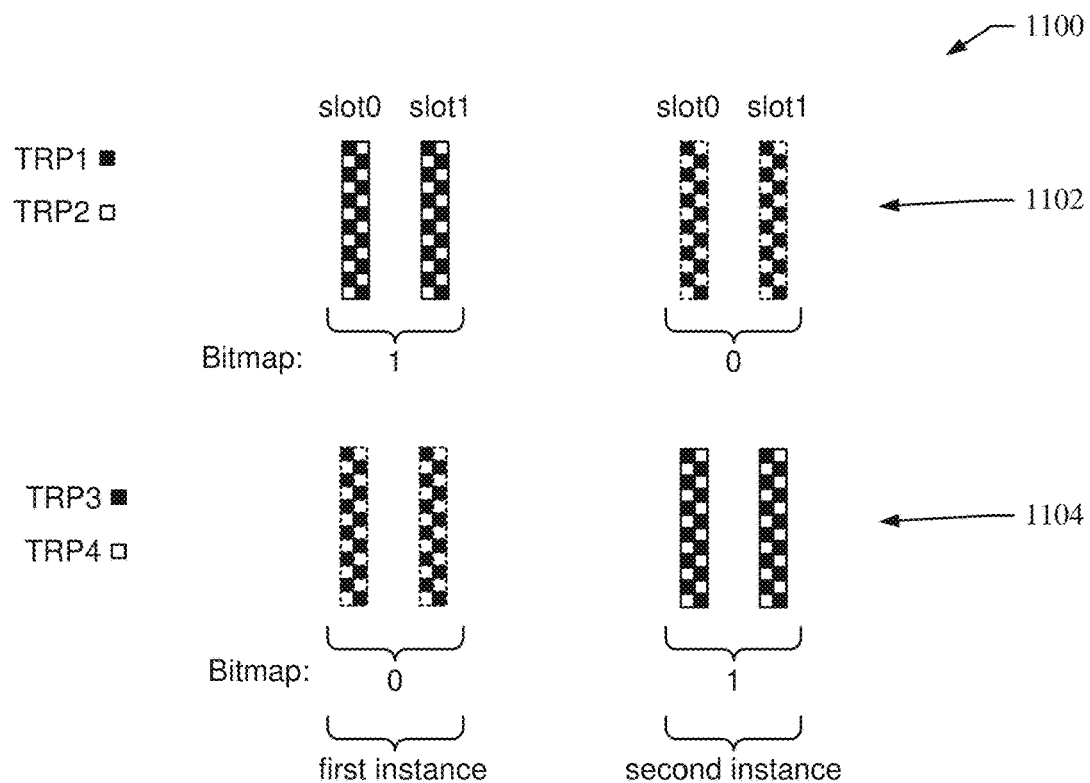
FIG. 11 illustrates an example of an inter-instance PRS muting configuration.

FIG. 11, for example, illustrates an example of an inter-instance PRS muting configuration 1100 for a scenario of four TRPs transmitting PRS having comb-2, 2 symbols per PRS resource repetition, and two repetitions per instance. As illustrated, there are four TRPs (TRP1, TRP2, TRP3, TRP4). Each TRP transmits a PRS of comb-2/2-symbol with repetition of 2 in consecutive slots. Comb-K indicates that in each symbol, the transmission scheduled is for each TRP to transmit in every Kth subcarrier, with each TRP transmitting using different subcarriers in each symbol. Consequently, the different TRPs are frequency-division multiplexed to use different subcarriers to transmit PRS signals such that the PRS signals from different TRPs transmitted concurrently are frequency orthogonal to help prevent collisions between the PRS signals. Further, the TRPs may switch subcarriers, called staggering, for different symbols within a repetition to help fill holes in the frequency domain to help eliminate aliases in the time domain. As illustrated, TRP1 and TRP2 are illustrated in a first row 1102, with darkened and undarkened squares, respectively, and TRP3 and TRP4 are illustrated in a second row 1104, with darkened and undarkened squares, respectively. The two repetitions per instance in this example are transmitted in consecutive slots (slot0 and slot1).

In the inter-instance PRS muting configuration shown in FIG. 11, each TRP is configured with a 2-bit bitmap with each bit corresponding to each of the two instances e.g., the first instance and second instance. If the value of the bit is "1" the TRP transmits in that instance, and if the bit value is "0" the TRP mutes all repetition of the PRS resource in that specific instance. The TRP1 and TRP2 pair, shown in row 1102, has a bitmap muting configuration of "10" and the TRP3 and TRP4 pair, shown in row 1104, has a bitmap muting configuration of "01" in this example. In the inter-instance muting shown, all DL-PRS resource repetitions within a DL-PRS resource set instance are muted for a DL-PRS resource set instance that is indicated to be muted by the bitmap.

As can be seen, in the inter-instance PRS muting configuration 1100, the UE 104 will need to receive both instances (the first instance and the second instance) in order to obtain PRS from all four TRPs. This is because, in the first instance, TRP1 and TRP2 will transmit PRS in both repetitions (slot0 and slot1) while TRP3 and TRP4 are muted, and in the second instance only TRP3 and TRP4 will transmit PRS in both repetitions (slot0 and slot1) while TPR1 and TRP2 are muted.

Figure 12:
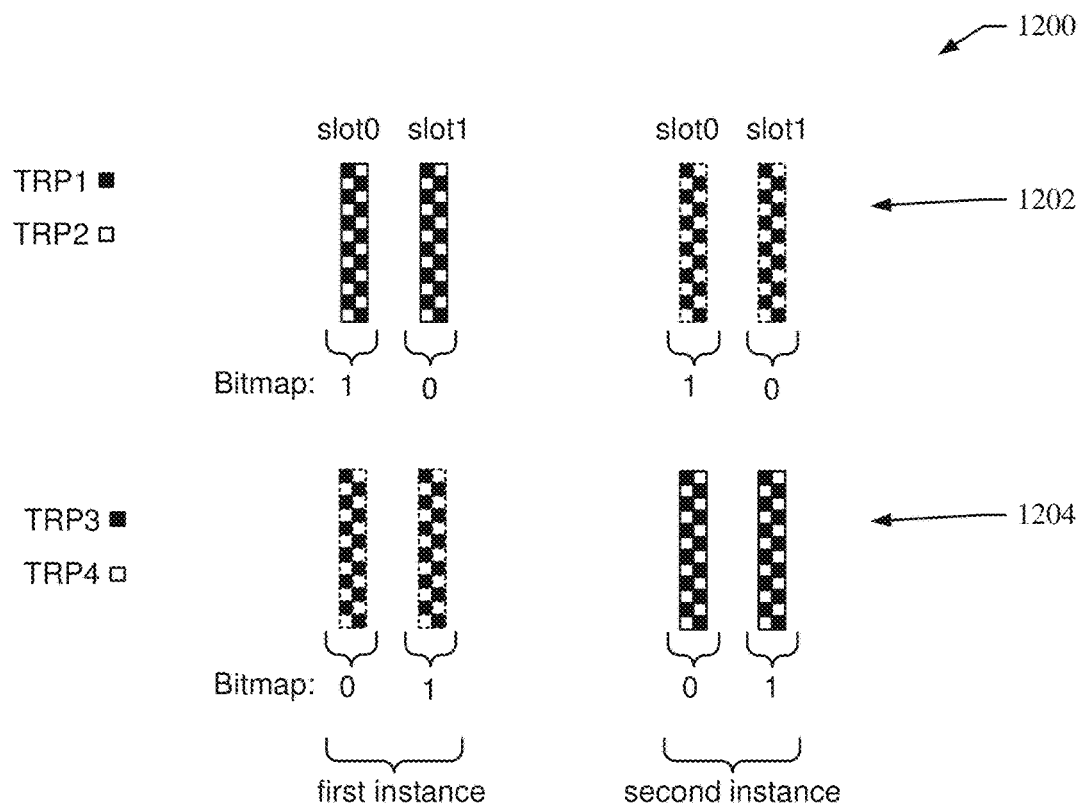
FIG. 12 illustrates an example of an intra-instance PRS muting configuration.

FIG. 12 is similar to FIG. 11, but illustrates an intra-instance PRS muting configuration 1200. Thus, in FIG. 12 illustrates four TRPs transmitting PRS having comb-2, 2 symbols per PRS resource repetition, and two repetitions per instance. In the intra-instance PRS muting configuration illustrated in FIG. 12, each TRP is configured with a 4-bit bitmap, with each bit corresponding to each of the two repetitions in a single instance. If the value of the bit is "1" the TRP transmits in that repetition index, and if the bit value is "0" the TRP mutes the PRS in that repetition index. The TRP1 and TRP2 pair, shown in row 1202, has a bitmap muting configuration of "1010" and the TRP3 and TRP4 pair, shown in row 1204, has a bitmap muting configuration of "0101" in this example.

In the intra-instance muting configuration shown, each repetition of the PRS, e.g., in slot0 and slot1, are separately indicated to be muted by the bitmap. Thus, as illustrated, the PRS signals from TRP1 and TRP2 are not muted during a first repetition (slot0) during the first instance, and are muted during a second repetition (slot1) during the first instance. Conversely, the PRS signals from TRP3 and TRP4 are muted during the first repetition (slot0) during the first instance, and are not muted during the second repetition (slot1) during the first instance. A similar schedule is followed for the second instance as for the first instance. Accordingly, the UE 104 may measure PRS signals from all four of the TRPs in a single time instance.

Thus, as can be seen in FIGS. 11 and 12, with intra-instance muting (shown in FIG. 12), withing a single instance, each TRP is configured with PRS with repetitions, some of which are muted according to the muting bitmap, up to 32 bits, since there is up to 32 repetition length of one instance. In contrast, with inter-instance muting (shown in FIG. 11), within one instance, all PRS repetitions from a TRP are either muted or not, and the bitmap (up to 32 bits) is used to control the muting across instances. Accordingly, the UE 104 may not receive PRS from one or more TRPs in a single instance, but will receive PRS from the TRPs in a subsequent instance.

In some implementations, inter-instance muting and intra-instance muting may be used together. For example, if a DL-PRS muting pattern is provided for both, the inter-instance muting and intra-instance muting may be combined using a logical operations, such as a logical AND operation, and thus, a DL-PRS resource is transmitted when both bits in the inter-instance muting and the intra-instance muting have the bit value "1," and are otherwise muted.

Figure 13:
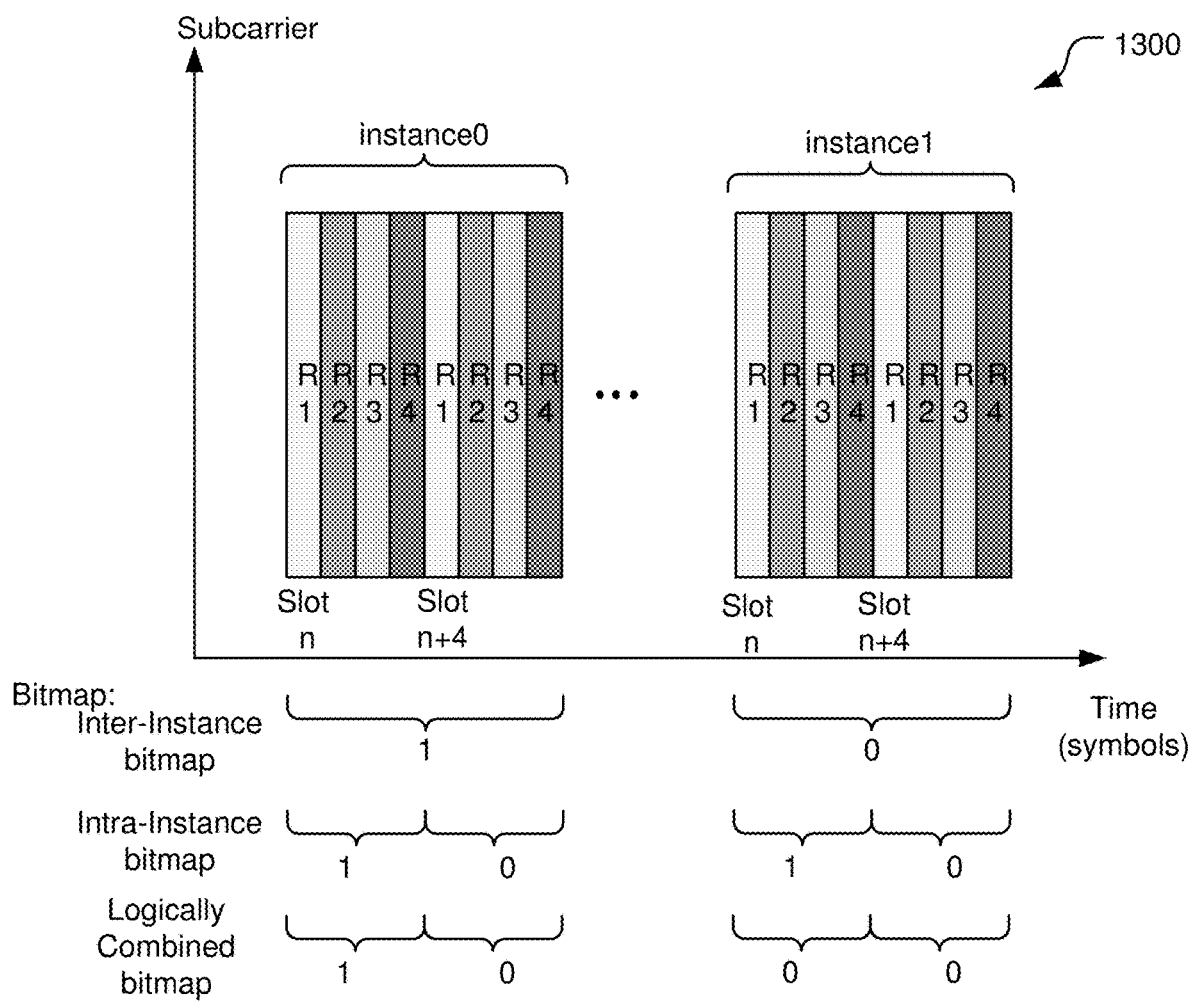
FIG. 13 illustrates two instances of a PRS resource set with inter-instance PRS muting configuration and an intra-instance PRS muting configuration.

FIG. 13, for example, illustrates two instances of PRS resource set 1300, which includes four PRS resources R1, R2, R3, R4, with a repetition of 2 and a time gap of 4 slots. Each of the two repetitions of each resource in each instance is separated by 4 slots, for example, there are two repetitions for the resource R1 that are separated by 4 slots, e.g., at slots n and n+4, in both instances (e.g., instance0 and instance1).

An inter-instance bitmap is provided, with each TRP that transmits a PRS resource configured with a 2-bit bitmap (e.g., "10"). Each bit corresponding to each of the two instances e.g., the instance0 and instance1. If the value of the bit is "1," all PRS resources are transmitted in that instance, and if the bit value is "0," no PRS resources are transmitted in that specific instance. Additionally, an intra-instance bitmap is provided with each TRP that transmits a PRS resource configured with a 4-bit bitmap (e.g., "1010"). Each bit corresponds to a repetition index in a single instance. If the value of the bit is "1," all PRS resources in that repetition index are transmitted, and if the bit value is "0," no PRS resources are transmitted in that specific repetition index.

As illustrated, the inter-instance muting bitmap and the intra-instance muting bitmap may be logically combined. In FIG. 13, by way of example, the inter-instance muting bitmap and the intra-instance muting bitmap are combined using a logical AND function, e.g., where PRS resources are transmitted if both the inter-instance muting and the intra-instance muting bit values are "1," and otherwise the PRS resources are muted. Using a logical AND function, the resulting PRS muting bitmap produces a 4-bit bitmap (e.g., "1000"). If desired, other logic functions, e.g., OR, XOR, NAND, NOR, XNOR, may be used to combine the inter-instance muting and the intra-instance muting bitmaps.

Entities in the wireless communications systems 100, shown in FIG. 1, may be capable of full duplex communications. For example, a base station 102 may be capable of transmitting DL signals to one or more UEs, while simultaneously receiving UL transmission from one or more UEs, which may be the same UEs of different UEs. Various forms of full duplex communications are possible, including in-band full duplex communications, in which DL and UL signals are transmitted and received using the same time and frequency resources, and sub-band full duplex communications, in which DL and UL signals are transmitted and received using the same time resources, but different frequency resources. Sub-band full duplex communications are considered full duplex because despite operating in the Time Division Duplex (TDD) spectrum, in which UL and DL are normally TDD, with Sub-band full duplex communications, UL and DL may happen at the same time. Half-duplex communications, on the other hand, refer to DL and UL signals being transmitted and received using the different time resources.

Figures 14A, 14B:
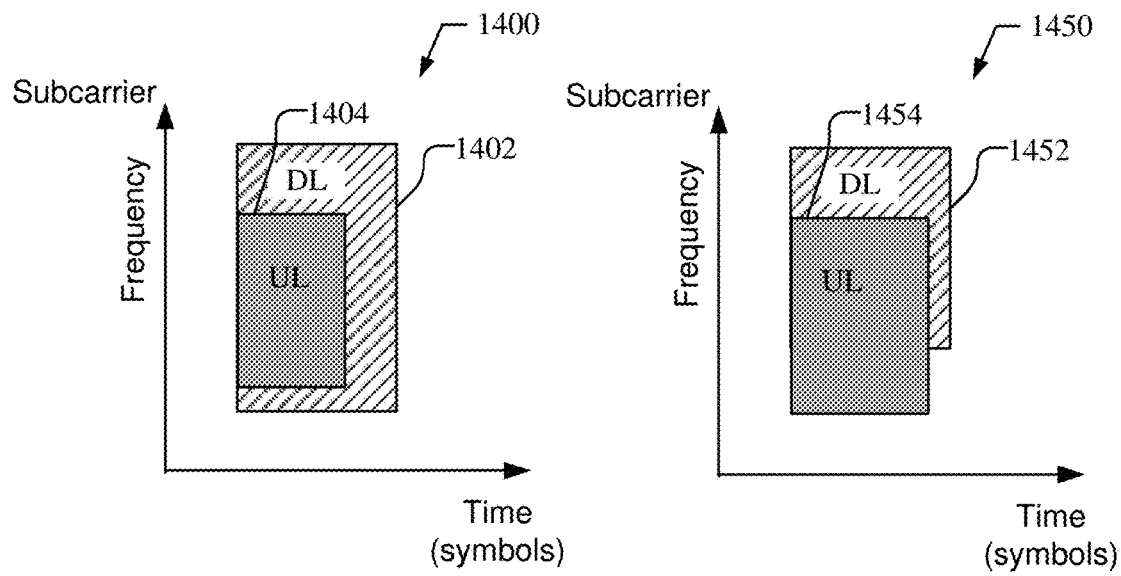
FIGS. 14A and 14B illustrate examples of in-band full duplex (IBFD) communications, in which downlink and uplink signals are transmitted and received at the same time using the same frequency resources.

FIGS. 14A and 14B, for example, illustrate examples of in-band full duplex (IBFD) communications, in which DL signals and UL signals are transmitted and received at the same time using the same frequency resources. FIG. 14A, for example, illustrates IBFD communications 1400 in which DL signals 1402 and UL signals 1404 are transmitted and received on fully overlapping time and frequency resources. FIG. 14B illustrates another example of IBFD communications 1450 in which DL signals 1452 and UL signals 1454 are transmitted and received on partially overlapping time and frequency resources.

Figures 15, 16:
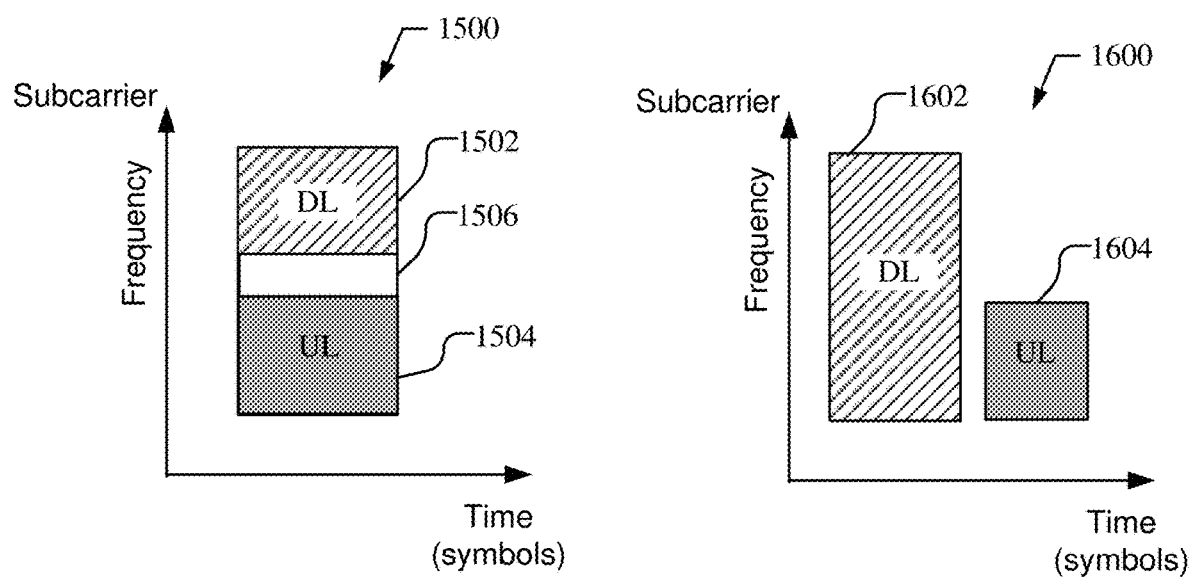
FIG. 15 illustrates an example sub-band full duplex (SBFD) communications in which downlink and uplink signals are transmitted and received at the same time using different frequency resources.
FIG. 16 illustrates half-duplex communications in which downlink and uplink signals are transmitted and received at the different times.

FIG. 15, for example, illustrates another example of full duplex communications, in the form of sub-band full duplex (SBFD) communications 1500, sometimes referred to as flexible duplex. As illustrated, SBFD communication 1500 includes DL signals 1502 and UL signals 1504 that are transmitted and received at the same time but in different frequency domains. For example, a guard band 1506 may be present between the separate frequency resources of the DL signals 1502 and the UL signals 1504.

FIG. 16 illustrates half-duplex communications 1600 by way of contrast to the full duplex communications illustrated in FIGS. 14 and 15. As illustrated in FIG. 16, half-duplex communication 1600 includes DL signals 1602 and UL signals 1604 that are transmitted and received at the different times, e.g., there is no overlap of the DL and UL signals in the time domain.

One difficulty with implementation of full duplex communications is self-interference. For example, when an entity is operating in full duplex mode, transmitted signals by the entity may interfere with signals that are received at the same time.

Figure 17:
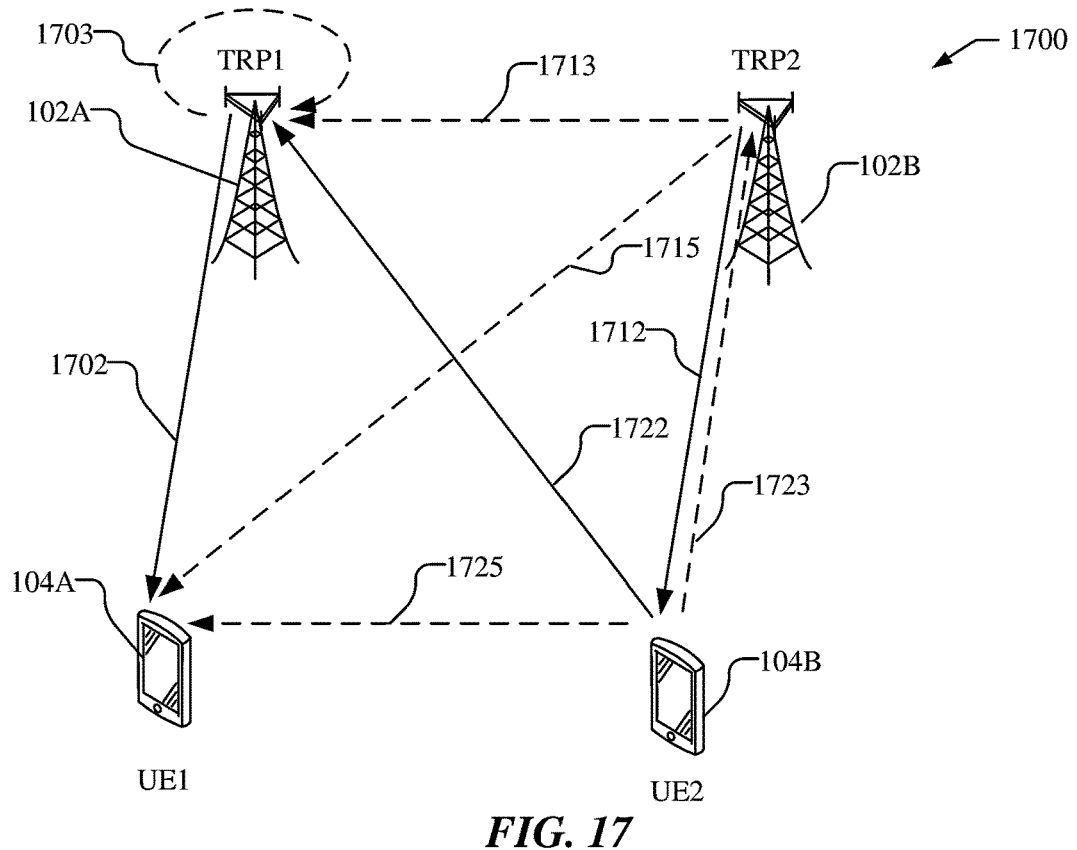
FIG. 17 illustrates an environment including multiple base stations and UEs, in which a base station is subject to self-interference while operating in full duplex mode.

FIG. 17, by way of example, illustrates an environment 1700 includes two base stations 102A and 102B communicating with two UEs 104A and 104B. In FIG. 17, the base station 102A operates in full duplex mode, while base station 102B and UEs 104A and 104B operate in half-duplex mode. Thus, the base station 102A is illustrated as operating in full duplex mode by transmitting DL signals 1702 and receiving UL signal 1722 simultaneously. Base station 102B, which is operating in half-duplex mode is illustrated as transmitting DL signal 1712, which may produce interference (illustrated with dotted lines 1713 and 1715) with base station 102A and UE 104A. The UEs 104A and 104B may be operating in half-duplex mode, e.g., UE 104A receives DL signal 1702 from base station 102A and UE 104B transmit UL signal 1722, which is received by base station 102A. The transmission of UL signal 1722 may produce interference (illustrated with dotted lines 1723 and 1725) with UE 104A and base station 102B.

As illustrated with dotted line 1703, because the base station is operating in full duplex mode and is simultaneously transmitting and receiving signals, the transmission of DL signal 1702 by the base station 102A may produce self-interference with the reception of UL signal 1722.

Figure 18:
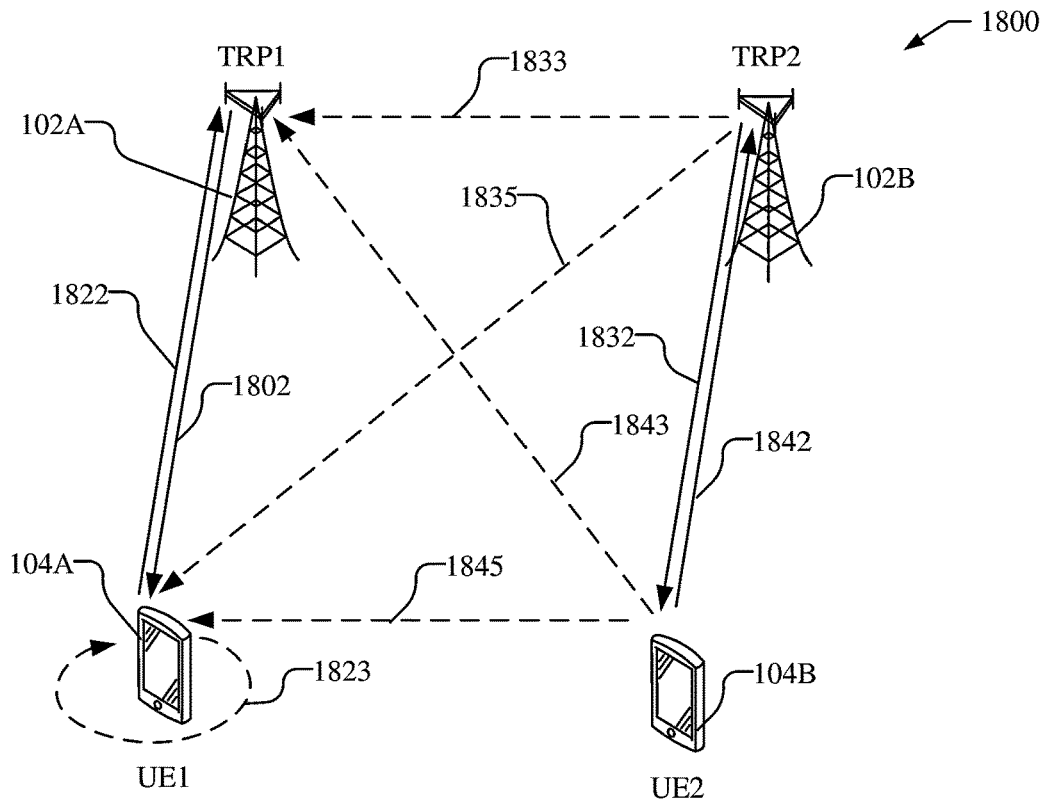
FIG. 18 illustrates an environment including multiple base stations and UEs, in which a UE is subject to self-interference while operating in full duplex mode.

FIG. 18, by way of example, illustrates another environment 1800 that includes two base stations 102A and 102B communicating with two UEs 104A and 104B. In FIG. 18, the base stations 102A and 102B operate in full duplex mode and the UEs 104A and 104B operate in full duplex mode. Thus, the base station 102A is illustrated as communicating with UE 104A in which DL signal 1802 and UL signal 1822 are transmitted and received simultaneously. Similarly, the base station 102B is illustrated as communicating with UE 104B in which DL signal 1832 and UL signal 1842 are transmitted and received simultaneously. FIG. 18 illustrates interference (illustrated with dotted lines 1833 and 1835) at base station 102A and UE 104A from base station 102B and interference (illustrated with dotted lines 1843 and 1845) at base station 102A and UE 104A from UE 104B. Additionally, as illustrated with dotted line 1823, because the UE 104A is operating in full duplex mode and is simultaneously transmitting and receiving signals, the transmission of UL signal 1822 by the UE 104A may produce self-interference with the reception of DL signal 1802. Self-interference may similarly occur in each of the base station 102A, base station 102B and UE 104B.

Figure 19A:
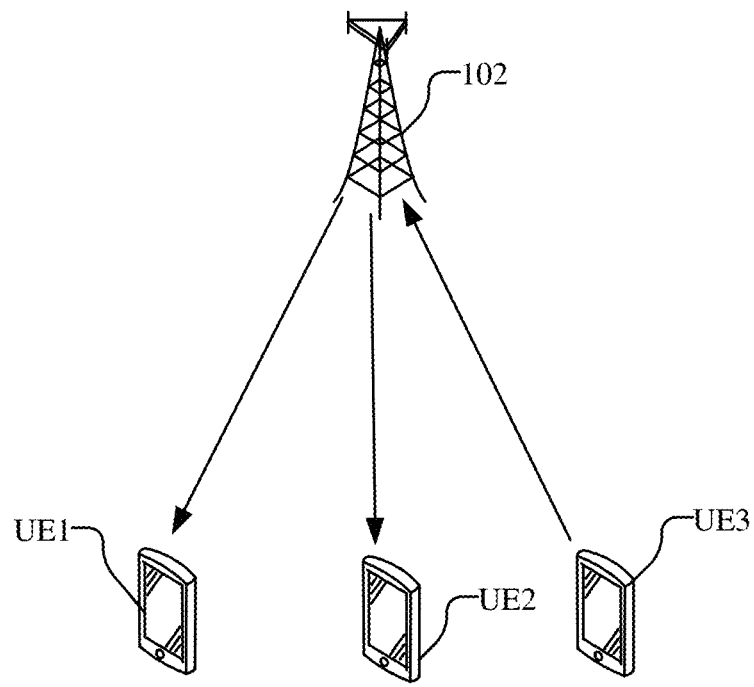
FIG. 19A illustrates a base station communicating with a number of UEs.
Figure 19B:
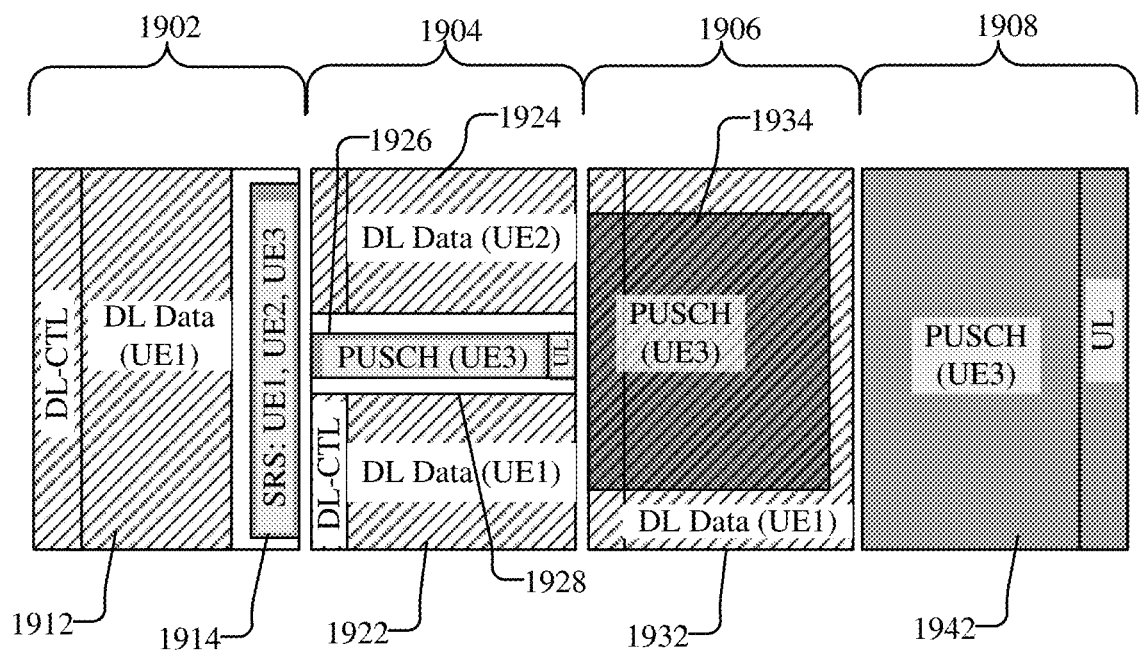
FIG. 19B illustrates examples of uplink signals and downlink signals transmitted between the base station and UEs from FIG. 19A in half-duplex and full duplex slots.

FIG. 19A illustrates, by way of example, a base station 102 communicating with a number of UEs (UE1, UE2, UE3), which may be similar to UE 104. The base station 102 is operating with flexible DL/UL operations, e.g., sub-band full duplex mode, across and within slots, while the UEs UE1, UE2, and UE3 operate using half-duplex. FIG. 19B illustrates, by way of example, a number of slots 1902, 1904, 1906, and 1908, during which the base station 102 shown in FIG. 19A transmits DL signals, receives UL signals, and both transmits DL signals and receives UL signals, with the UEs UE1, UE2, and UE3.

As illustrated in a first slot 1902, the base station 102 may transmit DL data 1912 to UE1, and the UEs UE1, UE2, and UE3 may transmit UL SRS signals 1914 to the base station 102. The UL SRS signals 1914 and the DL data 1912 do not overlap in time, and thus, slot 1902 may be referred to as a half-duplex slot.

In slot 1904, on the other hand, the base station transmits DL data 1922 to UE1 and DL data 1924 to UE2 in separate frequency bands, and simultaneously receives UL signals 1926 (e.g., Physical Uplink Shared Channel (PUSCH)) from UE 3 in a different frequency band, with a guard band 1928 between the DL data 1922, 1924 and the UL signals 1926. Thus, the slot 1904 is a sub-band full duplex slot.

In slot 1906, the base station 102 similarly transmits DL data 1932 to UE1 and simultaneously receives UL signals 1934 (e.g., PUSCH) from UE 3 in an overlapping frequency band. Thus, the slot 1906 is an in-band full duplex slot.

In slot 1908, the base station 102 receives UL signals 1942 from UE3, and does not transmit DL data. Accordingly, slot 1908 is a half-duplex slot.

If the base station 102 is operating in full duplex mode, DL PRS transmissions may result in self-interference for UL reception. For example, for some UE positioning technique, both DL and UL positioning reference signals may be measured, such as with round trip time (RTT) based positioning. Additionally, in some aspects, DL PRS transmission may be transmitted concurrently with UL reception at the full duplex base station on the same time, i.e., same slot and symbol.

To mitigate the impact of self-interference from DL PRS transmissions when operating in full duplex mode, the muting pattern for a base station may be at least partially based on the type of slot in which the PRS resource is transmitted, e.g., whether there is UL transmission scheduled in the same slot and same symbols when the PRS resource is transmitted. For example, with slot type based PRS muting, if the slot type is in-band full duplex, e.g., the DL transmissions and UL reception occur simultaneously using the same frequency resources, the muting configuration may mute the PRS in the in-band full duplex slot to prevent self-interference with the UL reception caused by the DL PRS transmission.

If the slot type is sub-band full duplex, e.g., the DL transmissions and UL reception occur simultaneously but using different frequency resources, the muting configuration may be based on the capability of the base station 102 to perform interference cancellation for UL signals received simultaneously with the transmission of the PRS. The self-interference cancellation capability of the base station 102, for example, may be provided by the base station 102 to the server 172 in some implementations. For example, if the guard band between the UL signals and/or the DL PRS is sufficient, and the base station 102 may perform self-interference cancellation, then the muting configuration may not mute the PRS transmission in the sub-band full duplex slot. If, however, the base station 102 is not capable of self-interference cancellation, then the muting configuration may mute the PRS transmission in the sub-band full duplex slot so as to not interfere with the received UL signal. Self-interference cancellation, as is well known in the art, may cancel a transmitted signal at the receiver, e.g., by creating an accurate model of the signal and using it to generate a signal that when combined with the received signal (which includes the UL signal and interference from the DL PRS transmission), leaves only the desired UL signal.

If the slot in which the DL PRS is transmitted is not a full duplex slot, e.g., the slot is a half-duplex slot, the muting configuration need to mute the DL PRS to avoid self-interference. The DL PRS, however, may be muted otherwise, e.g., inter-instance muting or intra-instance muting.

Figure 19C:
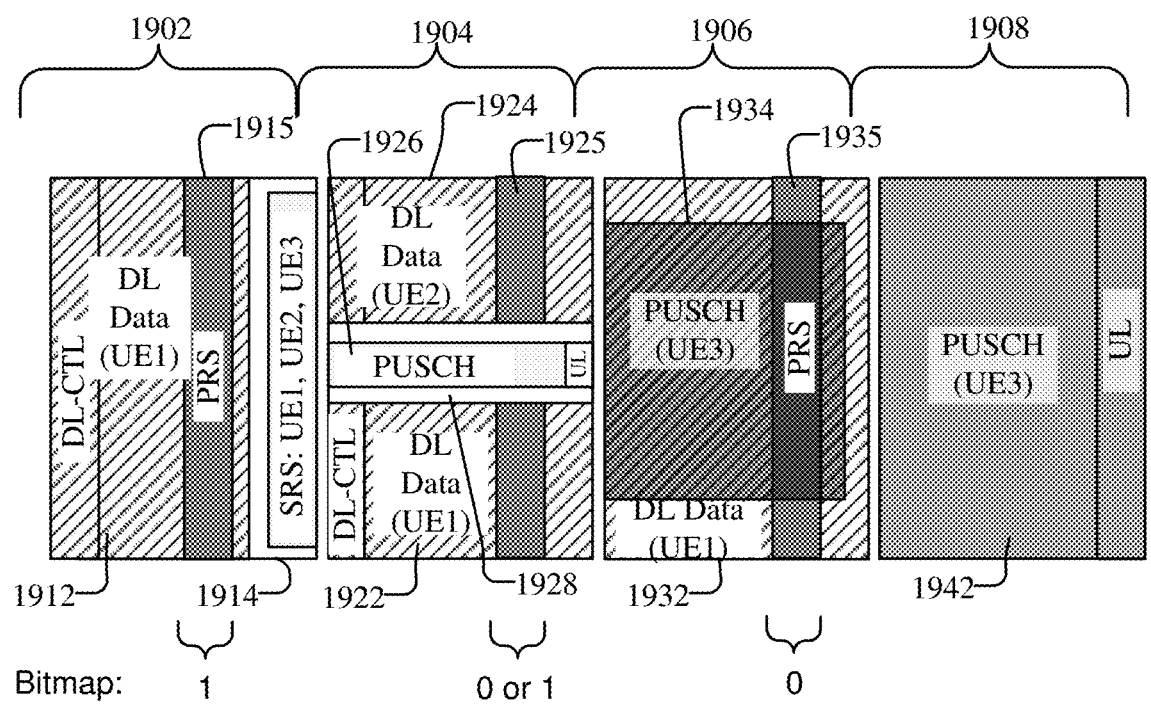
FIG. 19C illustrates examples of DL PRS and uplink signals transmitted between the base station and UEs from FIG. 19A in half-duplex and full duplex slots.

FIG. 19C illustrates, by way of example, is similar to FIG. 19B, like designated elements being the same, but further illustrates the base station 102 transmitting DL PRS 1915, 1925, and 1935 in slots 1902, and 1904, respectively. FIG. 19C, further illustrates a slot type based PRS muting configuration.

FIG. 19C illustrates a bitmap for the PRS resources 1915, 1925, and 1935, which is based on the slot type in which the PRS resources are transmitted. For example, slot 1902 is a half-duplex slot type, and accordingly, the bit value for the PRS resource 1915 in slot 1902 is "1," indicating that the PRS resource 1915 may be transmitted as the PRS resource 1915 will not cause self-interference with the reception of UL signals 1914. It should be understood, however, that PRS resource 1915 may still be muted, e.g., based on inter-instance muting or intra-instance muting.

Slot 1904 is a sub-band full duplex slot type, as the DL signals 1922, 1924, and PRS resource 1925, are transmitted at the same time as the reception of the UL signals 1926, but use different frequency resources. The DL PRS 1925 may produce self-interference with the UL signals 1926 depending on the base stations 102 self-interference cancellation capability. Accordingly, as illustrated, the bit value for the PRS resource 1925 in slot 1904 is a "0" or a "1." For example, if the base station 102 is not capable of self-interference cancellation, the bit value is a "0," indicating that the PRS source 1925 is muted. If the base station 102 is capable of self-interference cancellation, the bit value may be "1," indicating that the PRS source 1925 is not muted. It should be understood, however, that even if base station 102 is capable of self-interference cancellation, PRS resource 1925 may still be muted, e.g., based on inter-instance muting or intra-instance muting.

Slot 1906 is an in-band full duplex slot type, and accordingly, the PRS resource 1935 may cause self-interference with UL signals 1934. Accordingly, the bit value for the PRS resource 1935 in slot 1906 is "0," indicating that the PRS resource 1935 is muted.

In some implementations, the slot type muting may be used together with one or more of the inter-instance muting and intra-instance muting. For example, the slot type muting configuration may be combined with one or both of an inter-instance muting configuration and intra-instance muting configuration using a logical operation, such as a logical AND operation. For example, if the slot type is half-duplex, the slot type muting bit is a "1," which indicates that the PRS muting is decided by one or more of the inter-instance muting configuration and intra-instance muting configuration. On the other hand, if the slot type is full duplex and the slot type muting bit is a "0," the PRS transmissions is muted.

Figure 20:
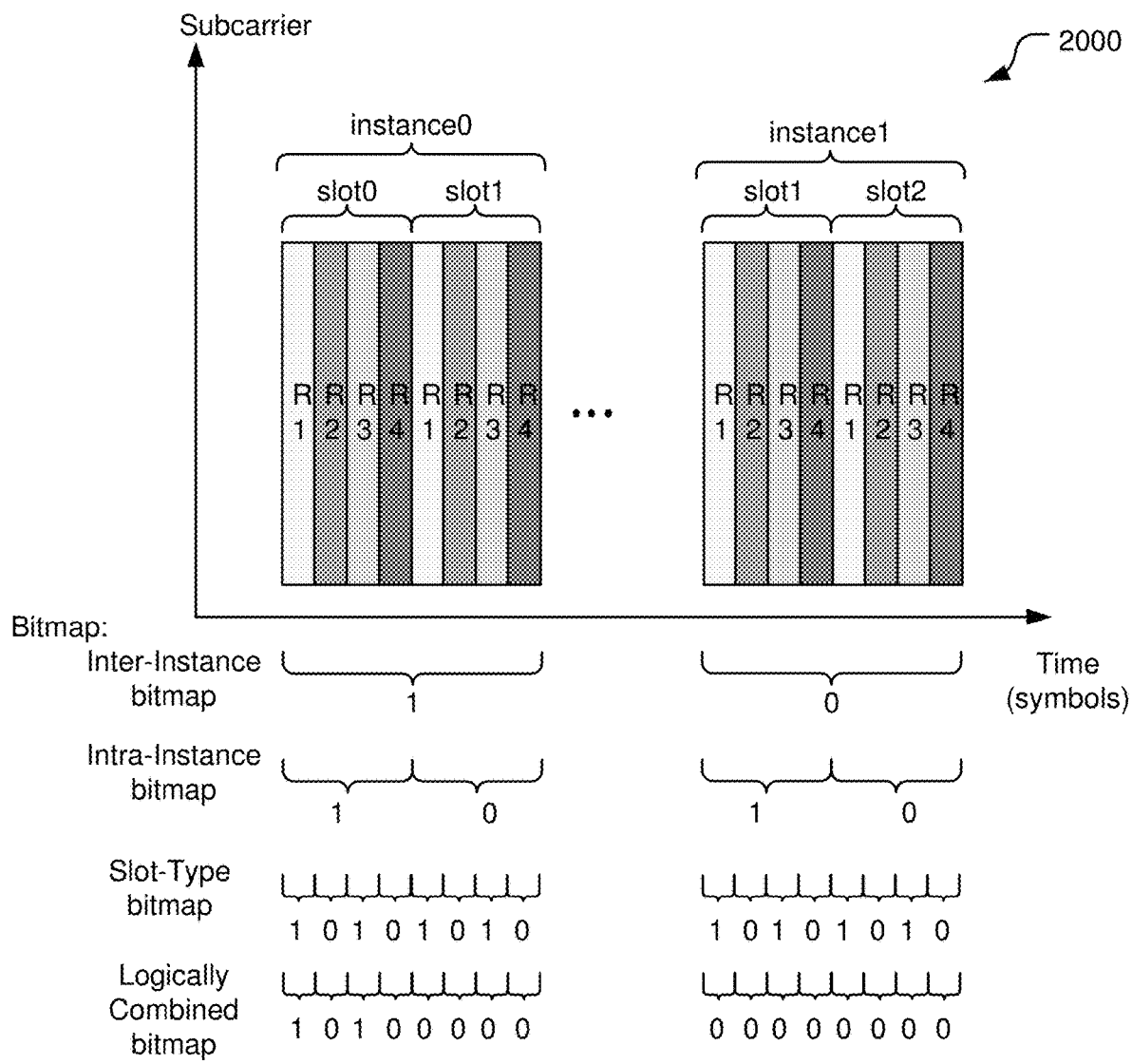
FIG. 20 illustrates two instances of a PRS resource set with a slot type PRS muting configuration, an inter-instance PRS muting configuration and an intra-instance PRS muting configuration.

FIG. 20, for example, illustrates two instances of PRS resource set 2000, which includes four PRS resources R1, R2, R3, R4, with a repetition of 2 and a time gap of 4 slots. Each of the two repetitions of each resource in each instance is separated by 4 slots, for example, there are two repetitions for the resource R1 that are separated by 4 slots, e.g., at slots n and n+4, in both instances (e.g., instance0 and instance1).

As illustrated, similar to FIG. 13, an inter-instance bitmap is provided, with each TRP that transmits a PRS resource configured with a 2-bit bitmap (e.g., "10"). Each bit corresponding to each of the two instances e.g., the instance0 and instance1. If the value of the bit is "1," all PRS resources are transmitted in that instance, and if the bit value is "0," no PRS resources are transmitted in that specific instance. Additionally, an intra-instance bitmap is provided with each TRP that transmits a PRS resource configured with a 4-bit bitmap (e.g., "1010"). Each bit corresponds to a repetition index in a single instance. If the value of the bit is "1," all PRS resources in that repetition index are transmitted, and if the bit value is "0," no PRS resources are transmitted in that specific repetition index.

Additionally, a slot type muting bitmap is provided, with each slot that transmits a PRS resource configured with a 16-bit bitmap (e.g., "1010101010101010"). Each bit corresponds to an individual slot. If the value of the bit is "1," then the PRS resource in the corresponding slot may be transmitted, and if the bit value is "0," the PRS resource in the corresponding slot is muted.

As illustrated, slot type muting bitmap may be logically combined with one or both of the inter-instance muting bitmap and the intra-instance muting bitmap. In FIG. 20, by way of example, the slot type muting bitmap, the inter-instance muting bitmap and the intra-instance muting bitmap are combined using a logical AND function, e.g., where PRS resources are transmitted if the slot type muting, the inter-instance muting and the intra-instance muting bit values are "1," and otherwise the PRS resources are muted. Using a logical AND function, the resulting PRS muting bitmap produces a 16-bit bitmap (e.g., "1010000000000000"). If desired, other logic functions, e.g., OR, XOR, NAND, NOR, XNOR, may be used to combine the slot type muting with one or more of the inter-instance muting and the intra-instance muting bitmaps.

The slot type muting pattern may be dynamically configured. For example, in a full duplex system, there is flexible DL and UL operation in time, e.g., across and within slots, and across UEs, e.g., as illustrated in FIGS. 19A, 19B, and 19C. In other words, a slot type may change between half-duplex and full duplex quickly depending on UL grants, and DL PRS scheduling. Conventionally, however, the muting pattern for a base station is configured though high layers, e.g., through LPP or RRC messaging, which may introduce a large signaling latency.

Accordingly, to enable low-latency configuration of the slot type muting pattern, lower layer triggering of the may be used to dynamically indicate the bitmap for the slot type muting. For example, Medium Access Control-Control Element (MAC-CE) or a Downlink Control Information (DCI) triggering may be used. For example, the slot type muting may be configured using lower layer triggering if the DLR PRS is similarly triggered using lower layers, such as MAC-CE and DCI triggering, due to the dynamic configuration of half-duplex and full duplex slots in time, e.g., across and withing slots. Configuring of the slot based PRS muting using lower layer triggering enables fast muting changes, enabling low latency systems, similar to lower layer triggered PRS resources.

Thus, for example, a server 172 may be configured to implement slot type muting, e.g., based on a type of positioning signal triggering. For example, the server 172 may be configured to cause the base station 102 to perform slot type muting (e.g., only send a slot type muting configuration to the base station 102) only if MAC-CE-based DL PRS triggering is used and/or DCI-based DL PRS triggering is used. The server 172 may determine that MAC-CE-based DL PRS and/or that DCI-based DL PRS has been triggered (e.g., triggered by a serving base station 102) and respond by enabling slot type muting, e.g., by sending a slot type muting configuration to the base station 102 or by sending an instruction (e.g., in a MAC-CE or DCI communication) to the base station 102 to use a slot type muting configuration (e.g., previously sent to the base station 102 or produced by the base station 102). Such on-demand triggering of slot type muting may help ensure high-quality performance because slot type muting may use rapid muting changes (muting to not muting and vice versa) and thus is a low-latency technique, and MAC-CE and DCI-based DL PRS are low-latency techniques as well.

In addition to slot type muting, intra-slot muting may be used. For example, a muting configuration may vary over different slots and/or resources. In one example, a muting configuration may be intra-slot, in which case each bit in the bitmap indicates whether to mute a corresponding symbol or set of symbols of one or more repetitions of one or more PRS resources. Different slots may have different intra-slot muting configurations.

Figure 21:
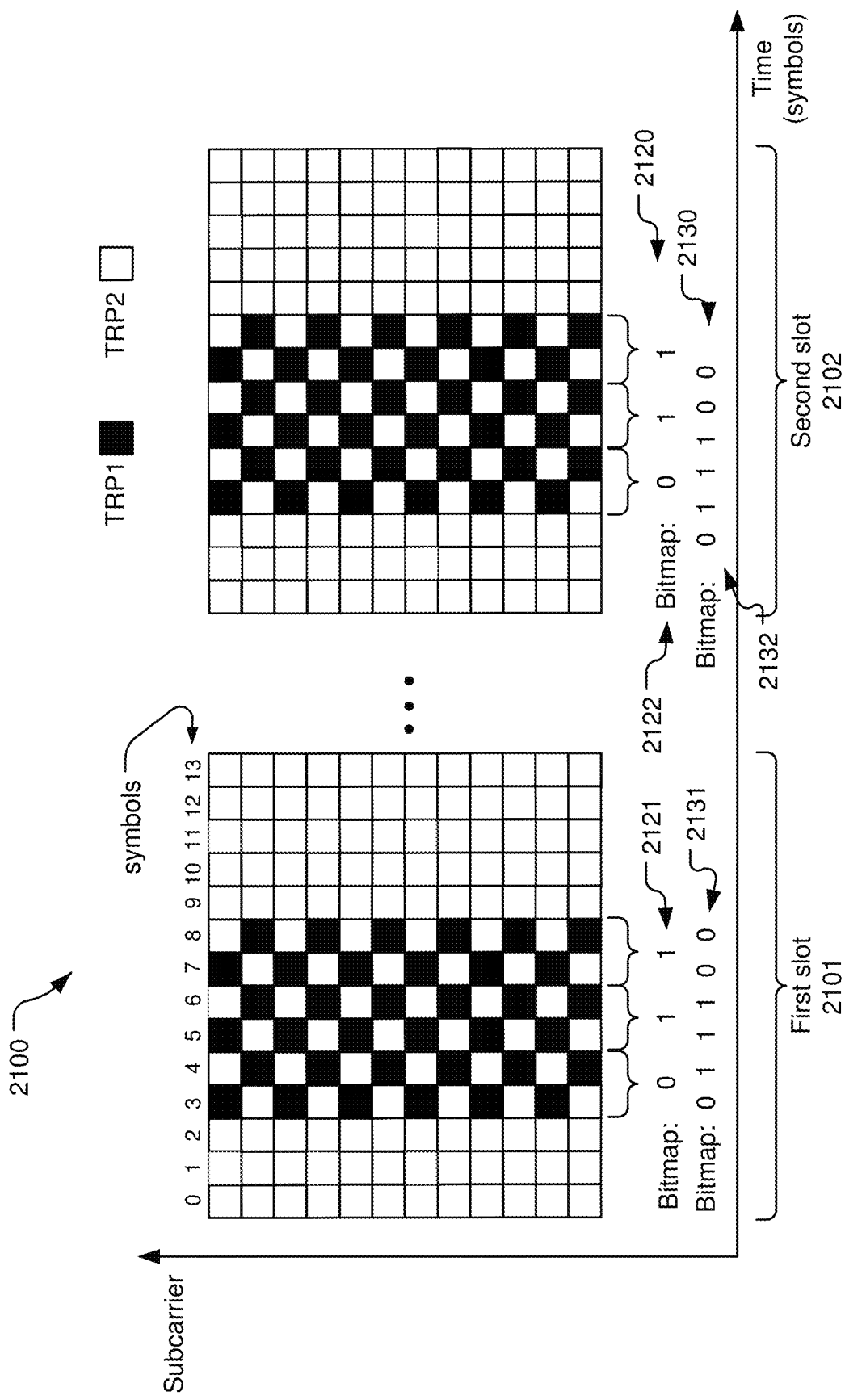
FIG. 21 illustrates one example of intra-slot PRS muting.

FIG. 21, for example, illustrates intra-slot PRS muting for a scenario of comb-2 transmission, six symbols per repetition, two repetitions per instance, and with a 3-bit muting bitmap. FIG. 21 shows a transmission schedule 2100 for two slots, which is a portion of a larger transmission schedule for transmitting signals including a positioning signal. Here, the transmission schedule indicates for portions of positioning signals from two TRPs (TRP1 and TRP2) to be carried by symbols 3-8 of each of a first slot 2101 and a second slot 2102. A muting configuration 2120 is represented by bitmap portions 2121, 2122 for the slots 2101, 2102, respectively. Each bit of the bitmap representing the muting configuration 2120 corresponds to a respective segment of the respective slot 2101, 2102. In this example, each segment is equal in size and corresponds to an intra-slot group of symbols that each indicates to sound all resource elements of the transmission schedule over a respective set of symbols. Different intra-slot groups may be the same (i.e., intra-slot repetitions with identical patterns of sounded resource elements) or different (i.e., have different resource element patterns over the symbols used, even if they sound all the same subcarriers). In this example, a quantity G of intra-slot groups is equal to N/K, where N is the length of the PRS resource in number of symbols in a slot (here, six symbols) and K is the comb type (i.e., comb number), and a quantity M of slot segments equals G (M=G). Thus, as shown, with a PRS resource length of six symbols and a comb type of 2, there are three intra-slot groups (G=3) of two bits each, and three bits per bitmap portion (M=3), one bit for each intra-slot group, i.e., each segment corresponding to a bit in the bitmap also corresponds to one intra-slot group.

The muting configuration 2120 is an example, both in terms of mapping of bits to symbols and in a pattern of bits shown, and other examples may be used. For example, in another implementation, a muting configuration 2130 may be used, in which each slot segment corresponds to a bit in bitmap portions 2131, 2132 representing the muting configuration 2130. Each slot segment corresponds to a single symbol (instead of an intra-slot group of symbols as with the muting configuration 2120) in respective slots 2101, 2102. In this example, the quantity M of slot segments is greater than the quantity G of intra-slot groups (M>G), and is equal to N, the length of the PRS in number of symbols in a slot. The bitmap portions 2131, 2132 thus each have N bits where N is the length of the PRS in number of symbols in a slot.

As another example, an intra-slot muting configuration may vary over different slots and/or resources.

Figure 22:
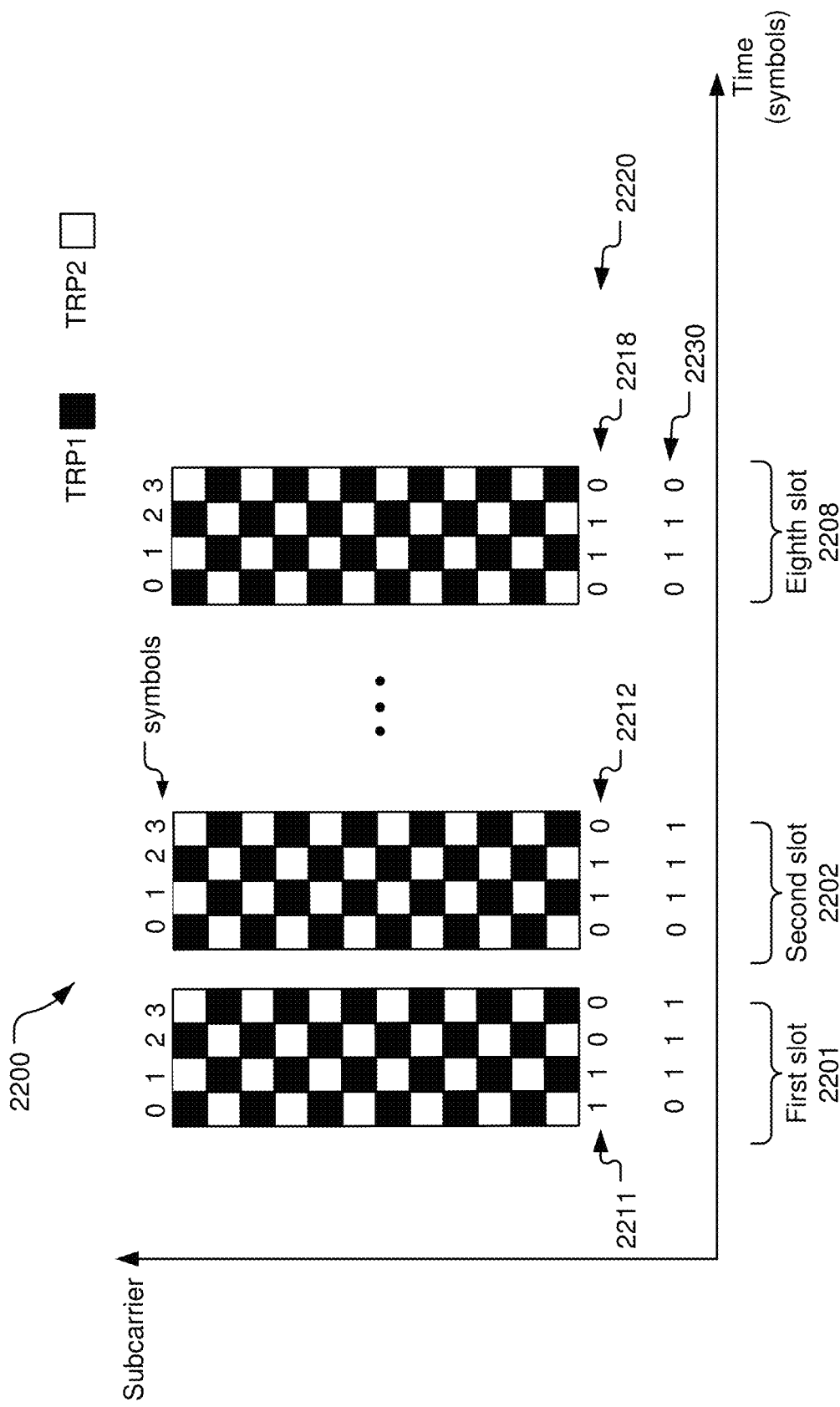
FIG. 22 illustrates another example of intra-slot PRS muting.

FIG. 22, for example, illustrates an intra-slot muting configuration (which may be called an intra-resource muting configuration) that may have different muting configurations for different slots and/or resources. A transmission schedule 2200 has comb-2, two symbols per intra-slot group, but with four symbols per repetition and eight repetitions per instance. As shown, a muting configuration 2220 is represented by bitmap portions 2211, 2212, 2218 for the slots shown, respectively, namely a first slot 2201, a second slot 2202, and an eighth slot 2208. The bitmap portion 2211 is different from the bitmap portions 2212, 2218, with the bitmap portions 2212, 2218 being the same. In this example, with four bits per repetition and eight repetitions per instance, the bitmap has 32 bits. Intra-slot muting may be different for different resources. For example, one muting configuration may apply to one or more resources and another muting configuration apply to one or more other resources, even in the same slot. For example, the muting configuration 2220 may apply to the resources from TRP1 and TRP2, or may apply to the resource from TRP1 and another muting configuration 2230 may apply to the resource from TRP2. The configuration shown is FIG. 22 is an example only, and other muting configurations with different muting configurations for different slots may be used.

Bitmaps for intra-slot muting configurations may contain more bits than bitmaps for other muting configuration types (e.g., inter-instance muting, intra-instance muting, and slot type muting). For example, for intra-slot muting with each segment corresponding to an intra-slot group of symbols (i.e., that indicate to sound all of the subcarriers), then B bits are used where B=N/K, where N is the length of the PRS in number of symbols in a slot and K is the comb type (i.e., comb number). For intra-slot muting with each segment corresponding to a symbol, then N bits are used for each slot muting configuration where N is the length of the PRS in number of symbols in a slot.

In some implementations, the slot type muting may be used together with the intra-slot muting, as well as with one or more of the inter-instance muting and intra-instance muting. For example, the slot type muting configuration may be combined with the intra-slot muting configuration, and may be further combined with one or both of an inter-instance muting configuration and intra-instance muting configuration using a logical operation, such as a logical AND operation.

Figure 23:
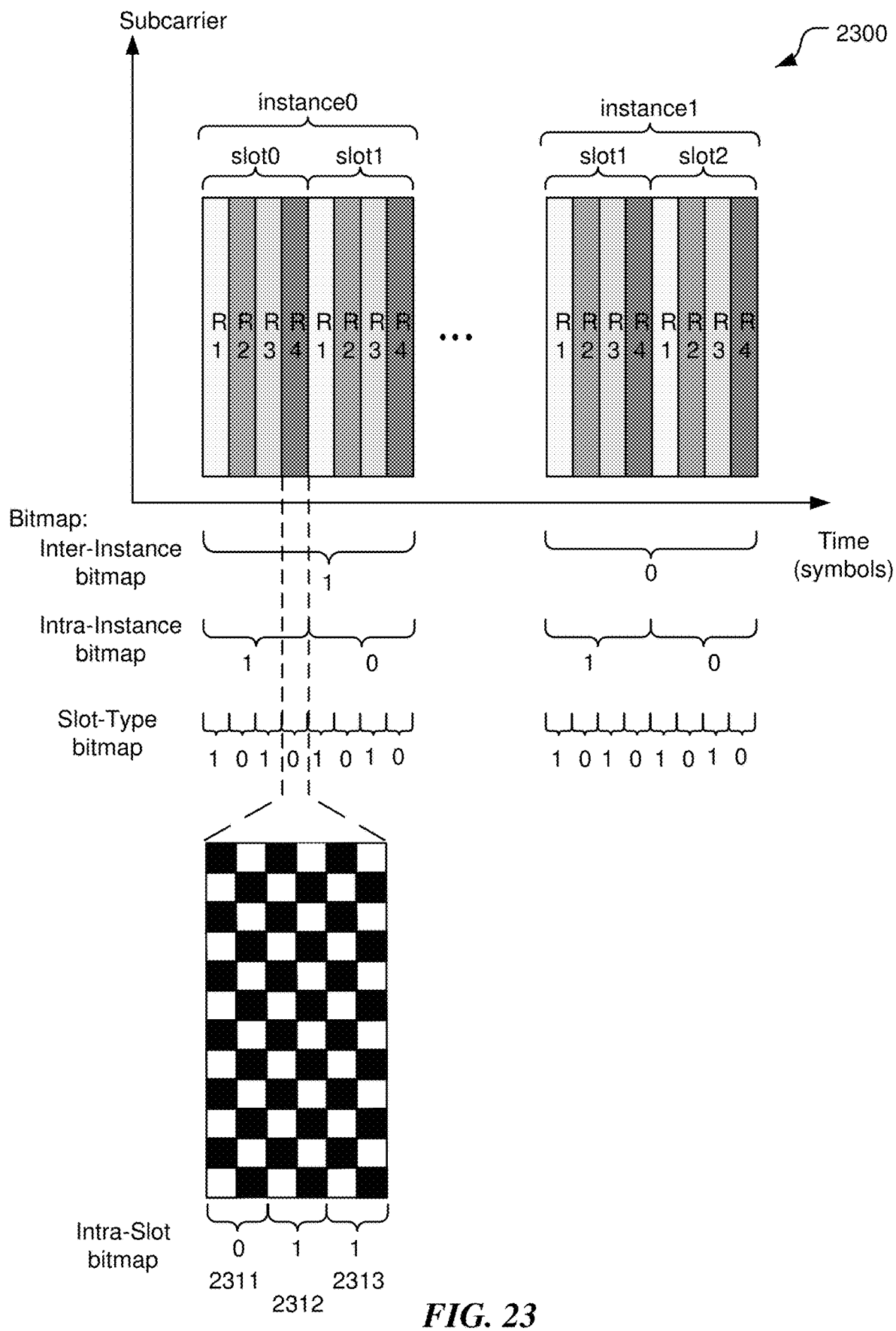
FIG. 23 illustrates two instances of a PRS resource set with a slot type PRS muting configuration, inter-slot PRS muting, an inter-instance PRS muting configuration and an intra-instance PRS muting configuration.

FIG. 23, for example, illustrates two instances of PRS resource set 2300, which includes four PRS resources R1, R2, R3, R4, with a repetition of 2 and a time gap of 4 slots.

Each of the two repetitions of each resource in each instance is separated by 4 slots, for example, there are two repetitions for the resource R1 that are separated by 4 slots, e.g., at slots n and n+4, in both instances (e.g., instance0 and instance1). FIG. 23 is similar to FIG. 20, discussed above, but further illustrates the first repetition of the fourth resource R4 expanded, and shows three intra-slot groups, here groups 2311, 2312, 2313, with intra-slot muting applied. It should be understood that intra-slot muting is illustrated with respect to the first repetition of the fourth resource R4 for simplicity and that intra-slot muting may be similarly applied to each resource slot.

The slot type muting may be combined with one or more of the intra-slot muting, the inter-instance muting and intra-instance muting, e.g., using a logic function, such as an AND operation. If desired, other logic functions, e.g., OR, XOR, NAND, NOR, XNOR, may be used to combine the slot type muting with one or more of the intra-slot muting, inter-instance muting and the intra-instance muting bitmaps.

Figure 24:
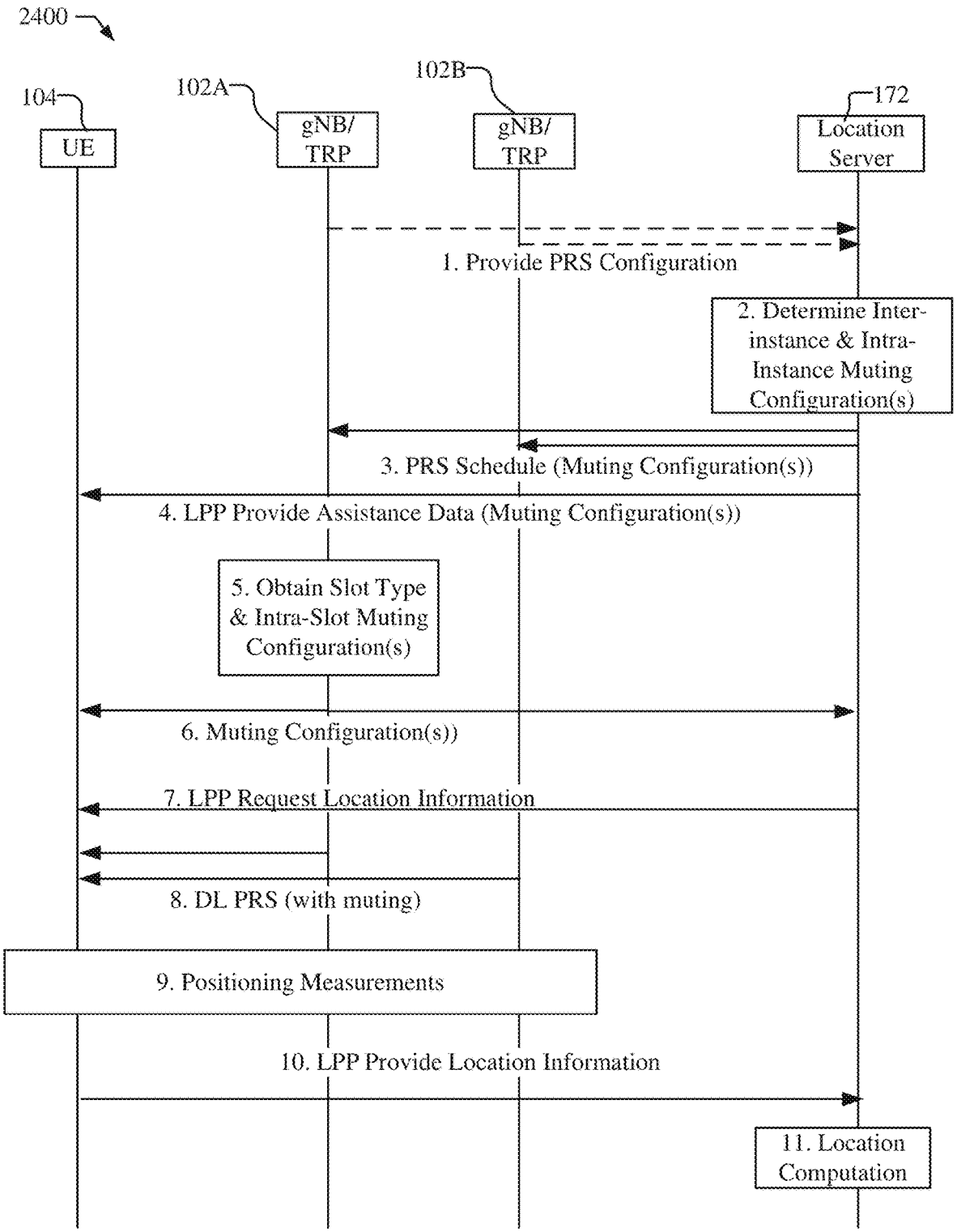
FIG. 24 is a message flow illustrating the messaging for supporting positioning of the UE using slot type PRS muting.

FIG. 24 is a message flow 2400 illustrating the messaging between the location server 172, base stations 102A and 102B, and the UE 104 for supporting positioning of the UE using PRS muting, including slot type PRS muting, as discussed herein. The location server 172, for example, may be an LMF 270, and the base stations 102A, 102B may be a gNB. While two base stations are illustrated, it should be understood that additional (or fewer) base stations may be used. It should be understood that messages related to the support of positioning of the UE using PRS muting, including slot type muting, are illustrated, but that additional messages, including conventional LPP messages, may be used in the message flow 2400.

At stage 1, the base stations 102A and 102 may provide PRS configuration information to the location server 172. The PRS configuration information may include information related to PRS resources (PRS beams) and may further include the self-interference cancellation capability of the base stations.

At stage 2, the location server 172 may generate a PRS schedule and assistance data for positioning for the UE 104 based on the PRS configuration received from the base stations 102A and 102B including muting configurations. For example, the location server 172 may generate inter-instance muting and/or intra-instance muting configurations.

At stage 3, the location server 172 may send a PRS schedule to the base stations 102A and 102B. The PRS schedule includes PRS to be transmitted in a plurality of slots. The slots may be full duplex slots in which downlink transmissions and uplink reception occur simultaneously and half-duplex slots in which downlink transmissions and uplink reception do not occur simultaneously.

At stage 4, the location server 172 may send the assistance data, e.g., in an LPP assistance data message, to the UE 104. The assistance data may include the PRS configuration information, including muting configuration(s) such as inter-instance muting and/or intra-instance muting configurations. The assistance data may further include locations of the base stations 102A and 102B, e.g., for a UE based positioning process.

At stage 5, the base station 102A may obtain muting configuration that is at least partially based on the slot type of the slot in which the DL PRS is scheduled. For example, a slot type muting configuration may be based on a slot type in which DL PRS are to be transmitted, e.g., as discussed in FIGS. 14A-20. The slot type, for example, may be determined based on UL grants and DL PRS scheduling. For example, the slot type muting configuration for DL PRS transmitted in a half-duplex slot may permit PRS transmission, while DL PRS transmitted in an in-band full duplex slot is muted, and DL PRS transmitted in a sub-band full duplex slot may be transmitted if the base station 102A is capable of self-interference cancellation, and may be muted if the base station 102A is not capable of self-interference cancellation. The base station 102A may further obtain intra-slot muting configurations as discussed with respect to FIGS. 21-23. In some implementations, the muting configuration, e.g., slot type muting or slot type muting and intra-slot muting, may be determined by the base station 102A or may be obtained from the location server 172, e.g., by provide muting related configuration information, such as UL grants and DL PRS scheduling to the location server 172, and the location server 172 may determine slot type muting or the intra-slot muting configurations, which is provided to the base station 102A, e.g., using lower layer signaling, and may be provided to the UE 104 using lower layer signaling.

At stage 6, the base station 102A may transmit the muting configuration information determined in stage 5 to the UE 104 and to the location server 172. The muting configuration information may be transmitted using lower layer signaling, e.g., MAC-CE and/or DCI triggering.

At stage 7, the location server 172 may request location information from the UE 104, e.g., in an LPP request location information message.

At stage 8, the base stations 102A and 102B transmits the DL PRS in a plurality of slots consistent with the PRS configuration, including the muting configuration as determined at stages 2 and 5. In some implementations, the DL PRS are transmitted based on a combination of the PRS muting configurations, e.g., determined using a logic function, such as an AND function.

At stage 9, the UE 104 performs position measurements with the DL PRS received at stage 8. The position measurements, for example, may be AOD, Rx-Tx time difference measurements for RTT based positioning, or RSTD measurements for TDOA based positioning. In some implementations, the UE 104 may transmit UL SRS for Rx-Tx time difference measurements by the base stations 102A and 102B for RTT based positioning. In some implementations, the UE 104 may further determine a position estimate using the position measurements and locations of the base stations 102A and 102B received in assistance data in stage 3, e.g., in a UE based positioning process.

At stage 10, the UE 104 may send the position measurements and/or determined position estimate to the location server in an LPP provide location information message.

At stage 11, the location server 172 may determine or verify the position of the UE 104 based on the location information received in the message in stage 10.

Figure 25:
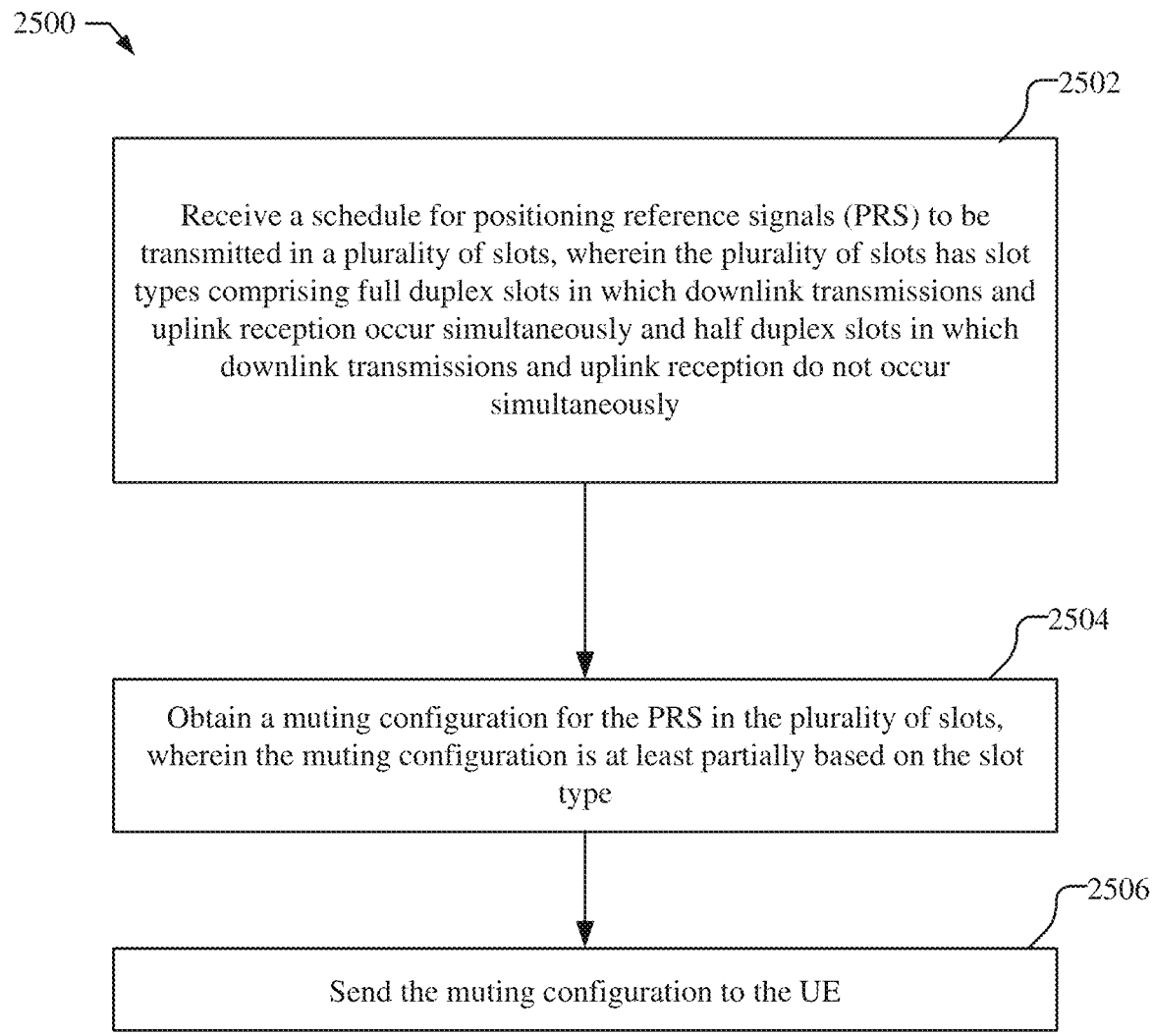
FIG. 25 shows a flowchart for an exemplary method for supporting positioning of a UE in a wireless network performed by a base station.

FIG. 25 shows a flowchart for an exemplary process 2500 for supporting positioning of a user equipment (UE) in a wireless network performed by a base station, such as base station 102 or 600 shown in FIGS. 1 and 6, in a manner consistent with disclosed implementations.

At block 2502, the base station receives a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously, e.g., as illustrated at stage 3 of FIG. 24. A means for receiving a schedule for positioning reference signals (PRS) to be transmitted in a plurality of slots, wherein the plurality of slots have slot types comprising full duplex slots in which downlink transmissions and uplink reception occur simultaneously and half-duplex slots in which downlink transmissions and uplink reception do not occur simultaneously may include the transceiver 615 and one or more processors 610 with dedicated hardware or implementing executable code or software instructions 612 in memory 611, such as the positioning session module 672 in base station 600 shown in FIG. 6.

At block 2504, the base station obtains a muting configuration for the PRS in the plurality of slots, wherein the muting configuration is at least partially based on the slot type, e.g., as illustrated at stage 5 of FIG. 24. For example, the muting configuration may be received from a location server, e.g., as discussed at stage 5 of FIG. 24. In another example, the muting configuration is generated by the base station and, for example, the base station may send the muting configuration to a location server, e.g., as discussed at stages 5 and 6 of FIG. 24. A means for obtaining a muting configuration for the PRS in the plurality of slots, wherein the muting configuration is at least partially based on the slot type may include the transceiver 615 and one or more processors 610 with dedicated hardware or implementing executable code or software instructions 612 in memory 611, such as the muting module 674 in base station 600 shown in FIG. 6.

At block 2506, the base station sends the muting configuration to the UE, e.g., as illustrated at stage 5 of FIG. 24. For example, the muting configuration may be sent to the UE in a Medium Access Control-Control Element (MAC-CE) or a Downlink Control Information (DCI) to the UE. A means for sending the muting configuration to the UE may include the transceiver 615 and one or more processors 610 with dedicated hardware or implementing executable code or software instructions 612 in memory 611, such as the muting module 674 in base station 600 shown in FIG. 6.

In one implementation, the full duplex slots may be in-band full duplex slots in which the downlink transmissions and the uplink reception occur simultaneously and with the same frequency resources, wherein the muting configuration mutes the PRS in the in-band full duplex slots, e.g., as illustrated in FIG. 19C.

In one implementation, the full duplex slots may be sub-band full duplex slots in which the downlink transmissions and the uplink reception occur simultaneously but on different frequency resources, wherein the muting configuration for the PRS in the sub-band full duplex slots is based on a capability of the base station to perform interference cancellation for uplink signal received simultaneously with transmission of the PRS, e.g., as illustrated in FIG. 19C. For example, the muting configuration mutes the PRS in the sub-band full duplex slots when the base station is not capable of self-interference cancellation for uplink signal received simultaneously with transmission of the PRS. In some implementations, the base station sends the location server an indication of its capability to perform self-interference cancellation for uplink signal received simultaneously with transmission of the PRS, e.g., as illustrated at stage 1 of FIG. 25.

In one implementation, the muting configuration for the PRS is at least partially based on the slot type by being based on a slot type muting configuration that indicates whether to mute PRS in each slot based on the slot type, and is further based on at least one of an inter-instance muting configuration, an intra-instance muting configuration, or a combination thereof, e.g., as discussed at stage 5 of FIG. 24 and FIGS. 20 and 23. The muting configuration for the PRS, for example, may be a logical combination of the slot type muting configuration, and at least one of the inter-instance muting configuration, the intra-instance muting configuration, or the combination thereof, e.g., as discussed at stage 5 of FIG. 24 and FIGS. 20 and 23.

In one implementation, the muting configuration for the PRS is at least partially based on the slot type by being based on a slot type muting configuration that indicates whether to mute PRS in each slot based on the slot type. The base station may further obtain an intra-slot muting configuration indicating whether to mute each of a plurality of intra-slot PRS resource segments, wherein the muting configuration for the PRS is further based on the intra-slot configuration, e.g., as discussed at stage 5 of FIG. 24 and FIG. 23. A means for obtaining an intra-slot muting configuration indicating whether to mute each of a plurality of intra-slot PRS resource segments may include the transceiver 615 and one or more processors 610 with dedicated hardware or implementing executable code or software instructions 612 in memory 611, such as the muting module 674 in base station 600 shown in FIG. 6.

In one implementation, the base station may further transmit the PRS to the UE in the plurality of slots, e.g., as discussed at stage 8 of FIG. 24. A means for transmitting the PRS to the UE in the plurality of slots may include the transceiver 615 and one or more processors 610 with dedicated hardware or implementing executable code or software instructions 612 in memory 611, such as the positioning session module 672, in base station 600 shown in FIG. 6.

Figure 26:
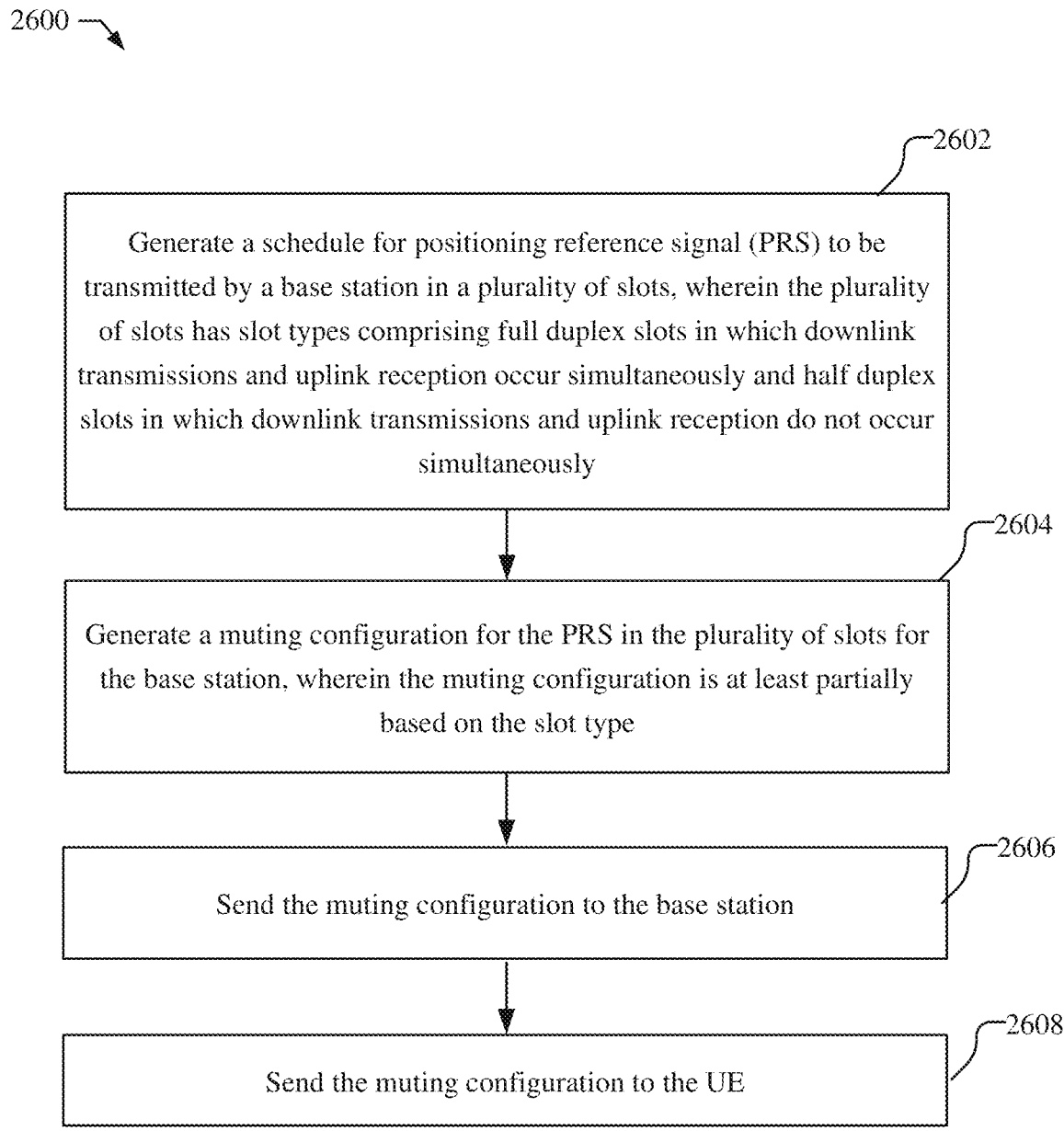
FIG. 26 shows a flowchart for an exemplary method for supporting positioning of a UE in a wireless network performed by a location server.

FIG. 26 shows a flowchart for an exemplary process 2600 for supporting positioning of a user equipment (UE) in a wireless network performed by a base station, such as location server 172 or 700 shown in FIGS. 1 and 7, in a manner consistent with disclosed implementations.

At block 2602, the location server generates a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously, e.g., as illustrated at stage 2 of FIG. 24. A means for generating a schedule for positioning reference signal (PRS) to be transmitted by a base station in a plurality of slots, wherein the plurality of slots have slot types comprising full duplex slots in which downlink transmissions and uplink reception occur simultaneously and half-duplex slots in which downlink transmissions and uplink reception do not occur simultaneously may include the transceiver 715 and one or more processors 710 with dedicated hardware or implementing executable code or software instructions 712 in memory 711, such as the positioning session module 772 in location server 700 shown in FIG. 7.

At block 2604, the location server generates a muting configuration for the PRS in the plurality of slots for the base station, wherein the muting configuration is at least partially based on the slot type, e.g., as discussed at stage 5 of FIG. 24. For example, the muting configuration for the PRS at least partially based on the slot type may be generated in response to determining that Medium Access Control-Control Element (MAC-CE) or a Downlink Control Information (DCI) PRS triggering is in use. A means for generating a muting configuration for the PRS in the plurality of slots for the base station, wherein the muting configuration is at least partially based on the slot type may include the transceiver 715 and one or more processors 710 with dedicated hardware or implementing executable code or software instructions 712 in memory 711, such as the muting module 774 in location server 700 shown in FIG. 7.

At block 2606, the location server sends the muting configuration to the base station, e.g., as discussed at stage 5 of FIG. 24. A means for sending the muting configuration to the base station may include the transceiver 715 and one or more processors 710 with dedicated hardware or implementing executable code or software instructions 712 in memory 711, such as the muting module 774 in location server 700 shown in FIG. 7.

At block 2608, the location server sends the muting configuration to the UE, e.g., as discussed at stages 5 and 6 of FIG. 24. A means for sending the muting configuration to the UE may include the transceiver 715 and one or more processors 710 with dedicated hardware or implementing executable code or software instructions 712 in memory 711, such as the muting module 774 in location server 700 shown in FIG. 7.

In one implementation, the full duplex slots may be in-band full duplex slots in which the downlink transmissions and the uplink reception occur simultaneously and with the same frequency resources, wherein the muting configuration mutes the PRS in the in-band full duplex slots, e.g., as illustrated in FIG. 19C.

In one implementation, the full duplex slots may be sub-band full duplex slots in which the downlink transmissions and the uplink reception occur simultaneously but on different frequency resources, wherein the muting configuration for the PRS in the sub-band full duplex slots is based on a capability of the base station to perform interference cancellation for uplink signal received simultaneously with transmission of the PRS, e.g., as illustrated in FIG. 19C. For example, the muting configuration mutes the PRS in the sub-band full duplex slots when the base station is not capable of interference cancellation for uplink signal received simultaneously with transmission of the PRS. In one implementation, for example, the location server receives an indication of the base station capability to perform self-interference cancellation for uplink signal received simultaneously with transmission of the PRS, e.g., as discussed at stage 1 of FIG. 24. A means for receiving an indication of the base station capability to perform self-interference cancellation for uplink signal received simultaneously with transmission of the PRS may include the transceiver 715 and one or more processors 710 with dedicated hardware or implementing executable code or software instructions 712 in memory 711, such as the muting module 774 in location server 700 shown in FIG. 7.

In one implementation, the muting configuration for the PRS is at least partially based on the slot type by being based on a slot type muting configuration that indicates whether to mute PRS in each slot based on the slot type, and is further based on at least one of an inter-instance muting configuration, an intra-instance muting configuration, or a combination thereof, e.g., as discussed at stage 5 of FIG. 24 and FIGS. 20 and 23. For example, the muting configuration for the PRS may be a logical combination of the slot type muting configuration, and at least one of the inter-instance muting configuration, the intra-instance muting configuration, or the combination thereof, e.g., as discussed at stage 5 of FIG. 24 and FIGS. 20 and 23.

In one implementation, the muting configuration for the PRS is at least partially based on the slot type by being based on a slot type muting configuration that indicates whether to mute PRS in each slot based on the slot type. The location server may further generate an intra-slot muting configuration indicating whether to mute each of a plurality of intra-slot PRS resource segments, wherein the muting configuration for the PRS is further based on the intra-slot configuration, e.g., as discussed at stage 5 of FIG. 24 and FIG. 23. A means for generating an intra-slot muting configuration indicating whether to mute each of a plurality of intra-slot PRS resource segments may include the transceiver 715 and one or more processors 710 with dedicated hardware or implementing executable code or software instructions 712 in memory 711, such as the muting module 774 in location server 700 shown in FIG. 7.

Figure 27:
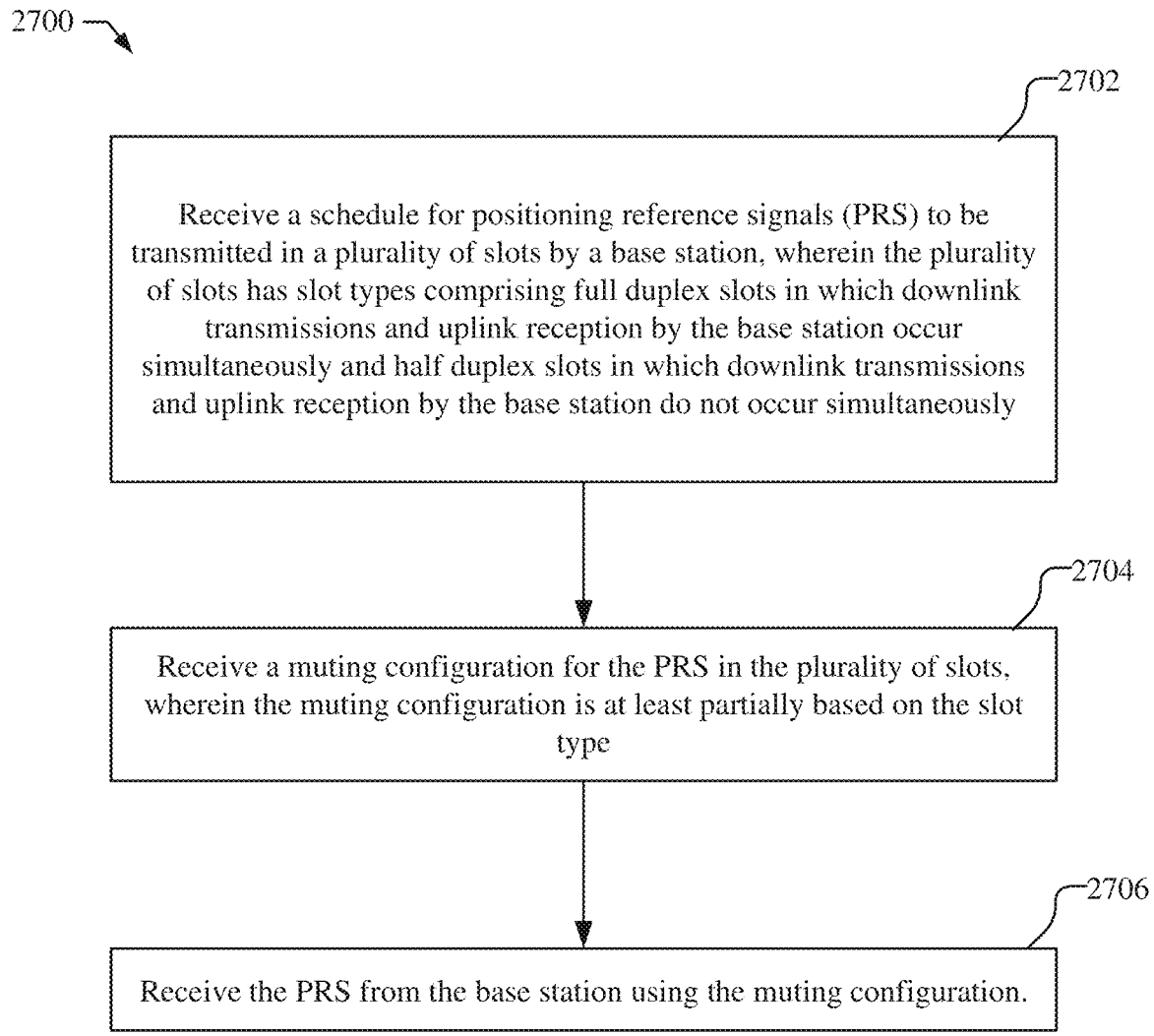
FIG. 27 shows a flowchart for an exemplary method for supporting positioning of a UE in a wireless network performed by a UE.

FIG. 27 shows a flowchart for an exemplary process 2700 for supporting positioning of a user equipment (UE) in a wireless network performed by a UE, such as UE 104 or 500 shown in FIGS. 1 and 5, in a manner consistent with disclosed implementations.

At block 2702, the UE may receive a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously, e.g., as discussed at stage 4 of FIG. 24. A means for receiving a schedule for positioning reference signals (PRS) to be transmitted in a plurality of slots by a base station, wherein the plurality of slots have slot types comprising full duplex slots in which downlink transmissions and uplink reception by the base station occur simultaneously and half-duplex slots in which downlink transmissions and uplink reception by the base station do not occur simultaneously may include the transceiver 515 and one or more processors 510 with dedicated hardware or implementing executable code or software instructions 512 in memory 511, such as the positioning session module 572, in UE 500 shown in FIG. 5.

At block 2704, the UE receives a muting configuration for the PRS in the plurality of slots, wherein the muting configuration is at least partially based on the slot type, e.g., as discussed at stage 6 of FIG. 24. For example, the muting configuration may be received in a Medium Access Control-Control Element (MAC-CE) or a Downlink Control Information (DCI) from the base station. A means for receiving a muting configuration for the PRS in the plurality of slots, wherein the muting configuration is at least partially based on the slot type may include the transceiver 515 and one or more processors 510 with dedicated hardware or implementing executable code or software instructions 512 in memory 511, such as the positioning session module 572, in UE 500 shown in FIG. 5.

At block 2706, the UE receiving the PRS from the base station using the muting configuration, e.g., as discussed at stage 8 and 9 of FIG. 24. A means for receiving the PRS from the base station using the muting configuration may include the transceiver 515 and one or more processors 510 with dedicated hardware or implementing executable code or software instructions 512 in memory 511, such as the positioning session module 572, in UE 500 shown in FIG. 5.

In one implementation, the full duplex slots may be in-band full duplex slots in which the downlink transmissions and the uplink reception by the base station occur simultaneously and with the same frequency resources, wherein the muting configuration mutes the PRS in the in-band full duplex slots, e.g., as illustrated in FIG. 19C.

In one implementation, the full duplex slots may be sub-band full duplex slots in which the downlink transmissions and the uplink reception by the base station occur simultaneously but on different frequency resources, wherein the muting configuration for the PRS in the sub-band full duplex slots is based on a capability of the base station to perform interference cancellation for uplink signal received simultaneously with transmission of the PRS, e.g., as illustrated in FIG. 19C. For example, the muting configuration mutes the PRS in the sub-band full duplex slots when the base station is not capable of interference cancellation for uplink signal received simultaneously with transmission of the PRS.

In one implementation, the muting configuration for the PRS is at least partially based on the slot type by being based on a slot type muting configuration that indicates whether to mute PRS in each slot based on the slot type, and is further based on at least one of an inter-instance muting configuration, an intra-instance muting configuration, or a combination thereof, e.g., as discussed at stage 5 of FIG. 24 and FIGS. 20 and 23. The muting configuration for the PRS is a logical combination of the slot type muting configuration, and at least one of the inter-instance muting configuration, the intra-instance muting configuration, or the combination thereof, e.g., as discussed at stage 5 of FIG. 24 and FIGS. 20 and 23.

In one implementation, the muting configuration for the PRS is at least partially based on the slot type by being based on a slot type muting configuration that indicates whether to mute PRS in each slot based on the slot type, and an intra-slot muting configuration indicating whether to mute each of a plurality of intra-slot PRS resource segments, e.g., as discussed at stage 5 of FIG. 24 and FIG. 23.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a base station serving a user equipment (UE) in a wireless network for supporting positioning of the UE, the method comprising: receiving a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtaining a muting configuration for the PRS in the plurality of slots, wherein the muting configuration is at least partially based on the slot type; and sending the muting configuration to the UE.

Clause 2. The method of clause 1, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 3. The method of any of clauses 1-2, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 4. The method of clause 3, wherein the muting configuration mutes the PRS in the sub-band full duplex slots when the base station is not capable of self-interference cancellation for uplink signal received simultaneously with transmission of the PRS.

Clause 5. The method of any of clauses 3-4, wherein the base station sends a location server an indication of the capability of the base station to perform self-interference cancellation for uplink signal received simultaneously with transmission of the PRS.

Clause 6. The method of any of clauses 1-5, wherein the muting configuration is received from a location server.

Clause 7. The method of any of clauses 1-5, wherein the muting configuration is generated by the base station.

Clause 8. The method of clause 7, further comprising sending the muting configuration to a location server.

Clause 9. The method of any of clauses 1-8, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 10. The method of clause 9, wherein the muting configuration for the PRS is a logical combination of the slot type muting configuration, and at least one of the inter-instance muting configuration, the intra-instance muting configuration, or the combination thereof.

Clause 11. The method of any of clauses 1-11, wherein the muting configuration for the PRS is at least partially based on the slot type by being based on a slot type muting configuration that indicates whether to mute the PRS in each slot based on the slot type, the method further comprising: obtaining an intra-slot muting configuration indicating whether to mute each of a plurality of intra-slot PRS resource segments; and wherein the muting configuration for the PRS is further based on the intra-slot muting configuration.

Clause 12. The method of any of clauses 1-11, wherein sending the muting configuration to the UE comprises sending the muting configuration in a Medium Access Control-Control Element (MAC-CE) or a Downlink Control Information (DCI) to the UE.

Clause 13. The method of any of clauses 1-12, further comprising transmitting the PRS to the UE in the plurality of slots.

Clause 14. A base station configured for supporting positioning of a user equipment (UE) in a wireless network, comprising: an external interface configured to communicate with entities in the wireless network; at least one memory; at least one processor coupled to the external interface and the at least one memory, wherein the at least one processor is configured to: receive a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtain a muting configuration for the PRS in the plurality of slots, wherein the muting configuration is at least partially based on the slot type; and send the muting configuration to the UE.

Clause 15. The base station of clause 14, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 16. The base station of any of clauses 14-15, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 17. The base station of clause 16, wherein the muting configuration mutes the PRS in the sub-band full duplex slots when the base station is not capable of self-interference cancellation for uplink signal received simultaneously with transmission of the PRS.

Clause 18. The base station of any of clauses 16-17, wherein the at least one processor is further configured to send to a location server an indication of the capability of the base station to perform self-interference cancellation for uplink signal received simultaneously with transmission of the PRS.

Clause 19. The base station of any of clauses 14-18, wherein the muting configuration is received from a location server.

Clause 20. The base station of any of clauses 14-18, wherein the muting configuration is generated by the base station.

Clause 21. The base station of clause 20, wherein the at least one processor is further configured to send the muting configuration to a location server.

Clause 22. The base station of any of clauses 14-21, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 23. The base station of clause 22, wherein the muting configuration for the PRS is a logical combination of the slot type muting configuration, and at least one of the inter-instance muting configuration, the intra-instance muting configuration, or the combination thereof.

Clause 24. The base station of any of clauses 14-23, wherein the muting configuration for the PRS is at least partially based on the slot type by being based on a slot type muting configuration that indicates whether to mute the PRS in each slot based on the slot type, wherein the at least one processor is further configured to: obtain an intra-slot muting configuration indicating whether to mute each of a plurality of intra-slot PRS resource segments; and wherein the muting configuration for the PRS is further based on the intra-slot muting configuration.

Clause 25. The base station of any of clauses 14-24, wherein the at least one processor is configured to send the muting configuration to the UE in a Medium Access Control-Control Element (MAC-CE) or a Downlink Control Information (DCI) to the UE.

Clause 26. The base station of any of clauses 14-25, wherein the at least one processor is further configured to transmit the PRS to the UE in the plurality of slots.

Clause 27. A base station serving configured for supporting positioning of a user equipment (UE) in a wireless network, comprising: means for receiving a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; means for obtaining a muting configuration for the PRS in the plurality of slots, wherein the muting configuration is at least partially based on the slot type; and means for sending the muting configuration to the UE.

Clause 28. The base station of clause 27, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 29. The base station of any of clauses 27-28, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 30. The base station of clause 29, wherein the muting configuration mutes the PRS in the sub-band full duplex slots when the base station is not capable of self-interference cancellation for uplink signal received simultaneously with transmission of the PRS.

Clause 31. The base station of any of clauses 29-30, wherein the base station sends a location server an indication of the capability of the base station to perform self-interference cancellation for uplink signal received simultaneously with transmission of the PRS.

Clause 32. The base station of any of clauses 27-31, wherein the muting configuration is received from a location server.

Clause 33. The base station of any of clauses 27-31, wherein the muting configuration is generated by the base station.

Clause 34. The base station of clause 33, further comprising means for sending the muting configuration to a location server.

Clause 35. The base station of any of clauses 27-34, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 36. The base station of clause 35, wherein the muting configuration for the PRS is a logical combination of the slot type muting configuration, and at least one of the inter-instance muting configuration, the intra-instance muting configuration, or the combination thereof.

Clause 37. The base station of any of clauses 27-36, wherein the muting configuration for the PRS is at least partially based on the slot type by being based on a slot type muting configuration that indicates whether to mute the PRS in each slot based on the slot type, further comprising: means for obtaining an intra-slot muting configuration indicating whether to mute each of a plurality of intra-slot PRS resource segments; and wherein the muting configuration for the PRS is further based on the intra-slot muting configuration.

Clause 38. The base station of any of clauses 27-37, wherein the means for sending the muting configuration to the UE sends the muting configuration in a Medium Access Control-Control Element (MAC-CE) or a Downlink Control Information (DCI) to the UE.

Clause 39. The base station of any of clauses 27-38, further comprising means for transmitting the PRS to the UE in the plurality of slots.

Clause 40. A non-transitory storage medium including program code stored thereon, the program code is operable to configure at least one processor in a base station for supporting positioning of a user equipment (UE) in a wireless network, the program code comprising instructions to: receive a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously; obtain a muting configuration for the PRS in the plurality of slots, wherein the muting configuration is at least partially based on the slot type; and send the muting configuration to the UE.

Clause 41. The non-transitory storage medium of clause 40, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 42. The non-transitory storage medium of any of clauses 40-41, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 43. The non-transitory storage medium of clause 42, wherein the muting configuration mutes the PRS in the sub-band full duplex slots when the base station is not capable of self-interference cancellation for uplink signal received simultaneously with transmission of the PRS.

Clause 44. The non-transitory storage medium of any of clauses 42-43, wherein the program code further comprises instructions to send to a location server an indication of the capability of the base station to perform self-interference cancellation for uplink signal received simultaneously with transmission of the PRS.

Clause 45. The non-transitory storage medium of any of clauses 40-44, wherein the muting configuration is received from a location server.

Clause 46. The non-transitory storage medium of any of clauses 40-44, wherein the muting configuration is generated by the base station.

Clause 47. The non-transitory storage medium of clause 46, wherein the program code further comprises instructions to send the muting configuration to a location server.

Clause 48. The non-transitory storage medium of any of clauses 40-47, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 49. The non-transitory storage medium of clause 48, wherein the muting configuration for the PRS is a logical combination of the slot type muting configuration, and at least one of the inter-instance muting configuration, the intra-instance muting configuration, or the combination thereof.

Clause 50. The non-transitory storage medium of any of clauses 40-49, wherein the muting configuration for the PRS is at least partially based on the slot type by being based on a slot type muting configuration that indicates whether to mute the PRS in each slot based on the slot type, wherein the program code further comprises instructions to: obtain an intra-slot muting configuration indicating whether to mute each of a plurality of intra-slot PRS resource segments; and wherein the muting configuration for the PRS is further based on the intra-slot muting configuration.

Clause 51. The non-transitory storage medium of any of clauses 40-49, wherein the program code further comprises instructions to send the muting configuration to the UE in a Medium Access Control-Control Element (MAC-CE) or a Downlink Control Information (DCI) to the UE.

Clause 52. The non-transitory storage medium of any of clauses 40-51, wherein the program code further comprises instructions to transmit the PRS to the UE in the plurality of slots.

Clause 53. A method performed by a location server for supporting positioning of a user equipment (UE) in a wireless network, the method comprising: generating a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generating a muting configuration for the PRS in the plurality of slots for the base station, wherein the muting configuration is at least partially based on the slot type; sending the muting configuration to the base station; and sending the muting configuration to the UE.

Clause 54. The method of clause 53, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 55. The method of any of clauses 53-54, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 56. The method of clause 55, wherein the muting configuration mutes the PRS in the sub-band full duplex slots when the base station is not capable of self-interference cancellation for uplink signal received simultaneously with transmission of the PRS.

Clause 57. The method of any of clauses 55-56, further comprising receiving an indication of the capability of the base station to perform self-interference cancellation for uplink signal received simultaneously with transmission of the PRS.

Clause 58. The method of any of clauses 53-57, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 59. The method of clause 58, wherein the muting configuration for the PRS is a logical combination of the slot type muting configuration, and at least one of the inter-instance muting configuration, the intra-instance muting configuration, or the combination thereof.

Clause 60. The method of any of clauses 53-59, wherein the muting configuration for the PRS is at least partially based on the slot type by being based on a slot type muting configuration that indicates whether to mute the PRS in each slot based on the slot type, the method further comprising: generating an intra-slot muting configuration indicating whether to mute each of a plurality of intra-slot PRS resource segments; and wherein the muting configuration for the PRS is further based on the intra-slot muting configuration.

Clause 61. The method of any of clauses 53-60, wherein generating the muting configuration for the PRS at least partially based on the slot type is in response to determining that Medium Access Control-Control Element (MAC-CE) or a Downlink Control Information (DCI) PRS triggering is in use.

Clause 62. A location server configured for supporting positioning of a user equipment (UE) in a wireless network, comprising: an external interface configured to communicate with entities in the wireless network; at least one memory; at least one processor coupled to the external interface and the at least one memory, wherein the at least one processor is configured to: generate a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generate a muting configuration for the PRS in the plurality of slots for the base station, wherein the muting configuration is at least partially based on the slot type; send the muting configuration to the base station; and send the muting configuration to the UE.

Clause 63. The location server of clause 62, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 64. The location server of any of clauses 62-63, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 65. The location server of clause 64, wherein the muting configuration mutes the PRS in the sub-band full duplex slots when the base station is not capable of self-interference cancellation for uplink signal received simultaneously with transmission of the PRS.

Clause 66. The location server of any of clauses 64-65, wherein the at least one processor is further configured to receive an indication of the capability of the base station to perform self-interference cancellation for uplink signal received simultaneously with transmission of the PRS.

Clause 67. The location server of any of clauses 62-66, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 68. The location server of clause 67, wherein the muting configuration for the PRS is a logical combination of the slot type muting configuration, and at least one of the inter-instance muting configuration, the intra-instance muting configuration, or the combination thereof.

Clause 69. The location server of any of clauses 62-68, wherein the muting configuration for the PRS is at least partially based on the slot type by being based on a slot type muting configuration that indicates whether to mute the PRS in each slot based on the slot type, wherein the at least one processor is further configured to: generate an intra-slot muting configuration indicating whether to mute each of a plurality of intra-slot PRS resource segments; and wherein the muting configuration for the PRS is further based on the intra-slot muting configuration.

Clause 70. The location server of any of clauses 62-69, wherein the at least one processor is configured to generate the muting configuration for the PRS at least partially based on the slot type in response to determining that Medium Access Control-Control Element (MAC-CE) or a Downlink Control Information (DCI) PRS triggering is in use.

Clause 71. A location server configured for supporting positioning of a user equipment (UE) in a wireless network, comprising: means for generating a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; means for generating a muting configuration for the PRS in the plurality of slots for the base station, wherein the muting configuration is at least partially based on the slot type; means for sending the muting configuration to the base station; and means for sending the muting configuration to the UE.

Clause 72. The location server of clause 71, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 73. The location server of any of clauses 71-72, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 74. The location server of clause 73, wherein the muting configuration mutes the PRS in the sub-band full duplex slots when the base station is not capable of self-interference cancellation for uplink signal received simultaneously with transmission of the PRS.

Clause 75. The location server of any of clauses 73-74, further comprising means for receiving an indication of the capability of the base station to perform self-interference cancellation for uplink signal received simultaneously with transmission of the PRS.

Clause 76. The location server of any of clauses 71-75, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 77. The location server of clause 76, wherein the muting configuration for the PRS is a logical combination of the slot type muting configuration, and at least one of the inter-instance muting configuration, the intra-instance muting configuration, or the combination thereof.

Clause 78. The location server of any of clauses 71-77, wherein the muting configuration for the PRS is at least partially based on the slot type by being based on a slot type muting configuration that indicates whether to mute the PRS in each slot based on the slot type, further comprising: means for generating an intra-slot muting configuration indicating whether to mute each of a plurality of intra-slot PRS resource segments; and wherein the muting configuration for the PRS is further based on the intra-slot muting configuration.

Clause 79. The location server of any of clauses 71-78, wherein the means for generating the muting configuration for the PRS at least partially based on the slot type generates the muting configuration in response to determining that Medium Access Control-Control Element (MAC-CE) or a Downlink Control Information (DCI) PRS triggering is in use.

Clause 80. A non-transitory storage medium including program code stored thereon, the program code is operable to configure at least one processor in a location server for supporting positioning of a user equipment (UE) in a wireless network, the program code comprising instructions to: generate a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously; generate a muting configuration for the PRS in the plurality of slots for the base station, wherein the muting configuration is at least partially based on the slot type; send the muting configuration to the base station; and send the muting configuration to the UE.

Clause 81. The non-transitory storage medium of clause 80, wherein the full duplex slots comprise in-band full duplex slots in which the downlink transmissions and the uplink reception occur simultaneously and with the same frequency resources, wherein the muting configuration mutes the PRS in the in-band full duplex slots.

Clause 82. The non-transitory storage medium of any of clauses 80-81, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 83. The non-transitory storage medium of clause 82, wherein the muting configuration mutes the PRS in the sub-band full duplex slots when the base station is not capable of self-interference cancellation for uplink signal received simultaneously with transmission of the PRS.

Clause 84. The non-transitory storage medium of any of clauses 82-83, wherein the program code further comprises instructions to receive an indication of the capability of the base station to perform self-interference cancellation for uplink signal received simultaneously with transmission of the PRS.

Clause 85. The non-transitory storage medium of any of clauses 80-84, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 86. The non-transitory storage medium of clause 85, wherein the muting configuration for the PRS is a logical combination of the slot type muting configuration, and at least one of the inter-instance muting configuration, the intra-instance muting configuration, or the combination thereof.

Clause 87. The non-transitory storage medium of any of clauses 80-86, wherein the muting configuration for the PRS is at least partially based on the slot type by being based on a slot type muting configuration that indicates whether to mute the PRS in each slot based on the slot type, wherein the program code further comprises instructions to: generate an intra-slot muting configuration indicating whether to mute each of a plurality of intra-slot PRS resource segments; and wherein the muting configuration for the PRS is further based on the intra-slot muting configuration.

Clause 88. The non-transitory storage medium of any of clauses 80-87, wherein the program code comprises instructions to generate the muting configuration for the PRS at least partially based on the slot type in response to determining that Medium Access Control-Control Element (MAC-CE) or a Downlink Control Information (DCI) PRS triggering is in use.

Clause 89. A method performed by a user equipment (UE) in a wireless network for supporting positioning of the UE, the method comprising: receiving a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receiving a muting configuration for the PRS in the plurality of slots, wherein the muting configuration is at least partially based on the slot type; and receiving the PRS from the base station using the muting configuration.

Clause 90. The method of clause 89, wherein the full duplex slots comprise in-band full duplex slots in which the downlink transmissions and the uplink reception by the base station occur simultaneously and with the same frequency resources, wherein the muting configuration mutes the PRS in the in-band full duplex slots.

Clause 91. The method of any of clauses 89-90, wherein the full duplex slots comprise sub-band full duplex slots in which the downlink transmissions and the uplink reception by the base station occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 92. The method of clause 91, wherein the muting configuration mutes the PRS in the sub-band full duplex slots when the base station is not capable of self-interference cancellation for uplink signal received simultaneously with transmission of the PRS.

Clause 93. The method of any of clauses 89-92, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 94. The method of clause 93, wherein the muting configuration for the PRS is a logical combination of the slot type muting configuration, and at least one of the inter-instance muting configuration, the intra-instance muting configuration, or the combination thereof.

Clause 95. The method of any of clauses 89-94, wherein the muting configuration for the PRS is at least partially based on the slot type by being based on a slot type muting configuration that indicates whether to mute the PRS in each slot based on the slot type, and an intra-slot muting configuration indicating whether to mute each of a plurality of intra-slot PRS resource segments.

Clause 96. The method of any of clauses 89-95, wherein receiving the muting configuration comprises receiving the muting configuration in a Medium Access Control-Control Element (MAC-CE) or a Downlink Control Information (DCI) from the base station.

Clause 97. A user equipment (UE) configured for supporting positioning of the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receive a muting configuration for the PRS in the plurality of slots, wherein the muting configuration is at least partially based on the slot type; and receive the PRS from the base station using the muting configuration.

Clause 98. The UE of clause 97, wherein the full duplex slots comprise in-band full duplex slots in which the downlink transmissions and the uplink reception by the base station occur simultaneously and with the same frequency resources, wherein the muting configuration mutes the PRS in the in-band full duplex slots.

Clause 99. The UE of any of clauses 97-98, wherein the full duplex slots comprise sub-band full duplex slots in which the downlink transmissions and the uplink reception by the base station occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 100. The UE of clause 99, wherein the muting configuration mutes the PRS in the sub-band full duplex slots when the base station is not capable of self-interference cancellation for uplink signal received simultaneously with transmission of the PRS.

Clause 101. The UE of any of clauses 97-100, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 102. The UE of clause 101, wherein the muting configuration for the PRS is a logical combination of the slot type muting configuration, and at least one of the inter-instance muting configuration, the intra-instance muting configuration, or the combination thereof.

Clause 103. The UE of any of clauses 97-102, wherein the muting configuration for the PRS is at least partially based on the slot type by being based on a slot type muting configuration that indicates whether to mute the PRS in each slot based on the slot type, and an intra-slot muting configuration indicating whether to mute each of a plurality of intra-slot PRS resource segments.

Clause 104. The UE of any of clauses 97-103, wherein the at least one processor is configured to receive the muting configuration in a Medium Access Control-Control Element (MAC-CE) or a Downlink Control Information (DCI) from the base station.

Clause 105. A user equipment (UE) in a wireless network configured for supporting positioning of the UE, comprising: means for receiving a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; means for receiving a muting configuration for the PRS in the plurality of slots, wherein the muting configuration is at least partially based on the slot type; and means for receiving the PRS from the base station using the muting configuration.

Clause 106. The UE of clause 105, wherein the full duplex slots comprise in-band full duplex slots in which the downlink transmissions and the uplink reception by the base station occur simultaneously and with the same frequency resources, wherein the muting configuration mutes the PRS in the in-band full duplex slots.

Clause 107. The UE of any of clauses 105-106, wherein the full duplex slots comprise sub-band full duplex slots in which the downlink transmissions and the uplink reception by the base station occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 108. The UE of clause 107, wherein the muting configuration mutes the PRS in the sub-band full duplex slots when the base station is not capable of self-interference cancellation for uplink signal received simultaneously with transmission of the PRS.

Clause 109. The UE of any of clauses 105-108, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 110. The UE of clause 109, wherein the muting configuration for the PRS is a logical combination of the slot type muting configuration, and at least one of the inter-instance muting configuration, the intra-instance muting configuration, or the combination thereof.

Clause 111. The UE of any of clauses 105-110, wherein the muting configuration for the PRS is at least partially based on the slot type by being based on a slot type muting configuration that indicates whether to mute the PRS in each slot based on the slot type, and an intra-slot muting configuration indicating whether to mute each of a plurality of intra-slot PRS resource segments.

Clause 112. The UE of any of clauses 105-111, wherein the means for receiving the muting configuration receives the muting configuration in a Medium Access Control Control Element (MAC-CE) or a Downlink Control Information (DCI) from the base station.

Clause 113. A non-transitory storage medium including program code stored thereon, the program code is operable to configure at least one processor in a user equipment (UE) for supporting positioning of the UE in a wireless network, the program code comprising instructions to: receive a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously; receive a muting configuration for the PRS in the plurality of slots, wherein the muting configuration is at least partially based on the slot type; and receive the PRS from the base station using the muting configuration.

Clause 114. The non-transitory storage medium of clause 113, wherein the full duplex slots comprise in-band full duplex slots in which the downlink transmissions and the uplink reception by the base station occur simultaneously and with the same frequency resources, wherein the muting configuration mutes the PRS in the in-band full duplex slots.

Clause 115. The non-transitory storage medium of any of clauses 113-114, wherein the full duplex slots comprise sub-band full duplex slots in which the downlink transmissions and the uplink reception by the base station occur simultaneously but on different frequency resources, wherein the muting configuration for the PRS in the sub-band full duplex slots is based on a capability of the base station to perform self-interference cancellation for uplink signal received simultaneously with transmission of the PRS.

Clause 116. The non-transitory storage medium of clause 115, wherein the muting configuration mutes the PRS in the sub-band full duplex slots when the base station is not capable of self-interference cancellation for uplink signal received simultaneously with transmission of the PRS.

Clause 117. The non-transitory storage medium of any of clauses 113-116, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

Clause 118. The non-transitory storage medium of clause 117, wherein the muting configuration for the PRS is a logical combination of the slot type muting configuration, and at least one of the inter-instance muting configuration, the intra-instance muting configuration, or the combination thereof.

Clause 119. The non-transitory storage medium of any of clauses 113-118, wherein the muting configuration for the PRS is at least partially based on the slot type by being based on a slot type muting configuration that indicates whether to mute the PRS in each slot based on the slot type, and an intra-slot muting configuration indicating whether to mute each of a plurality of intra-slot PRS resource segments.

Clause 120. The non-transitory storage medium of any of clauses 113-119, wherein the program code comprises instructions to receive the muting configuration in a Medium Access Control-Control Element (MAC-CE) or a Downlink Control Information (DCI) from the base station.

Therefore, it is intended that claimed subject matter not be limited to the particular examples disclosed, but that such claimed subject matter may also include all aspects falling within the scope of appended claims, and equivalents thereof.

What is claimed is:

1. A method performed by a base station serving a user equipment (UE) in a wireless network for supporting positioning of the UE, the method comprising:
   receiving a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously;
   obtaining a muting configuration for the PRS in the plurality of slots, wherein the muting configuration is at least partially based on the slot type; and
   sending the muting configuration to the UE.

2. The method of claim 1, wherein the full duplex slots comprise in-band full duplex slots in which the downlink transmissions and the uplink reception occur simultaneously and with the same frequency resources, wherein the muting configuration mutes the PRS in the in-band full duplex slots.

3. The method of claim 1, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

4. The method of claim 3, wherein the muting configuration mutes the PRS in the sub-band full duplex slots when the base station is not capable of self-interference cancellation for uplink signal received simultaneously with transmission of the PRS.

5. The method of claim 3, wherein the base station sends a location server an indication of the capability of the base station to perform self-interference cancellation for uplink signal received simultaneously with transmission of the PRS.

6. The method of claim 1, wherein the muting configuration is received from a location server.

7. The method of claim 1, wherein the muting configuration is generated by the base station.

8. The method of claim 7, further comprising sending the muting configuration to a location server.

9. The method of claim 1, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

10. The method of claim 9, wherein the muting configuration for the PRS is a logical combination of the slot type muting configuration, and at least one of the inter-instance muting configuration, the intra-instance muting configuration, or the combination thereof.

11. The method of claim 1, wherein the muting configuration for the PRS is at least partially based on the slot type by being based on a slot type muting configuration that indicates whether to mute the PRS in each slot based on the slot type, the method further comprising:
    obtaining an intra-slot muting configuration indicating whether to mute each of a plurality of intra-slot PRS resource segments; and
    wherein the muting configuration for the PRS is further based on the intra-slot muting configuration.

12. The method of claim 1, wherein sending the muting configuration to the UE comprises sending the muting configuration in a Medium Access Control-Control Element (MAC-CE) or a Downlink Control Information (DCI) to the UE.

13. The method of claim 1, further comprising transmitting the PRS to the UE in the plurality of slots.

14. A base station configured for supporting positioning of a user equipment (UE) in a wireless network, comprising:
    an external interface configured to communicate with entities in the wireless network;
    at least one memory;
    at least one processor coupled to the external interface and the at least one memory, wherein the at least one processor is configured to:
      receive a schedule for positioning reference signals (PRS) to be transmitted in a plurality of slots, wherein the plurality of slots has slot types comprising full duplex slots in which downlink transmissions and uplink reception occur simultaneously and half-duplex slots in which downlink transmissions and uplink reception do not occur simultaneously;
      obtain a muting configuration for the PRS in the plurality of slots, wherein the muting configuration is at least partially based on the slot type; and
      send the muting configuration to the UE.

15. The base station of claim 14, wherein the full duplex slots comprise in-band full duplex slots in which the downlink transmissions and the uplink reception occur simultaneously and with the same frequency resources, wherein the muting configuration mutes the PRS in the in-band full duplex slots.

16. The base station of claim 14, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

17. The base station of claim 16, wherein the muting configuration mutes the PRS in the sub-band full duplex slots when the base station is not capable of self-interference cancellation for uplink signal received simultaneously with transmission of the PRS.

18. The base station of claim 16, wherein the at least one processor is further configured to send to a location server an indication of the capability of the base station to perform self-interference cancellation for uplink signal received simultaneously with transmission of the PRS.

19. The base station of claim 14, wherein the muting configuration is received from a location server.

20. The base station of claim 14, wherein the muting configuration is generated by the base station.

21. The base station of claim 20, wherein the at least one processor is further configured to send the muting configuration to a location server.

22. The base station of claim 14, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

23. The base station of claim 22, wherein the muting configuration for the PRS is a logical combination of the slot type muting configuration, and at least one of the inter-instance muting configuration, the intra-instance muting configuration, or the combination thereof.

24. The base station of claim 14, wherein the muting configuration for the PRS is at least partially based on the slot type by being based on a slot type muting configuration that indicates whether to mute the PRS in each slot based on the slot type, wherein the at least one processor is further configured to:
obtain an intra-slot muting configuration indicating whether to mute each of a plurality of intra-slot PRS resource segments; and
wherein the muting configuration for the PRS is further based on the intra-slot muting configuration.

25. The base station of claim 14, wherein the at least one processor is configured to send the muting configuration to the UE in a Medium Access Control-Control Element (MAC-CE) or a Downlink Control Information (DCI) to the UE.

26. The base station of claim 14, wherein the at least one processor is further configured to transmit the PRS to the UE in the plurality of slots.

27. A method performed by a location server for supporting positioning of a user equipment (UE) in a wireless network, the method comprising:
generating a schedule for positioning reference signal (PRS) to be transmitted by a base station in a plurality of slots, wherein the plurality of slots has slot types comprising full duplex slots in which downlink transmissions and uplink reception occur simultaneously and half-duplex slots in which downlink transmissions and uplink reception do not occur simultaneously;
generating a muting configuration for the PRS in the plurality of slots for the base station, wherein the muting configuration is at least partially based on the slot type;
sending the muting configuration to the base station; and
sending the muting configuration to the UE.

28. The method of claim 27, wherein the full duplex slots comprise in-band full duplex slots in which the downlink transmissions and the uplink reception occur simultaneously and with the same frequency resources, wherein the muting configuration mutes the PRS in the in-band full duplex slots.

29. The method of claim 27, wherein the full duplex slots comprise sub-band full duplex slots in which the downlink transmissions and the uplink reception occur simultaneously but on different frequency resources, wherein the muting configuration for the PRS in the sub-band full duplex slots is based on a capability of the base station to perform self-interference cancellation for uplink signal received simultaneously with transmission of the PRS.

30. The method of claim 29, wherein the muting configuration mutes the PRS in the sub-band full duplex slots when the base station is not capable of self-interference cancellation for uplink signal received simultaneously with transmission of the PRS.

31. The method of claim 29, further comprising receiving an indication of the capability of the base station to perform self-interference cancellation for uplink signal received simultaneously with transmission of the PRS.

32. The method of claim 27, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

33. The method of claim 32, wherein the muting configuration for the PRS is a logical combination of the slot type muting configuration, and at least one of the inter-instance muting configuration, the intra-instance muting configuration, or the combination thereof.

34. The method of claim 27, wherein the muting configuration for the PRS is at least partially based on the slot type by being based on a slot type muting configuration that indicates whether to mute the PRS in each slot based on the slot type, the method further comprising:
generating an intra-slot muting configuration indicating whether to mute each of a plurality of intra-slot PRS resource segments; and
wherein the muting configuration for the PRS is further based on the intra-slot muting configuration.

35. The method of claim 27, wherein generating the muting configuration for the PRS at least partially based on the slot type is in response to determining that Medium Access Control-Control Element (MAC-CE) or a Downlink Control Information (DCI) PRS triggering is in use.

36. A method performed by a user equipment (UE) in a wireless network for supporting positioning of the UE, the method comprising:
receiving a schedule for positioning reference signals (PRS) to be transmitted in a plurality of slots by a base station, wherein the plurality of slots has slot types comprising full duplex slots in which downlink transmissions and uplink reception by the base station occur simultaneously and half-duplex slots in which downlink transmissions and uplink reception by the base station do not occur simultaneously;
receiving a muting configuration for the PRS in the plurality of slots, wherein the muting configuration is at least partially based on the slot type; and
receiving the PRS from the base station using the muting configuration.

37. The method of claim 36, wherein the full duplex slots comprise in-band full duplex slots in which the downlink transmissions and the uplink reception by the base station occur simultaneously and with the same frequency resources, wherein the muting configuration mutes the PRS in the in-band full duplex slots.

38. The method of claim 36, wherein the full duplex slots comprise sub-band full duplex slots in which the downlink transmissions and the uplink reception by the base station occur simultaneously but on different frequency resources, wherein the muting configuration for the PRS in the sub-band full duplex slots is based on a capability of the base station to perform self-interference cancellation for uplink signal received simultaneously with transmission of the PRS.

39. The method of claim 38, wherein the muting configuration mutes the PRS in the sub-band full duplex slots when the base station is not capable of self-interference cancellation for uplink signal received simultaneously with transmission of the PRS.

40. The method of claim 36, wherein the muting configuration for the PRS is at least partially based on the slot type by being based on a slot type muting configuration that indicates whether to mute the PRS in each slot based on the slot type, and is further based on at least one of an inter-instance muting configuration, an intra-instance muting configuration, or a combination thereof.

41. The method of claim 40, wherein the muting configuration for the PRS is a logical combination of the slot type muting configuration, and at least one of the inter-instance muting configuration, the intra-instance muting configuration, or the combination thereof.

42. The method of claim 36, wherein the muting configuration for the PRS is at least partially based on the slot type by being based on a slot type muting configuration that indicates whether to mute the PRS in each slot based on the slot type, and an intra-slot muting configuration indicating whether to mute each of a plurality of intra-slot PRS resource segments.

43. The method of claim 36, wherein receiving the muting configuration comprises receiving the muting configuration in a Medium Access Control-Control Element (MAC-CE) or a Downlink Control Information (DCI) from the base station.

* * * * *